(12) United States Patent
Pomerantz et al.

(10) Patent No.: US 12,099,217 B2
(45) Date of Patent: Sep. 24, 2024

(54) ULTRA-LIGHT OPTICAL ELEMENT

(71) Applicant: INNOVIZ TECHNOLOGIES LTD., Rosh Ha'Ayin (IL)

(72) Inventors: Uri Pomerantz, Tel-Aviv (IL); Nir Goren, Herut (IL); Yuval Ofir, Kfar Haoranim (IL)

(73) Assignee: INNOVIZ TECHNOLOGIES LTD., Rosh Ha'Ayin (IL)

( * ) Notice: Subject to any disclaimer, the term of this patent is extended or adjusted under 35 U.S.C. 154(b) by 509 days.

(21) Appl. No.: 17/482,005

(22) Filed: Sep. 22, 2021

(65) Prior Publication Data

US 2022/0091309 A1 Mar. 24, 2022

Related U.S. Application Data

(60) Provisional application No. 63/155,366, filed on Mar. 2, 2021, provisional application No. 63/132,555, filed on Dec. 31, 2020, provisional application No. 63/081,986, filed on Sep. 23, 2020.

(51) Int. Cl.
| | |
|---|---|
| *G02B 5/08* | (2006.01) |
| *B29D 11/00* | (2006.01) |
| *B33Y 80/00* | (2015.01) |
| *G02B 26/10* | (2006.01) |
| *B33Y 10/00* | (2015.01) |

(52) U.S. Cl.
CPC ...... *G02B 5/0808* (2013.01); *B29D 11/00596* (2013.01); *B33Y 80/00* (2014.12); *G02B 26/101* (2013.01); *B33Y 10/00* (2014.12)

(58) Field of Classification Search
CPC ............... G02B 5/0808; G02B 26/101; G02B 26/0833; B29D 11/00596; B33Y 80/00; B33Y 10/00
USPC .......................................................... 359/883
See application file for complete search history.

(56) References Cited

U.S. PATENT DOCUMENTS

| | | | |
|---|---|---|---|
| 4,842,398 A | 6/1989 | Ducassou | |
| 5,208,704 A | 5/1993 | Zito | |
| 5,358,776 A | 10/1994 | Hotaling | |
| 5,855,953 A | 1/1999 | Cao et al. | |
| 5,879,744 A | 3/1999 | Cao et al. | |
| 6,206,531 B1* | 3/2001 | Williams | G02B 5/08 359/896 |
| 6,519,074 B2 | 2/2003 | Little et al. | |
| 6,597,461 B1 | 7/2003 | Verma et al. | |
| 6,677,034 B1* | 1/2004 | Hooley | B41J 2/1623 428/323 |
| 6,740,416 B1* | 5/2004 | Yokogawa | H10K 50/85 428/209 |
| 6,749,309 B1 | 6/2004 | Kaplan et al. | |
| 9,138,918 B2 | 9/2015 | Carlson | |
| 2006/0216219 A1 | 5/2006 | DeFriend et al. | |
| 2010/0196624 A1* | 8/2010 | Ruuttu | B23K 26/0673 118/620 |

(Continued)

FOREIGN PATENT DOCUMENTS

| | | |
|---|---|---|
| EP | 0276617 B1 | 6/1991 |
| WO | 02/099896 A1 | 12/2002 |

*Primary Examiner* — William R Alexander
(74) *Attorney, Agent, or Firm* — Finnegan, Henderson, Farabow, Garrett & Dunner, LLP

(57) ABSTRACT

A mirror includes an ultralight substrate. A reflective layer is disposed on the ultralight substrate. A bonding layer may be disposed between the reflective layer and the substrate.

32 Claims, 42 Drawing Sheets

(56) References Cited

U.S. PATENT DOCUMENTS

| | | | |
|---|---|---|---|
| 2011/0080666 A1* | 4/2011 | Odhner | C25D 1/06 |
| | | | 205/71 |
| 2011/0085257 A1* | 4/2011 | O'Connor | B32B 17/10302 |
| | | | 359/868 |
| 2013/0027794 A1* | 1/2013 | O'Connor | B32B 17/10082 |
| | | | 359/868 |
| 2013/0335823 A1* | 12/2013 | Epstein | G02F 1/133536 |
| | | | 359/489.07 |
| 2018/0081037 A1 | 3/2018 | Medina et al. | |
| 2018/0081038 A1 | 3/2018 | Medina et al. | |
| 2018/0100928 A1 | 4/2018 | Keilaf et al. | |
| 2018/0113216 A1 | 4/2018 | Kremer et al. | |
| 2018/0372931 A1* | 12/2018 | Jones | G02B 5/285 |
| 2020/0057147 A1* | 2/2020 | Chen | G02B 26/0816 |
| 2021/0026132 A1* | 1/2021 | Pascall | B33Y 10/00 |
| 2021/0123558 A1* | 4/2021 | Leroy | C08J 9/28 |
| 2023/0012777 A1* | 1/2023 | Chaudhary | H01J 49/0463 |

* cited by examiner

ULTRA-LIGHT OPTICAL ELEMENT

CROSS REFERENCE TO RELATED APPLICATIONS

The present application claims priority to U.S. Provisional Patent Application No. 63/081,986, filed Sep. 23, 2020, U.S. Provisional Patent Application No. 63/132,555, filed Dec. 31, 2020, and U.S. Provisional Patent Application No. 63/155,366, filed Mar. 2, 2021, each of which is incorporated herein by reference in its entirety.

BACKGROUND

I. Technical Field

The present disclosure relates generally to technology for a scanning mirror that may be used in various application, such as, for example, in systems and methods that use LIDAR technology to detect objects in the surrounding environment.

II. Background Information

An optical element (such as, for example, a scanning mirror) in the millimeter scale may be used for various applications such as LIDAR, electro-optics, projection, laser processing, or other applications. Such applications may benefit from highly flat scanning mirrors to minimize optical distortions. Flatness of scanning mirrors may be compromised by the fabrication method used to fabricate such mirrors (i.e., static flatness), and also by distortion caused by their movement (i.e., dynamic distortion). Micro-electromechanical systems (MEMS) scanning mirrors may be limited in size due to the space required for manipulators of the MEMS die.

With the advent of driver assist systems and autonomous vehicles, automobiles routinely are equipped with systems capable of reliably sensing and interpreting their surroundings, including identifying obstacles, hazards, objects, and other physical parameters that might impact navigation of the vehicle. To this end, a number of differing technologies have been suggested including radar, LIDAR, camera-based systems, operating alone or in a redundant manner. One consideration with driver assistance systems and autonomous vehicles is an ability of the system to determine surroundings across different conditions including, rain, fog, darkness, bright light, and snow. A light detection and ranging system, (LIDAR a/k/a LADAR) is an example of technology that can work well in differing conditions, by measuring distances to objects by illuminating objects with light and measuring the reflected pulses with a sensor. A laser is one example of a light source that can be used in a LIDAR system. An electro-optical system such as a LIDAR system may include a light deflector for projecting light emitted by a light source into the environment of the electro-optical system. The light deflector may be controlled to pivot around at least one axis for projecting the light into a desired location in the field of view of the electro-optical system. It may be desirable to design improved systems and methods for determining the position and/or orientation of the light deflector for controlling and/or monitoring the movement of the light deflector with precision.

The systems and methods of the present disclosure are directed towards improving performance of monitoring the position and/or orientation of a light deflector used in electro-optical systems.

SUMMARY

In one embodiment, a mirror is disclosed. The mirror may include an ultralight substrate having a first surface. A reflective layer may be disposed on the substrate. A bonding layer may be disposed between the reflective layer and the first surface of the substrate.

In another embodiment, a method of fabricating an ultralight mirror. The method may include forming a reflective layer on a first surface of a substrate, and coupling a second surface of an ultralight component on the reflective layer formed on the substrate. The method may also include decoupling the ultralight component from the substrate after the coupling. After the decoupling, at least a portion of the reflective layer of the first surface may be transferred to the second surface of the ultralight component.

In another embodiment, a mirror is disclosed. The mirror may include a substrate including an ultralight material. A layer of reflective material may be disposed on the substrate.

In yet another embodiment, a MEMs device is disclosed. The device may include at least one MEMs actuator and a mirror actuatable by the MEMs actuator. The mirror may include an ultralight material.

In yet another embodiment, a method for making an ultralight mirror is disclosed. The method may include polishing one side of an ultralight substrate, and forming a reflective surface on at least the one side of the substrate.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1A:
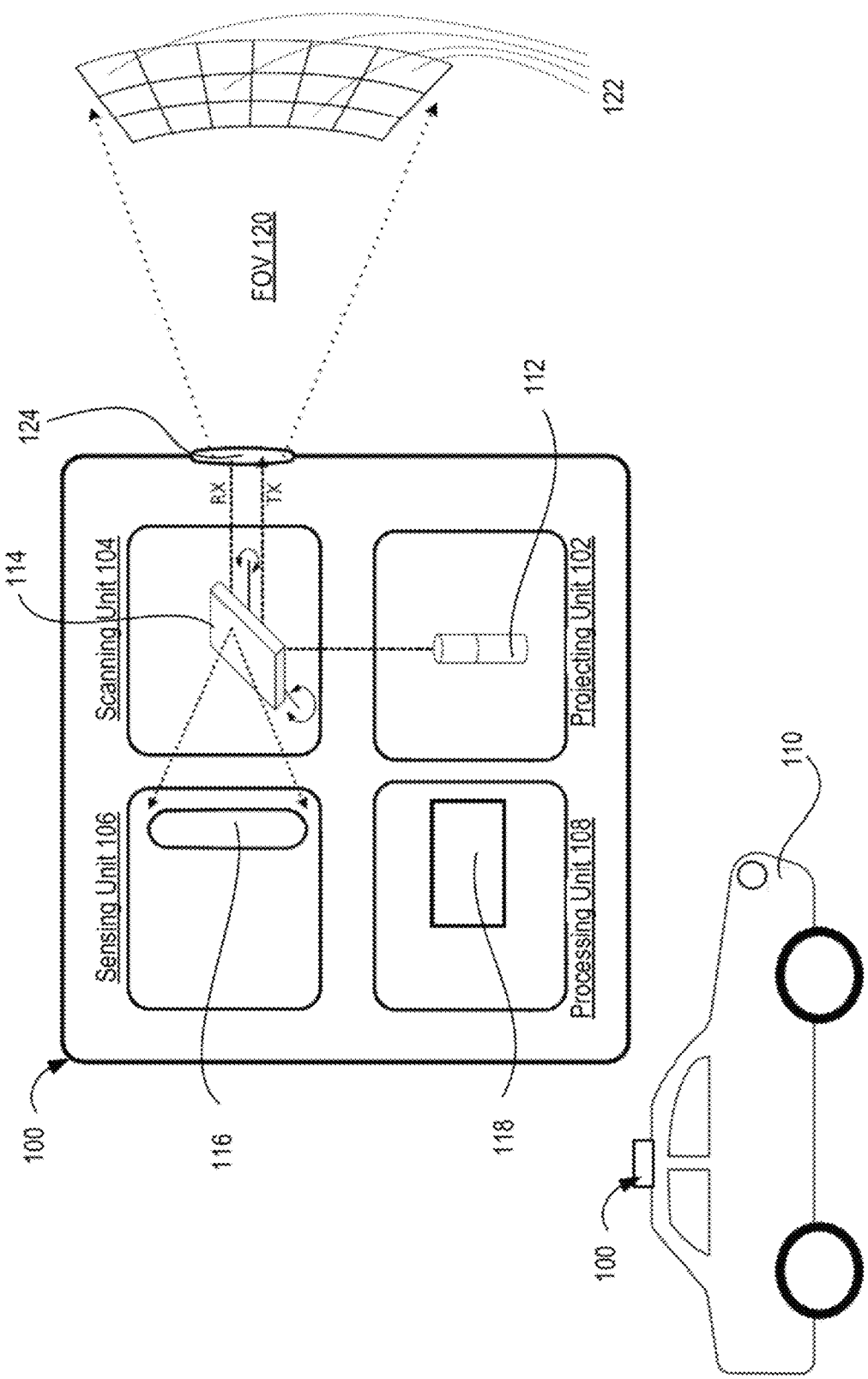
FIG. 1A is a diagram illustrating an exemplary LIDAR system consistent with disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Disclosed embodiments may involve an optical system. As used herein, the term "optical system" broadly includes any system that is used for the generation, detection and/or manipulation of light. By way of example only, an optical system may include one or more optical components for generating, detecting and/or manipulating light. For example, light sources, lenses, mirrors, prisms, beam splitters, collimators, polarizing optics, optical modulators, optical switches, optical amplifiers, optical detectors, optical sensors, fiber optics, semiconductor optic components, while each not necessarily required, may each be part of an optical system. In addition to the one or more optical components, an optical system may also include other non-optical components such as electrical components, mechanical components, chemical reaction components, and semiconductor components. The non-optical components may cooperate with optical components of the optical system. For example, the optical system may include at least one processor for analyzing detected light.

Consistent with the present disclosure, the optical system may be a LIDAR system. As used herein, the term "LIDAR system" broadly includes any system which can determine values of parameters indicative of a distance between a pair of tangible objects based on reflected light. In one embodiment, the LIDAR system may determine a distance between a pair of tangible objects based on reflections of light emitted by the LIDAR system. As used herein, the term "determine distances" broadly includes generating outputs which are indicative of distances between pairs of tangible objects. The determined distance may represent the physical dimension between a pair of tangible objects. By way of example only, the determined distance may include a line of flight distance between the LIDAR system and another tangible object in a field of view of the LIDAR system. In another embodiment, the LIDAR system may determine the relative velocity between a pair of tangible objects based on reflections of light emitted by the LIDAR system. Examples of outputs indicative of the distance between a pair of tangible objects include: a number of standard length units between the tangible objects (e.g. number of meters, number of inches, number of kilometers, number of millimeters), a number of arbitrary length units (e.g. number of LIDAR system lengths), a ratio between the distance to another length (e.g. a ratio to a length of an object detected in a field of view of the LIDAR system), an amount of time (e.g. given as standard unit, arbitrary units or ratio, for example, the time it takes light to travel between the tangible objects), one or more locations (e.g. specified using an agreed coordinate system, specified in relation to a known location), and more.

The LIDAR system may determine the distance between a pair of tangible objects based on reflected light. In one embodiment, the LIDAR system may process detection results of a sensor which creates temporal information indicative of a period of time between the emission of a light signal and the time of its detection by the sensor. The period of time is occasionally referred to as "time of flight" of the light signal. In one example, the light signal may be a short pulse, whose rise and/or fall time may be detected in reception. Using known information about the speed of light in the relevant medium (usually air), the information regarding the time of flight of the light signal can be processed to provide the distance the light signal traveled between emission and detection. In another embodiment, the LIDAR system may determine the distance based on frequency phase-shift (or multiple frequency phase-shift). Specifically, the LIDAR system may process information indicative of one or more modulation phase shifts (e.g. by solving some simultaneous equations to give a final measure) of the light signal. For example, the emitted optical signal may be modulated with one or more constant frequencies. The at least one phase shift of the modulation between the emitted signal and the detected reflection may be indicative of the distance the light traveled between emission and detection. The modulation may be applied to a continuous wave light signal, to a quasi-continuous wave light signal, or to another type of emitted light signal. It is noted that additional information may be used by the LIDAR system for determining the distance, e.g. location information (e.g. relative positions) between the projection location, the detection location of the signal (especially if distanced from one another), and more.

In some embodiments, the LIDAR system may be used for detecting a plurality of objects in an environment of the LIDAR system. The term "detecting an object in an environment of the LIDAR system" broadly includes generating information which is indicative of an object that reflected light toward a detector associated with the LIDAR system. If more than one object is detected by the LIDAR system, the generated information pertaining to different objects may be interconnected, for example a car is driving on a road, a bird is sitting on the tree, a man touches a bicycle, a van moves towards a building. The dimensions of the environment in which the LIDAR system detects objects may vary with respect to implementation. For example, the LIDAR system may be used for detecting a plurality of objects in an environment of a vehicle on which the LIDAR system is installed, up to a horizontal distance of 100 m (or 200 m, 300 m, etc.), and up to a vertical distance of 10 m (or 25 m, 50 m, etc.). In another example, the LIDAR system may be used for detecting a plurality of objects in an environment of a vehicle or within a predefined horizontal range (e.g., 25°, 50°, 100°, 180°, etc.), and up to a predefined vertical elevation (e.g., ±10°, ±20°, +40°-20°, ±90° or 0°-90°).

As used herein, the term "detecting an object" may broadly refer to determining an existence of the object (e.g., an object may exist in a certain direction with respect to the LIDAR system and/or to another reference location, or an object may exist in a certain spatial volume). Additionally, or alternatively, the term "detecting an object" may refer to determining a distance between the object and another location (e.g., a location of the LIDAR system, a location on earth, or a location of another object). Additionally or alternatively, the term "detecting an object" may refer to identifying the object (e.g. classifying a type of object such as car, plant, tree, road; recognizing a specific object (e.g., the Washington Monument); determining a license plate number; determining a composition of an object (e.g., solid, liquid, transparent, semitransparent); determining a kinematic parameter of an object (e.g., whether it is moving, its velocity, its movement direction, expansion of the object). Additionally or alternatively, the term "detecting an object" may refer to generating a point cloud map in which every point of one or more points of the point cloud map correspond to a location in the object or a location on a face thereof. In one embodiment, the data resolution associated with the point cloud map representation of the field of view may be associated with 0.1°×0.1° or 0.3°×0.3° of the field of view.

Consistent with the present disclosure, the term "object" broadly includes a finite composition of matter that may reflect light from at least a portion thereof. For example, an object may be at least partially solid (e.g. cars, trees); at least partially liquid (e.g. puddles on the road, rain); at least partly gaseous (e.g. fumes, clouds); made from a multitude of distinct particles (e.g. sand storm, fog, spray); and may be of one or more scales of magnitude, such as ~1 millimeter (mm), ~5 mm, ~10 mm, ~50 mm, ~100 mm, ~500 mm, ~1 meter (m), ~5 m, ~10 m, ~50 m, ~100 m, and so on. Smaller or larger objects, as well as any size in between those examples, may also be detected. It is noted that for various reasons, the LIDAR system may detect only part of the object. For example, in some cases, light may be reflected from only some sides of the object (e.g., only the side opposing the LIDAR system will be detected); in other cases, light may be projected on only part of the object (e.g. laser beam projected onto a road or a building); in other cases, the object may be partly blocked by another object between the LIDAR system and the detected object; in other cases, the LIDAR's sensor may only detects light reflected from a portion of the object, e.g., because ambient light or other interferences interfere with detection of some portions of the object.

Consistent with the present disclosure, a LIDAR system may be configured to detect objects by scanning the environment of LIDAR system. The term "scanning the environment of LIDAR system" broadly includes illuminating the field of view or a portion of the field of view of the LIDAR system. In one example, scanning the environment of LIDAR system may be achieved by moving or pivoting a light deflector to deflect light in differing directions toward different parts of the field of view. In another example, scanning the environment of LIDAR system may be achieved by changing a positioning (i.e. location and/or orientation) of a sensor with respect to the field of view. In another example, scanning the environment of LIDAR system may be achieved by changing a positioning (i.e. location and/or orientation) of a light source with respect to the field of view. In yet another example, scanning the environment of LIDAR system may be achieved by changing the positions of at least one light source and of at least one sensor to move rigidly respect to the field of view (i.e. the relative distance and orientation of the at least one sensor and of the at least one light source remains).

As used herein the term "field of view of the LIDAR system" may broadly include an extent of the observable environment of LIDAR system in which objects may be detected. It is noted that the field of view (FOV) of the LIDAR system may be affected by various conditions such as but not limited to: an orientation of the LIDAR system (e.g. is the direction of an optical axis of the LIDAR system); a position of the LIDAR system with respect to the environment (e.g. distance above ground and adjacent topography and obstacles); operational parameters of the LIDAR system (e.g. emission power, computational settings, defined angles of operation), etc. The field of view of LIDAR system may be defined, for example, by a solid angle (e.g. defined using $\phi$, $\theta$ angles, in which $\phi$ and $\theta$ are angles defined in perpendicular planes, e.g. with respect to symmetry axes of the LIDAR system and/or its FOV). In one example, the field of view may also be defined within a certain range (e.g. up to 200 m).

Similarly, the term "instantaneous field of view" may broadly include an extent of the observable environment in which objects may be detected by the LIDAR system at any given moment. For example, for a scanning LIDAR system, the instantaneous field of view is narrower than the entire FOV of the LIDAR system, and it can be moved within the FOV of the LIDAR system in order to enable detection in other parts of the FOV of the LIDAR system. The movement of the instantaneous field of view within the FOV of the LIDAR system may be achieved by moving a light deflector of the LIDAR system (or external to the LIDAR system), so as to deflect beams of light to and/or from the LIDAR system in differing directions. In one embodiment, LIDAR system may be configured to scan scene in the environment in which the LIDAR system is operating. As used herein the term "scene" may broadly include some or all of the objects within the field of view of the LIDAR system, in their relative positions and in their current states, within an operational duration of the LIDAR system. For example, the scene may include ground elements (e.g. earth, roads, grass, sidewalks, road surface marking), sky, man-made objects (e.g. vehicles, buildings, signs), vegetation, people, animals, light projecting elements (e.g. flashlights, sun, other LIDAR systems), and so on.

Disclosed embodiments may involve obtaining information for use in generating reconstructed three-dimensional models. Examples of types of reconstructed three-dimensional models which may be used include point cloud models, and Polygon Mesh (e.g. a triangle mesh). The terms "point cloud" and "point cloud model" are widely known in the art, and should be construed to include a set of data points located spatially in some coordinate system (i.e., having an identifiable location in a space described by a respective coordinate system).The term "point cloud point" refer to a point in space (which may be dimensionless, or a miniature cellular space, e.g. 1 cm³), and whose location may be described by the point cloud model using a set of coordinates (e.g. (X,Y,Z), (r,ϕ,θ)). By way of example only, the point cloud model may store additional information for some or all of its points (e.g., color information for points generated from camera images). Likewise, any other type of reconstructed three-dimensional model may store additional information for some or all of its objects. Similarly, the terms "polygon mesh" and "triangle mesh" are widely known in the art, and are to be construed to include, among other things, a set of vertices, edges and faces that define the shape of one or more 3D objects (such as a polyhedral object). The faces may include one or more of the following: triangles (triangle mesh), quadrilaterals, or other simple convex polygons, since this may simplify rendering. The faces may also include more general concave polygons, or polygons with holes. Polygon meshes may be represented using differing techniques, such as: Vertex-vertex meshes, Face-vertex meshes, Winged-edge meshes and Render dynamic meshes. Different portions of the polygon mesh (e.g., vertex, face, edge) are located spatially in some coordinate system (i.e., having an identifiable location in a space described by the respective coordinate system), either directly and/or relative to one another. The generation of the reconstructed three-dimensional model may be implemented using any standard, dedicated and/or novel photogrammetry technique, many of which are known in the art. It is noted that other types of models of the environment may be generated by the LIDAR system.

Consistent with disclosed embodiments, the LIDAR system may include at least one projecting unit with a light source configured to project light. As used herein the term "light source" broadly refers to any device configured to emit light. In one embodiment, the light source may be a laser such as a solid-state laser, laser diode, a high power laser, or an alternative light source such as, a light emitting diode (LED)-based light source. In addition, light source 112 as illustrated throughout the figures, may emit light in differing formats, such as light pulses, continuous wave (CW), quasi-CW, and so on. For example, one type of light source that may be used is a vertical-cavity surface-emitting laser (VCSEL). Another type of light source that may be used is an external cavity diode laser (ECDL). In some examples, the light source may include a laser diode configured to emit light at a wavelength between about 650 nm and 1150 nm. Alternatively, the light source may include a laser diode configured to emit light at a wavelength between about 800 nm and about 1000 nm, between about 850 nm and about 950 nm, or between about 1300 nm and about 1600 nm. Unless indicated otherwise, the term "about" with regards to a numeric value is defined as a variance of up to 5% with respect to the stated value. Additional details on the projecting unit and the at least one light source are described below with reference to FIGS. 2A-2C.

Consistent with disclosed embodiments, the LIDAR system may include at least one scanning unit with at least one light deflector configured to deflect light from the light source in order to scan the field of view. The term "light deflector" broadly includes any mechanism or module which is configured to make light deviate from its original path; for example, a mirror, a prism, controllable lens, a mechanical mirror, mechanical scanning polygons, active diffraction (e.g. controllable LCD), Risley prisms, non-mechanical-electro-optical beam steering (such as made by Vscent), polarization grating (such as offered by Boulder Non-Linear Systems), optical phased array (OPA), and more. In one embodiment, a light deflector may include a plurality of optical components, such as at least one reflecting element (e.g. a mirror), at least one refracting element (e.g. a prism, a lens), and so on. In one example, the light deflector may be movable, to cause light deviate to differing degrees (e.g. discrete degrees, or over a continuous span of degrees). The light deflector may optionally be controllable in different ways (e.g. deflect to a degree a, change deflection angle by Δa, move a component of the light deflector by M millimeters, change speed in which the deflection angle changes). In addition, the light deflector may optionally be operable to change an angle of deflection within a single plane (e.g., θ coordinate). The light deflector may optionally be operable to change an angle of deflection within two non-parallel planes (e.g., θ and ϕ coordinates). Alternatively, or in addition, the light deflector may optionally be operable to change an angle of deflection between predetermined settings (e.g., along a predefined scanning route) or otherwise. With respect the use of light deflectors in LIDAR systems, it is noted that a light deflector may be used in the outbound direction (also referred to as transmission direction, or TX) to deflect light from the light source to at least a part of the field of view. However, a light deflector may also be used in the inbound direction (also referred to as reception direction, or RX) to deflect light from at least a part of the field of view to one or more light sensors. Additional details on the scanning unit and the at least one light deflector are described below with reference to FIGS. 3A-3C.

Disclosed embodiments may involve pivoting the light deflector in order to scan the field of view. As used herein the term "pivoting" broadly includes rotating of an object (especially a solid object) about one or more axis of rotation, while substantially maintaining a center of rotation fixed. In one embodiment, the pivoting of the light deflector may include rotation of the light deflector about a fixed axis (e.g., a shaft), but this is not necessarily so. For example, in some MEMS mirror implementation, the MEMS mirror may move by actuation of a plurality of benders connected to the mirror, the mirror may experience some spatial translation in addition to rotation. Nevertheless, such mirror may be designed to rotate about a substantially fixed axis, and therefore consistent with the present disclosure it considered to be pivoted. In other embodiments, some types of light deflectors (e.g., non-mechanical-electro-optical beam steering, OPA) do not require any moving components or internal movements in order to change the deflection angles of deflected light. It is noted that any discussion relating to moving or pivoting a light deflector is also mutatis mutandis applicable to controlling the light deflector such that it changes a deflection behavior of the light deflector. For example, controlling the light deflector may cause a change in a deflection angle of beams of light arriving from at least one direction.

Disclosed embodiments may involve receiving reflections associated with a portion of the field of view corresponding to a single instantaneous position of the light deflector. As used herein, the term "instantaneous position of the light deflector" (also referred to as "state of the light deflector") broadly refers to the location or position in space where at least one controlled component of the light deflector is situated at an instantaneous point in time, or over a short span of time. In one embodiment, the instantaneous position of light deflector may be gauged with respect to a frame of reference. The frame of reference may pertain to at least one fixed point in the LIDAR system. Or, for example, the frame of reference may pertain to at least one fixed point in the scene. In some embodiments, the instantaneous position of the light deflector may include some movement of one or more components of the light deflector (e.g. mirror, prism), usually to a limited degree with respect to the maximal degree of change during a scanning of the field of view. For example, a scanning of the entire the field of view of the LIDAR system may include changing deflection of light over a span of 30°, and the instantaneous position of the at least one light deflector may include angular shifts of the light deflector within 0.05°. In other embodiments, the term "instantaneous position of the light deflector" may refer to the positions of the light deflector during acquisition of light which is processed to provide data for a single point of a point cloud (or another type of 3D model) generated by the LIDAR system. In some embodiments, an instantaneous position of the light deflector may correspond with a fixed position or orientation in which the deflector pauses for a short time during illumination of a particular sub-region of the LIDAR field of view. In other cases, an instantaneous position of the light deflector may correspond with a certain position/orientation along a scanned range of positions/orientations of the light deflector that the light deflector passes through as part of a continuous or semi-continuous scan of the LIDAR field of view. In some embodiments, the light deflector may be moved such that during a scanning cycle of the LIDAR FOV the light deflector is located at a plurality of different instantaneous positions. In other words, during the period of time in which a scanning cycle occurs, the deflector may be moved through a series of different instantaneous positions/orientations, and the deflector may reach each different instantaneous position/orientation at a different time during the scanning cycle.

Consistent with disclosed embodiments, the LIDAR system may include at least one sensing unit with at least one sensor configured to detect reflections from objects in the field of view. The term "sensor" broadly includes any device, element, or system capable of measuring properties (e.g., power, frequency, phase, pulse timing, pulse duration) of electromagnetic waves and to generate an output relating to the measured properties. In some embodiments, the at least one sensor may include a plurality of detectors constructed from a plurality of detecting elements. The at least one sensor may include light sensors of one or more types. It is noted that the at least one sensor may include multiple sensors of the same type which may differ in other characteristics (e.g., sensitivity, size). Other types of sensors may also be used. Combinations of several types of sensors can be used for different reasons, such as improving detection over a span of ranges (especially in close range); improving the dynamic range of the sensor; improving the temporal response of the sensor; and improving detection in varying environmental conditions (e.g. atmospheric temperature, rain, etc.),In one embodiment, the at least one sensor includes a SiPM (Silicon photomultipliers) which is a solid-state single-photon-sensitive device built from an array of avalanche photodiode (APD), single photon avalanche diode (SPAD), serving as detection elements on a common silicon substrate. In one example, a typical distance between SPADs may be between about 10 µm and about 50 µm, wherein each SPAD may have a recovery time of between about 20 ns and about 100 ns. Similar photomultipliers from other, non-silicon materials may also be used. Although a SiPM device works in digital/switching mode, the SiPM is an analog device because all the microcells may be read in parallel, making it possible to generate signals within a dynamic range from a single photon to hundreds and thousands of photons detected by the different SPADs. It is noted that outputs from different types of sensors (e.g., SPAD, APD, SiPM, PIN diode, Photodetector) may be combined together to a single output which may be processed by a processor of the LIDAR system. Additional details on the sensing unit and the at least one sensor are described below with reference to FIGS. 4A-4C.

Consistent with disclosed embodiments, the LIDAR system may include or communicate with at least one processor configured to execute differing functions. The at least one processor may constitute any physical device having an electric circuit that performs a logic operation on input or inputs. For example, the at least one processor may include one or more integrated circuits (IC), including Application-specific integrated circuit (ASIC), microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by at least one processor may, for example, be pre-loaded into a memory integrated with or embedded into the controller or may be stored in a separate memory. The memory may comprise a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the memory is configured to store information representative data about objects in the environment of the LIDAR system. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact. Additional details on the processing unit and the at least one processor are described below with reference to FIGS. 5A-5C.

System Overview

FIG. 1A illustrates a LIDAR system 100 including a projecting unit 102, a scanning unit 104, a sensing unit 106, and a processing unit 108. LIDAR system 100 may be mountable on a vehicle 110. Consistent with embodiments of the present disclosure, projecting unit 102 may include at least one light source 112, scanning unit 104 may include at least one light deflector 114, sensing unit 106 may include at least one sensor 116, and processing unit 108 may include at least one processor 118. In one embodiment, at least one processor 118 may be configured to coordinate operation of the at least one light source 112 with the movement of at least one light deflector 114 in order to scan a field of view 120. During a scanning cycle, each instantaneous position of at least one light deflector 114 may be associated with a particular portion 122 of field of view 120. In addition, LIDAR system 100 may include at least one optional optical window 124 for directing light projected towards field of view 120 and/or receiving light reflected from objects in field of view 120. Optional optical window 124 may serve different purposes, such as collimation of the projected light and focusing of the reflected light. In one embodiment, optional optical window 124 may be an opening, a flat window, a lens, or any other type of optical window.

Consistent with the present disclosure, LIDAR system 100 may be used in autonomous or semi-autonomous road-vehicles (for example, cars, buses, vans, trucks and any other terrestrial vehicle). Autonomous road-vehicles with LIDAR system 100 may scan their environment and drive to a destination vehicle without human input. Similarly, LIDAR system 100 may also be used in autonomous/semi-autonomous aerial-vehicles (for example, UAV, drones, quadcopters, and any other airborne vehicle or device); or in an autonomous or semi-autonomous water vessel (e.g., boat, ship, submarine, or any other watercraft). Autonomous aerial-vehicles and watercraft with LIDAR system 100 may scan their environment and navigate to a destination autonomously or using a remote human operator. According to one embodiment, vehicle 110 (either a road-vehicle, aerial-vehicle, or watercraft) may use LIDAR system 100 to aid in detecting and scanning the environment in which vehicle 110 is operating.

It should be noted that LIDAR system 100 or any of its components may be used together with any of the example embodiments and methods disclosed herein. Further, while some aspects of LIDAR system 100 are described relative to an exemplary vehicle-based LIDAR platform, LIDAR system 100, any of its components, or any of the processes described herein may be applicable to LIDAR systems of other platform types.

In some embodiments, LIDAR system 100 may include one or more scanning units 104 to scan the environment around vehicle 110. LIDAR system 100 may be attached or mounted to any part of vehicle 110. Sensing unit 106 may receive reflections from the surroundings of vehicle 110, and transfer reflections signals indicative of light reflected from objects in field of view 120 to processing unit 108. Consistent with the present disclosure, scanning units 104 may be mounted to or incorporated into a bumper, a fender, a side panel, a spoiler, a roof, a headlight assembly, a taillight assembly, a rear-view mirror assembly, a hood, a trunk or any other suitable part of vehicle 110 capable of housing at least a portion of the LIDAR system. In some cases, LIDAR system 100 may capture a complete surround view of the environment of vehicle 110. Thus, LIDAR system 100 may have a 360-degree horizontal field of view. In one example, as shown in FIG. 1A, LIDAR system 100 may include a single scanning unit 104 mounted on a roof vehicle 110. Alternatively, LIDAR system 100 may include multiple scanning units (e.g., two, three, four, or more scanning units 104) each with a field of few such that in the aggregate the horizontal field of view is covered by a 360-degree scan around vehicle 110. One skilled in the art will appreciate that LIDAR system 100 may include any number of scanning units 104 arranged in any manner, each with an 80° to 120° field of view or less, depending on the number of units employed. Moreover, a 360-degree horizontal field of view may be also obtained by mounting a multiple LIDAR systems 100 on vehicle 110, each with a single scanning unit 104. It is nevertheless noted that the one or more LIDAR systems 100 do not have to provide a complete 360° field of view, and that narrower fields of view may be useful in some situations. For example, vehicle 110 may require a first LIDAR system 100 having a field of view of 75° looking ahead of the vehicle, and possibly a second LIDAR system 100 with a similar FOV looking backward (optionally with a lower detection range). It is also noted that different vertical field of view angles may also be implemented.

Figure 1B:
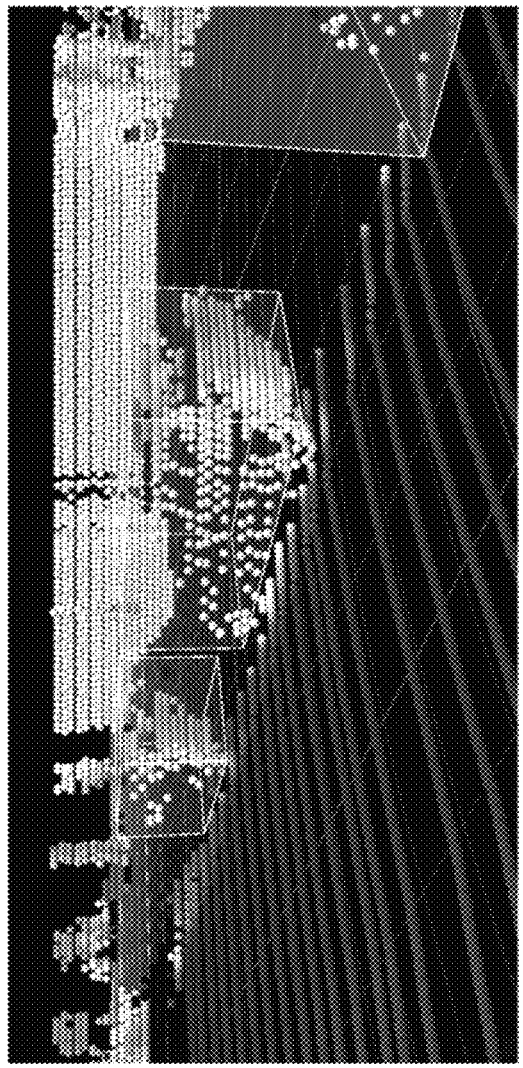
FIG. 1B is an image showing an exemplary output of single scanning cycle of a LIDAR system mounted on a vehicle consistent with disclosed embodiments.

FIG. 1B is an image showing an exemplary output from a single scanning cycle of LIDAR system 100 mounted on vehicle 110 consistent with disclosed embodiments. In this example, scanning unit 104 is incorporated into a right headlight assembly of vehicle 110. Every gray dot in the image corresponds to a location in the environment around vehicle 110 determined from reflections detected by sensing unit 106. In addition to location, each gray dot may also be associated with different types of information, for example, intensity (e.g., how much light returns back from that location), reflectivity, proximity to other dots, and more. In one embodiment, LIDAR system 100 may generate a plurality of point-cloud data entries from detected reflections of multiple scanning cycles of the field of view to enable, for example, determining a point cloud model of the environment around vehicle 110.

Figure 1C:
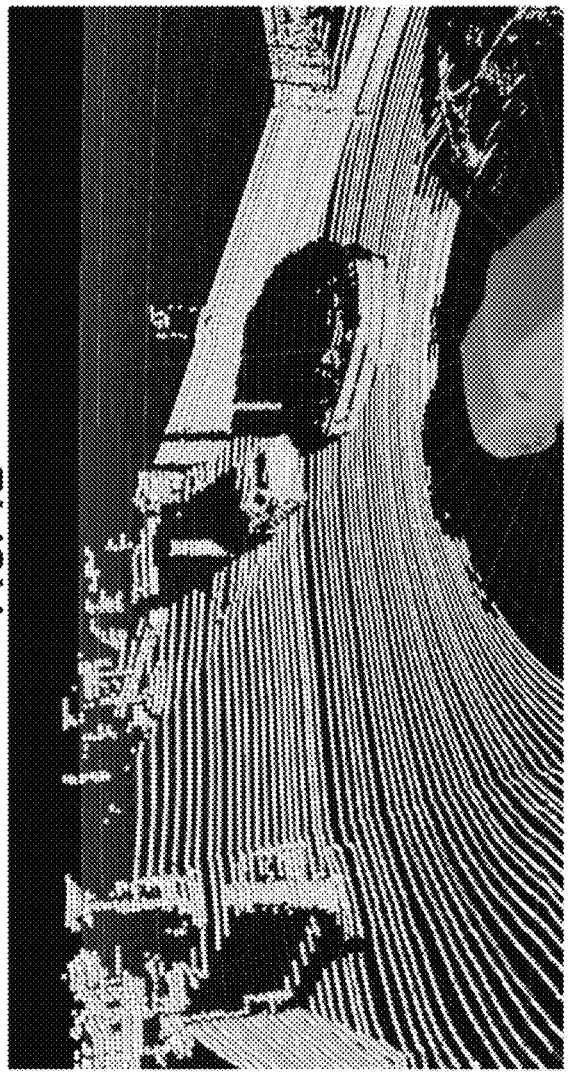
FIG. 1C is another image showing a representation of a point cloud model determined from output of a LIDAR system consistent with disclosed embodiments.

FIG. 1C is an image showing a representation of the point cloud model determined from the output of LIDAR system 100. Consistent with disclosed embodiments, by processing the generated point-cloud data entries of the environment around vehicle 110, a surround-view image may be produced from the point cloud model. In one embodiment, the point cloud model may be provided to a feature extraction module, which processes the point cloud information to identify a plurality of features. Each feature may include data about different aspects of the point cloud and/or of objects in the environment around vehicle 110 (e.g. cars, trees, people, and roads). Features may have the same resolution of the point cloud model (i.e. having the same number of data points, optionally arranged into similar sized 2D arrays), or may have different resolutions. The features may be stored in any kind of data structure (e.g. raster, vector, 2D array, 1D array). In addition, virtual features, such as a representation of vehicle 110, border lines, or bounding boxes separating regions or objects in the image (e.g., as depicted in FIG. 1B), and icons representing one or more identified objects, may be overlaid on the representation of the point cloud model to form the final surround-view image. For example, a symbol of vehicle 110 may be overlaid at a center of the surround-view image.

The Projecting Unit

Figure 2A:
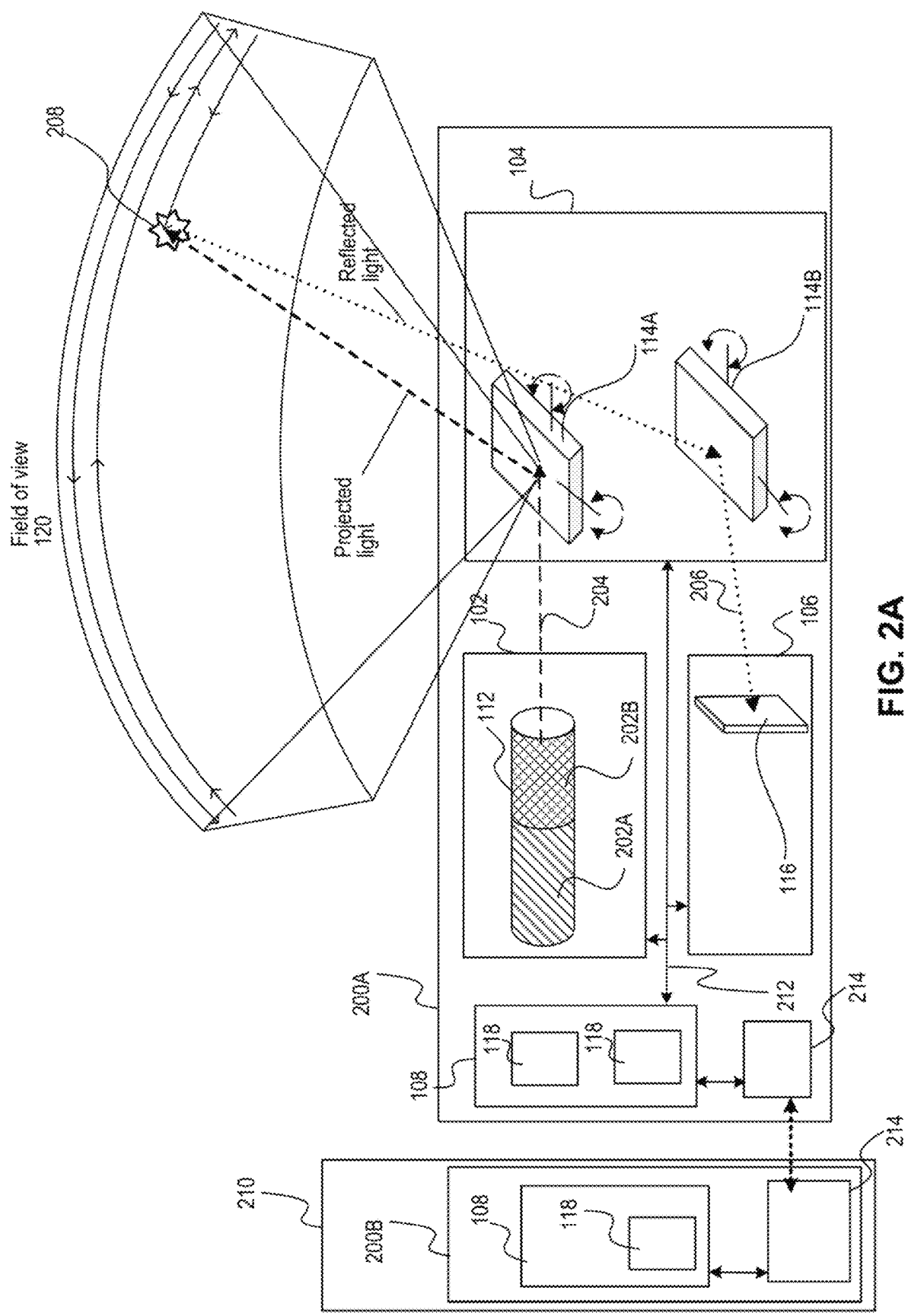
FIGS. 2A, 2B, 2C, 2D, 2E, 2F, and 2G are diagrams illustrating different configurations of projecting units in accordance with some embodiments of the present disclosure.
Figure 2B:
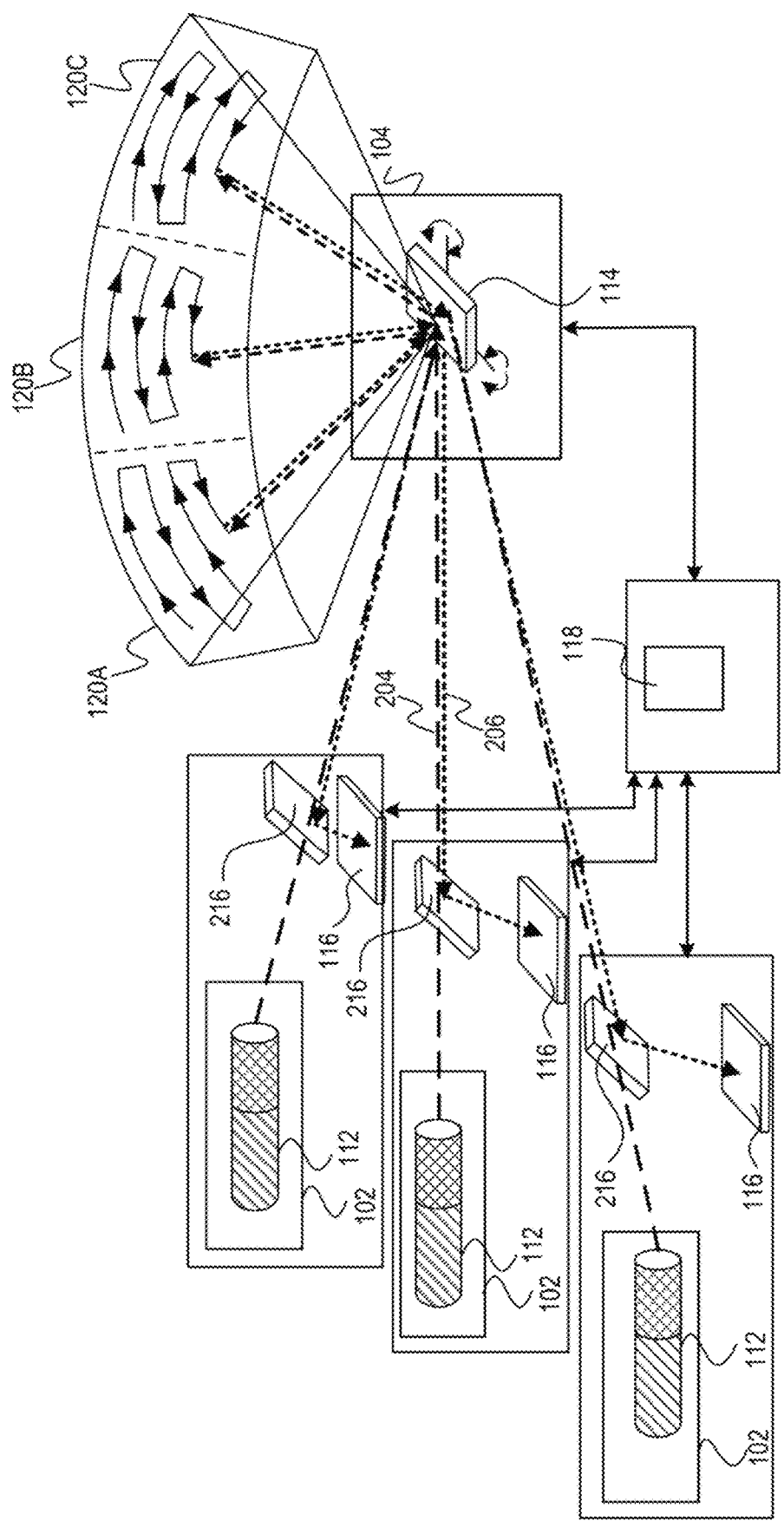
Figure 2C:
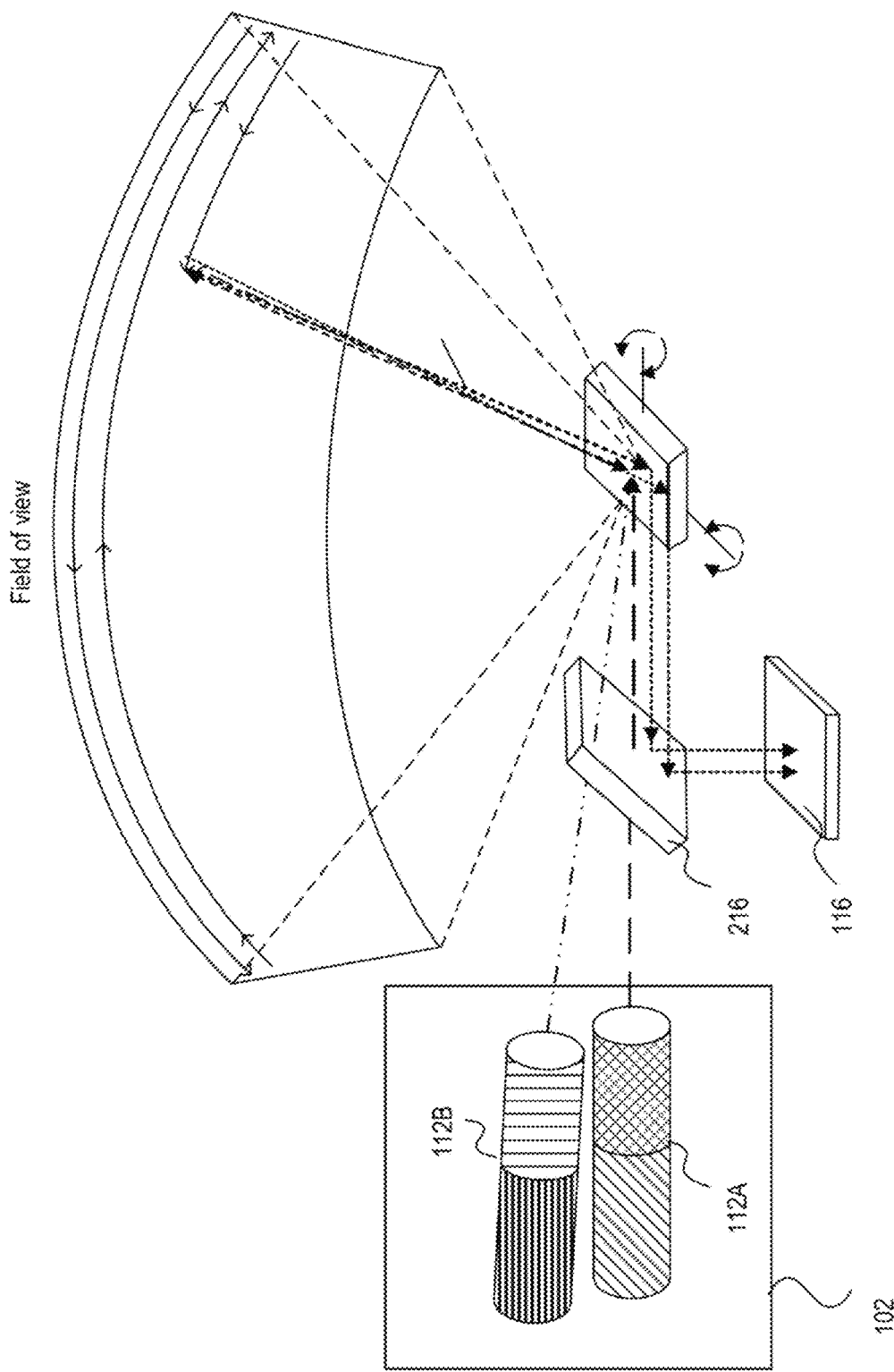
Figure 2D:
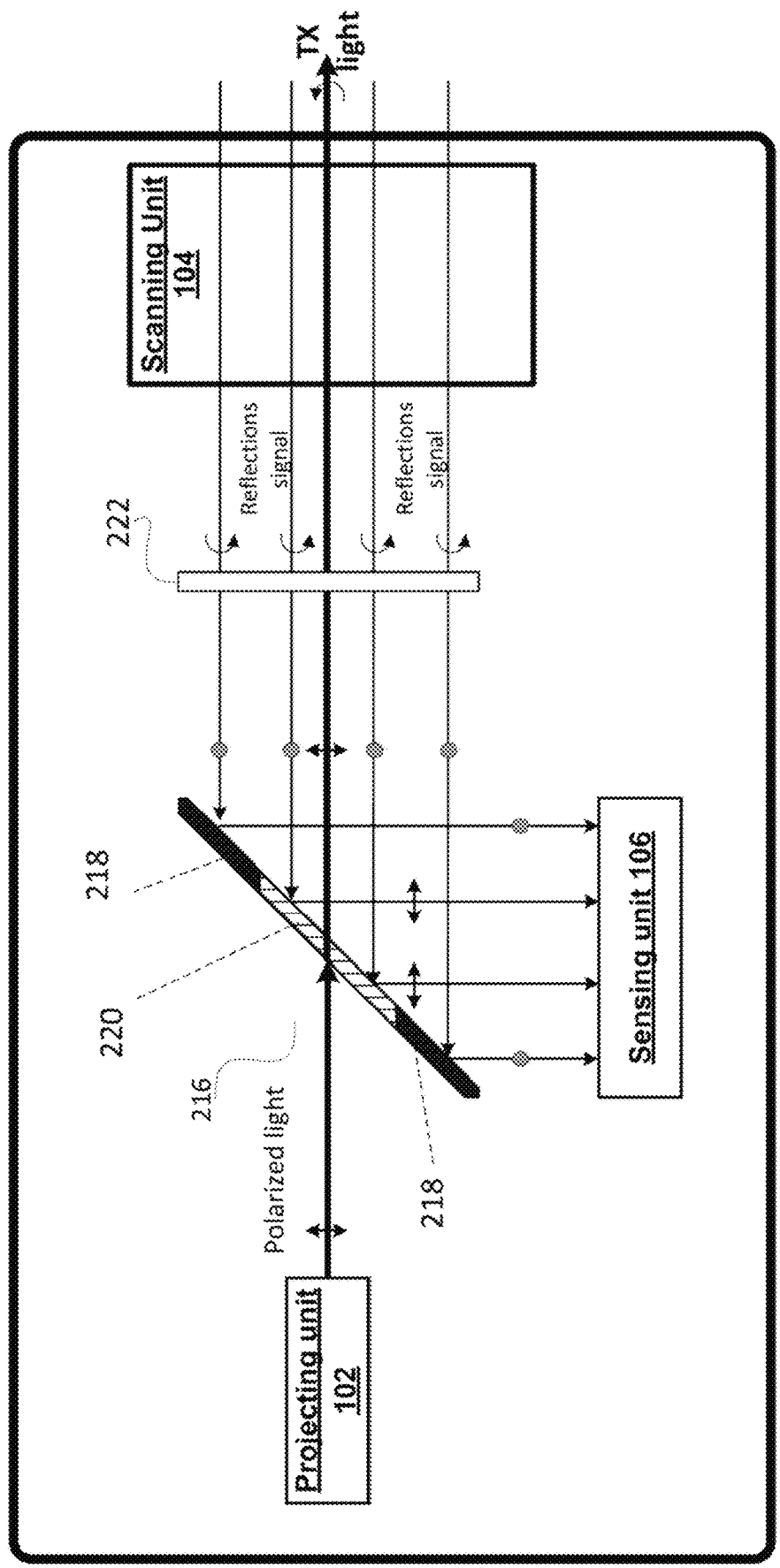
Figure 2E:
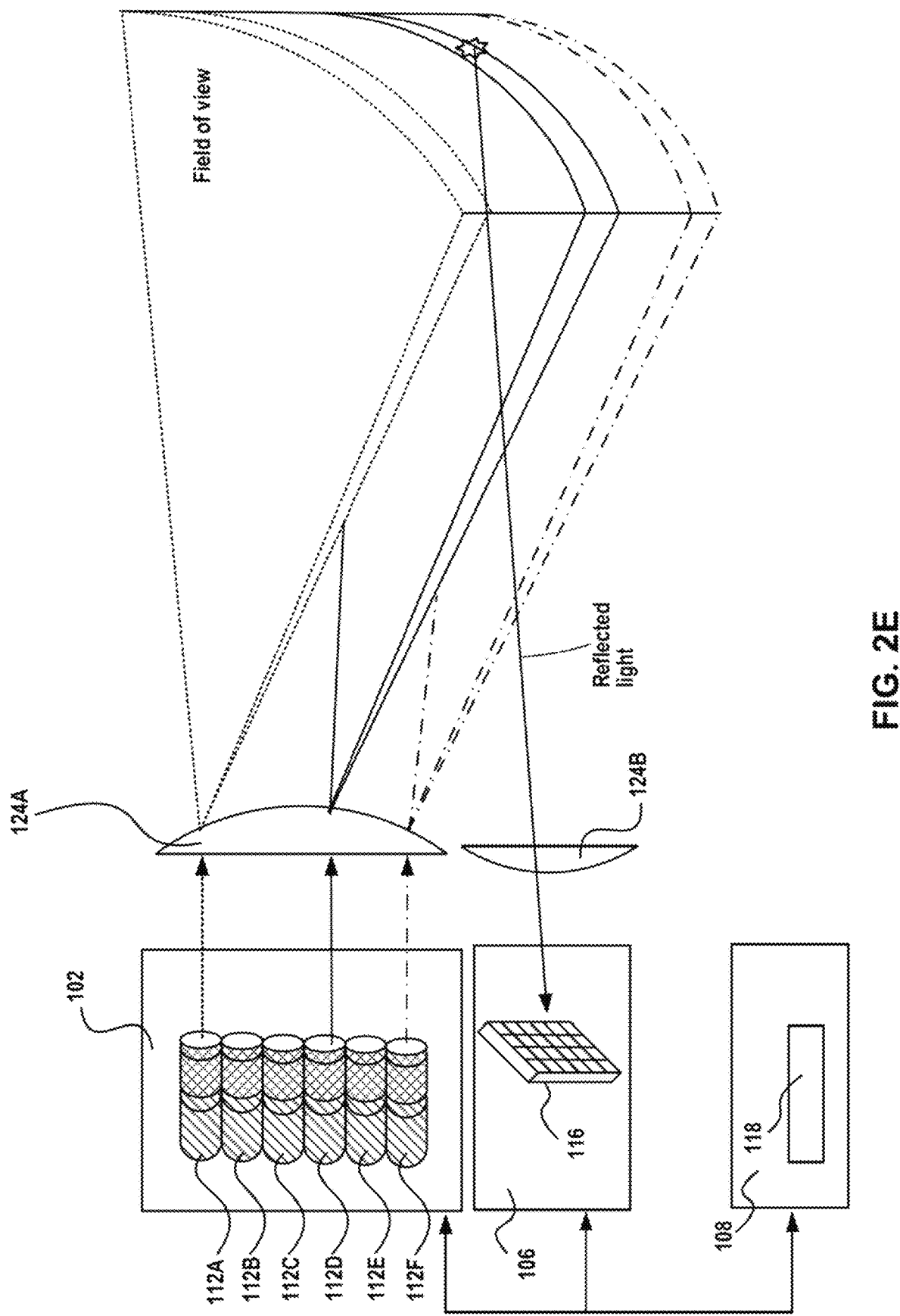
Figure 2F:
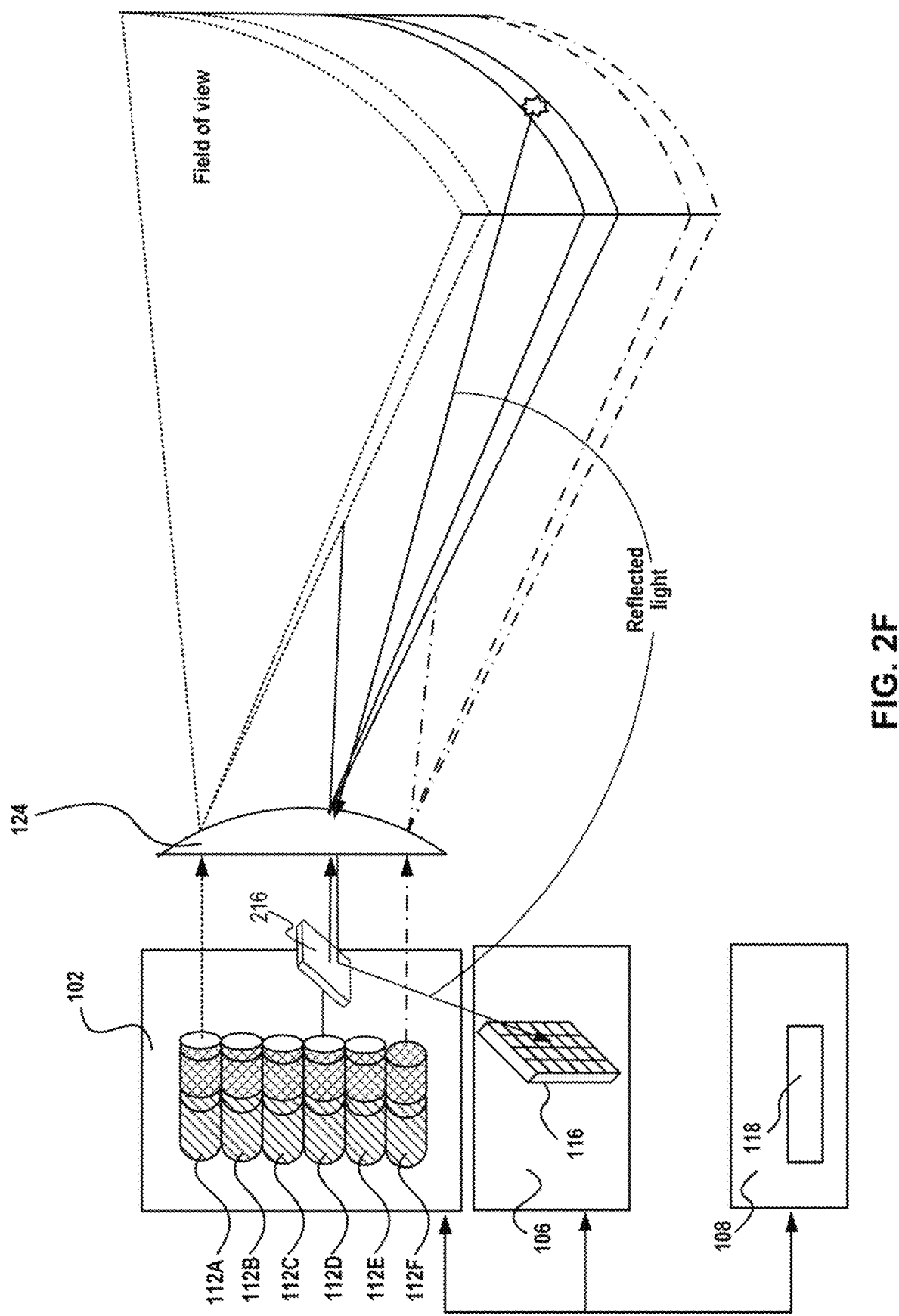
Figure 2G:
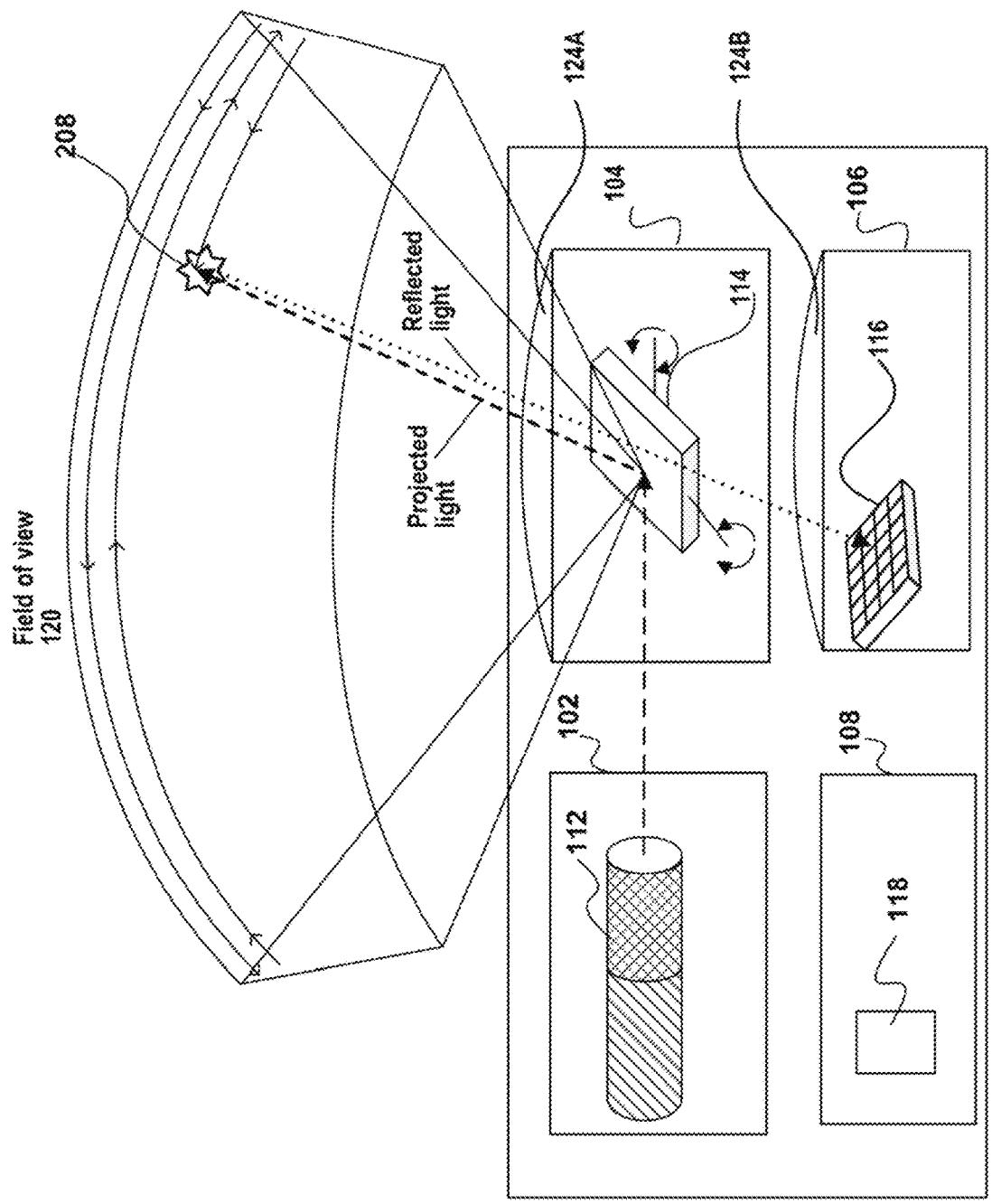

FIGS. 2A-2G depict various configurations of projecting unit 102 and its role in LIDAR system 100. Specifically, FIG. 2A is a diagram illustrating projecting unit 102 with a single light source; FIG. 2B is a diagram illustrating a plurality of projecting units 102 with a plurality of light sources aimed at a common light deflector 114; FIG. 2C is a diagram illustrating projecting unit 102 with a primary and a secondary light sources 112; FIG. 2D is a diagram illustrating an asymmetrical deflector used in some configurations of projecting unit 102; FIG. 2E is a diagram illustrating a first configuration of a non-scanning LIDAR system; FIG. 2F is a diagram illustrating a second configuration of a non-scanning LIDAR system; and FIG. 2G is a diagram illustrating a LIDAR system that scans in the outbound direction and does not scan in the inbound direction. One skilled in the art will appreciate that the depicted configurations of projecting unit 102 may have numerous variations and modifications.

FIG. 2A illustrates an example of a bi-static configuration of LIDAR system 100 in which projecting unit 102 includes a single light source 112. The term "bi-static configuration" broadly refers to LIDAR systems configurations in which the projected light exiting the LIDAR system and the reflected light entering the LIDAR system pass through substantially different optical paths. In some embodiments, a bi-static configuration of LIDAR system 100 may include a separation of the optical paths by using completely different optical components, by using parallel but not fully separated optical components, or by using the same optical components for only part of the of the optical paths (optical components may include, for example, windows, lenses, mirrors, beam splitters, etc.). In the example depicted in FIG. 2A, the bi-static configuration includes a configuration where the outbound light and the inbound light pass through a single optical window 124 but scanning unit 104 includes two light deflectors, a first light deflector 114A for outbound light and a second light deflector 114B for inbound light (the inbound light in LIDAR system includes emitted light reflected from objects in the scene, and may also include ambient light arriving from other sources). In the examples depicted in FIGS. 2E and 2G, the bi-static configuration includes a configuration where the outbound light passes through a first optical window 124A, and the inbound light passes through a second optical window 124B. In all the example configurations above, the inbound and outbound optical paths differ from one another.

In this embodiment, all the components of LIDAR system 100 may be contained within a single housing 200, or may be divided among a plurality of housings. As shown, projecting unit 102 is associated with a single light source 112 that includes a laser diode 202A (or one or more laser diodes coupled together) configured to emit light (projected light 204). In one non-limiting example, the light projected by light source 112 may be at a wavelength between about 800 nm and 950 nm, have an average power between about 50 mW and about 500 mW, have a peak power between about 50 W and about 200 W, and a pulse width of between about 2 ns and about 100 ns. In addition, light source 112 may optionally be associated with optical assembly 202B used for manipulation of the light emitted by laser diode 202A (e.g. for collimation, focusing, etc.). It is noted that other types of light sources 112 may be used, and that the disclosure is not restricted to laser diodes. In addition, light source 112 may emit its light in different formats, such as light pulses, frequency modulated, continuous wave (CW), quasi-CW, or any other form corresponding to the particular light source employed. The projection format and other parameters may be changed by the light source from time to time based on different factors, such as instructions from processing unit 108. The projected light is projected towards an outbound deflector 114A that functions as a steering element for directing the projected light in field of view 120. In this example, scanning unit 104 also include a pivotable return deflector 114B that direct photons (reflected light 206) reflected back from an object 208 within field of view 120 toward sensor 116. The reflected light is detected by sensor 116 and information about the object (e.g., the distance to object 212) is determined by processing unit 108.

In this figure, LIDAR system 100 is connected to a host 210. Consistent with the present disclosure, the term "host" refers to any computing environment that may interface with LIDAR system 100, it may be a vehicle system (e.g., part of vehicle 110), a testing system, a security system, a surveillance system, a traffic control system, an urban modelling system, or any system that monitors its surroundings. Such computing environment may include at least one processor and/or may be connected LIDAR system 100 via the cloud. In some embodiments, host 210 may also include interfaces to external devices such as camera and sensors configured to measure different characteristics of host 210 (e.g., acceleration, steering wheel deflection, reverse drive, etc.). Consistent with the present disclosure, LIDAR system 100 may be fixed to a stationary object associated with host 210 (e.g. a building, a tripod) or to a portable system associated with host 210 (e.g., a portable computer, a movie camera). Consistent with the present disclosure, LIDAR system 100 may be connected to host 210, to provide outputs of LIDAR system 100 (e.g., a 3D model, a reflectivity image) to host 210. Specifically, host 210 may use LIDAR system 100 to aid in detecting and scanning the environment of host 210 or any other environment. In addition, host 210 may integrate, synchronize or otherwise use together the outputs of LIDAR system 100 with outputs of other sensing systems (e.g., cameras, microphones, radar systems). In one example, LIDAR system 100 may be used by a security system. An example of such an embodiment is described below with reference to FIG. 6D.

LIDAR system 100 may also include a bus 212 (or other communication mechanisms) that interconnect subsystems and components for transferring information within LIDAR system 100. Optionally, bus 212 (or another communication mechanism) may be used for interconnecting LIDAR system 100 with host 210. In the example of FIG. 2A, processing unit 108 includes two processors 118 to regulate the operation of projecting unit 102, scanning unit 104, and sensing unit 106 in a coordinated manner based, at least partially, on information received from internal feedback of LIDAR system 100. In other words, processing unit 108 may be configured to dynamically operate LIDAR system 100 in a closed loop. A closed loop system is characterized by having feedback from at least one of the elements and updating one or more parameters based on the received feedback. Moreover, a closed loop system may receive feedback and update its own operation, at least partially, based on that feedback. A dynamic system or element is one that may be updated during operation.

According to some embodiments, scanning the environment around LIDAR system 100 may include illuminating field of view 120 with light pulses. The light pulses may have parameters such as: pulse duration, pulse angular dispersion, wavelength, instantaneous power, photon density at different distances from light source 112, average power, pulse power intensity, pulse width, pulse repetition rate, pulse sequence, pulse duty cycle, wavelength, phase, polarization, and more. Scanning the environment around LIDAR system 100 may also include detecting and characterizing various aspects of the reflected light. Characteristics of the reflected light may include, for example: time-of-flight (i.e., time from emission until detection), instantaneous power (e.g., power signature), average power across entire return pulse, and photon distribution/signal over return pulse period. By comparing characteristics of a light pulse with characteristics of corresponding reflections, a distance and possibly a physical characteristic, such as reflected intensity of object 212 may be estimated. By repeating this process across multiple adjacent portions 122, in a predefined pattern (e.g., raster, Lissajous or other patterns) an entire scan of field of view 120 may be achieved. As discussed below in greater detail, in some situations LIDAR system 100 may direct light to only some of the portions 122 in field of view 120 at every scanning cycle. These portions may be adjacent to each other, but not necessarily so.

In another embodiment, LIDAR system 100 may include network interface 214 for communicating with host 210 (e.g., a vehicle controller). The communication between LIDAR system 100 and host 210 is represented by a dashed arrow. In one embodiment, network interface 214 may include an integrated service digital network (ISDN) card, cable modem, satellite modem, or a modem to provide a data communication connection to a corresponding type of telephone line. As another example, network interface 214 may include a local area network (LAN) card to provide a data communication connection to a compatible LAN. In another embodiment, network interface 214 may include an Ethernet port connected to radio frequency receivers and transmitters and/or optical (e.g., infrared) receivers and transmitters. The specific design and implementation of network interface 214 depends on the communications network(s) over which LIDAR system 100 and host 210 are intended to operate. For example, network interface 214 may be used, for example, to provide outputs of LIDAR system 100 to the external system, such as a 3D model, operational parameters of LIDAR system 100, and so on. In other embodiment, the communication unit may be used, for example, to receive instructions from the external system, to receive information regarding the inspected environment, to receive information from another sensor, etc.

FIG. 2B illustrates an example of a monostatic configuration of LIDAR system 100 including a plurality projecting units 102. The term "monostatic configuration" broadly refers to LIDAR system configurations in which the projected light exiting from the LIDAR system and the reflected light entering the LIDAR system pass through substantially similar optical paths. In one example, the outbound light beam and the inbound light beam may share at least one optical assembly through which both outbound and inbound light beams pass. In another example, the outbound light may pass through an optical window (not shown) and the inbound light radiation may pass through the same optical window. A monostatic configuration may include a configuration where the scanning unit 104 includes a single light deflector 114 that directs the projected light towards field of view 120 and directs the reflected light towards a sensor 116. As shown, both projected light 204 and reflected light 206 hits an asymmetrical deflector 216. The term "asymmetrical deflector" refers to any optical device having two sides capable of deflecting a beam of light hitting it from one side in a different direction than it deflects a beam of light hitting it from the second side. In one example, the asymmetrical deflector does not deflect projected light 204 and deflects reflected light 206 towards sensor 116. One example of an asymmetrical deflector may include a polarization beam splitter. In another example, asymmetrical 216 may include an optical isolator that allows the passage of light in only one direction. A diagrammatic representation of asymmetrical deflector 216 is illustrated in FIG. 2D. Consistent with the present disclosure, a monostatic configuration of LIDAR system 100 may include an asymmetrical deflector to prevent reflected light from hitting light source 112, and to direct all the reflected light toward sensor 116, thereby increasing detection sensitivity.

In the embodiment of FIG. 2B, LIDAR system 100 includes three projecting units 102 each with a single of light source 112 aimed at a common light deflector 114. In one embodiment, the plurality of light sources 112 (including two or more light sources) may project light with substantially the same wavelength and each light source 112 is generally associated with a differing area of the field of view (denoted in the figure as 120A, 120B, and 120C). This enables scanning of a broader field of view than can be achieved with a light source 112. In another embodiment, the plurality of light sources 102 may project light with differing wavelengths, and all the light sources 112 may be directed to the same portion (or overlapping portions) of field of view 120.

FIG. 2C illustrates an example of LIDAR system 100 in which projecting unit 102 includes a primary light source 112A and a secondary light source 112B. Primary light source 112A may project light with a longer wavelength than is sensitive to the human eye in order to optimize SNR and detection range. For example, primary light source 112A may project light with a wavelength between about 750 nm and 1100 nm. In contrast, secondary light source 112B may project light with a wavelength visible to the human eye. For example, secondary light source 112B may project light with a wavelength between about 400 nm and 700 nm. In one embodiment, secondary light source 112B may project light along substantially the same optical path the as light projected by primary light source 112A. Both light sources may be time-synchronized and may project light emission together or in interleaved pattern. An interleave pattern means that the light sources are not active at the same time which may mitigate mutual interference. A person who is of skill in the art would readily see that other combinations of wavelength ranges and activation schedules may also be implemented.

Consistent with some embodiments, secondary light source 112B may cause human eyes to blink when it is too close to the LIDAR optical output port. This may ensure an eye safety mechanism not feasible with typical laser sources that utilize the near-infrared light spectrum. In another embodiment, secondary light source 112B may be used for calibration and reliability at a point of service, in a manner somewhat similar to the calibration of headlights with a special reflector/pattern at a certain height from the ground with respect to vehicle 110. An operator at a point of service could examine the calibration of the LIDAR by simple visual inspection of the scanned pattern over a featured target such a test pattern board at a designated distance from LIDAR system 100. In addition, secondary light source 112B may provide means for operational confidence that the LIDAR is working for the end-user. For example, the system may be configured to permit a human to place a hand in front of light deflector 114 to test its operation.

Secondary light source 112B may also have a non-visible element that can double as a backup system in case primary light source 112A fails. This feature may be useful for fail-safe devices with elevated functional safety ratings. Given that secondary light source 112B may be visible and also due to reasons of cost and complexity, secondary light source 112B may be associated with a smaller power compared to primary light source 112A. Therefore, in case of a failure of primary light source 112A, the system functionality will fall back to secondary light source 112B set of functionalities and capabilities. While the capabilities of secondary light source 112B may be inferior to the capabilities of primary light source 112A, LIDAR system 100 system may be designed in such a fashion to enable vehicle 110 to safely arrive its destination.

FIG. 2D illustrates asymmetrical deflector 216 that may be part of LIDAR system 100. In the illustrated example, asymmetrical deflector 216 includes a reflective surface 218 (such as a mirror) and a one-way deflector 220. While not necessarily so, asymmetrical deflector 216 may optionally be a static deflector. Asymmetrical deflector 216 may be used in a monostatic configuration of LIDAR system 100, in order to allow a common optical path for transmission and for reception of light via the at least one deflector 114, e.g., as illustrated in FIGS. 2B and 2C. However, typical asymmetrical deflectors such as beam splitters are characterized by energy losses, especially in the reception path, which may be more sensitive to power loses than the transmission path.

As depicted in FIG. 2D, LIDAR system 100 may include asymmetrical deflector 216 positioned in the transmission path, which includes one-way deflector 220 for separating between the transmitted and received light signals. Optionally, one-way deflector 220 may be substantially transparent to the transmission light and substantially reflective to the received light. The transmitted light is generated by projecting unit 102 and may travel through one-way deflector 220 to scanning unit 104 which deflects it towards the optical outlet. The received light arrives through the optical inlet, to the at least one deflecting element 114, which deflects the reflections signal into a separate path away from the light source and towards sensing unit 106. Optionally, asymmetrical deflector 216 may be combined with a polarized light source 112 which is linearly polarized with the same polarization axis as one-way deflector 220. Notably, the cross-section of the outbound light beam is much smaller than that of the reflections signals. Accordingly, LIDAR system 100 may include one or more optical components (e.g. lens, collimator) for focusing or otherwise manipulating the emitted polarized light beam to the dimensions of the asymmetrical deflector 216. In one embodiment, one-way deflector 220 may be a polarizing beam splitter that is virtually transparent to the polarized light beam.

Consistent with some embodiments, LIDAR system 100 may further include optics 222 (e.g., a quarter wave plate retarder) for modifying a polarization of the emitted light. For example, optics 222 may modify a linear polarization of the emitted light beam to circular polarization. Light reflected back to system 100 from the field of view would arrive back through deflector 114 to optics 222, bearing a circular polarization with a reversed handedness with respect to the transmitted light. Optics 222 would then convert the received reversed handedness polarization light to a linear polarization that is not on the same axis as that of the polarized beam splitter 216. As noted above, the received light-patch is larger than the transmitted light-patch, due to optical dispersion of the beam traversing through the distance to the target.

Some of the received light will impinge on one-way deflector 220 that will reflect the light towards sensor 106 with some power loss. However, another part of the received patch of light will fall on a reflective surface 218 which surrounds one-way deflector 220 (e.g., polarizing beam splitter slit). Reflective surface 218 will reflect the light towards sensing unit 106 with substantially zero power loss. One-way deflector 220 would reflect light that is composed of various polarization axes and directions that will eventually arrive at the detector. Optionally, sensing unit 106 may include sensor 116 that is agnostic to the laser polarization, and is primarily sensitive to the amount of impinging photons at a certain wavelength range.

It is noted that the proposed asymmetrical deflector 216 provides far superior performances when compared to a simple mirror with a passage hole in it. In a mirror with a hole, all of the reflected light which reaches the hole is lost to the detector. However, in deflector 216, one-way deflector 220 deflects a significant portion of that light (e.g., about 50%) toward the respective sensor 116. In LIDAR systems, the number photons reaching the LIDAR from remote distances is very limited, and therefore the improvement in photon capture rate is important.

According to some embodiments, a device for beam splitting and steering is described. A polarized beam may be emitted from a light source having a first polarization. The emitted beam may be directed to pass through a polarized beam splitter assembly. The polarized beam splitter assembly includes on a first side a one-directional slit and on an opposing side a mirror. The one-directional slit enables the polarized emitted beam to travel toward a quarter-wave-plate/wave-retarder which changes the emitted signal from a polarized signal to a linear signal (or vice versa) so that subsequently reflected beams cannot travel through the one-directional slit.

FIG. 2E shows an example of a bi-static configuration of LIDAR system 100 without scanning unit 104. In order to illuminate an entire field of view (or substantially the entire field of view) without deflector 114, projecting unit 102 may optionally include an array of light sources (e.g., 112A-112F). In one embodiment, the array of light sources may include a linear array of light sources controlled by processor 118. For example, processor 118 may cause the linear array of light sources to sequentially project collimated laser beams towards first optional optical window 124A. First optional optical window 124A may include a diffuser lens for spreading the projected light and sequentially forming wide horizontal and narrow vertical beams. Optionally, some or all of the at least one light source 112 of system 100 may project light concurrently. For example, processor 118 may cause the array of light sources to simultaneously project light beams from a plurality of non-adjacent light sources 112. In the depicted example, light source 112A, light source 112D, and light source 112F simultaneously project laser beams towards first optional optical window 124A thereby illuminating the field of view with three narrow vertical beams. The light beam from fourth light source 112D may reach an object in the field of view. The light reflected from the object may be captured by second optical window 124B and may be redirected to sensor 116. The configuration depicted in FIG. 2E is considered to be a bi-static configuration because the optical paths of the projected light and the reflected light are substantially different. It is noted that projecting unit 102 may also include a plurality of light sources 112 arranged in non-linear configurations, such as a two dimensional array, in hexagonal tiling, or in any other way.

FIG. 2F illustrates an example of a monostatic configuration of LIDAR system 100 without scanning unit 104. Similar to the example embodiment represented in FIG. 2E, in order to illuminate an entire field of view without deflector 114, projecting unit 102 may include an array of light sources (e.g., 112A-112F). But, in contrast to FIG. 2E, this configuration of LIDAR system 100 may include a single optical window 124 for both the projected light and for the reflected light. Using asymmetrical deflector 216, the reflected light may be redirected to sensor 116. The configuration depicted in FIG. 2E is considered to be a monostatic configuration because the optical paths of the projected light and the reflected light are substantially similar to one another. The term "substantially similar" in the context of the optical paths of the projected light and the reflected light means that the overlap between the two optical paths may be more than 80%, more than 85%, more than 90%, or more than 95%.

FIG. 2G illustrates an example of a bi-static configuration of LIDAR system 100. The configuration of LIDAR system 100 in this figure is similar to the configuration shown in FIG. 2A. For example, both configurations include a scanning unit 104 for directing projected light in the outbound direction toward the field of view. But, in contrast to the embodiment of FIG. 2A, in this configuration, scanning unit 104 does not redirect the reflected light in the inbound direction. Instead the reflected light passes through second optical window 124B and enters sensor 116. The configuration depicted in FIG. 2G is considered to be a bi-static configuration because the optical paths of the projected light and the reflected light are substantially different from one another. The term "substantially different" in the context of the optical paths of the projected light and the reflected light means that the overlap between the two optical paths may be less than 10%, less than 5%, less than 1%, or less than 0.25%.

The Scanning Unit

Figure 3A:
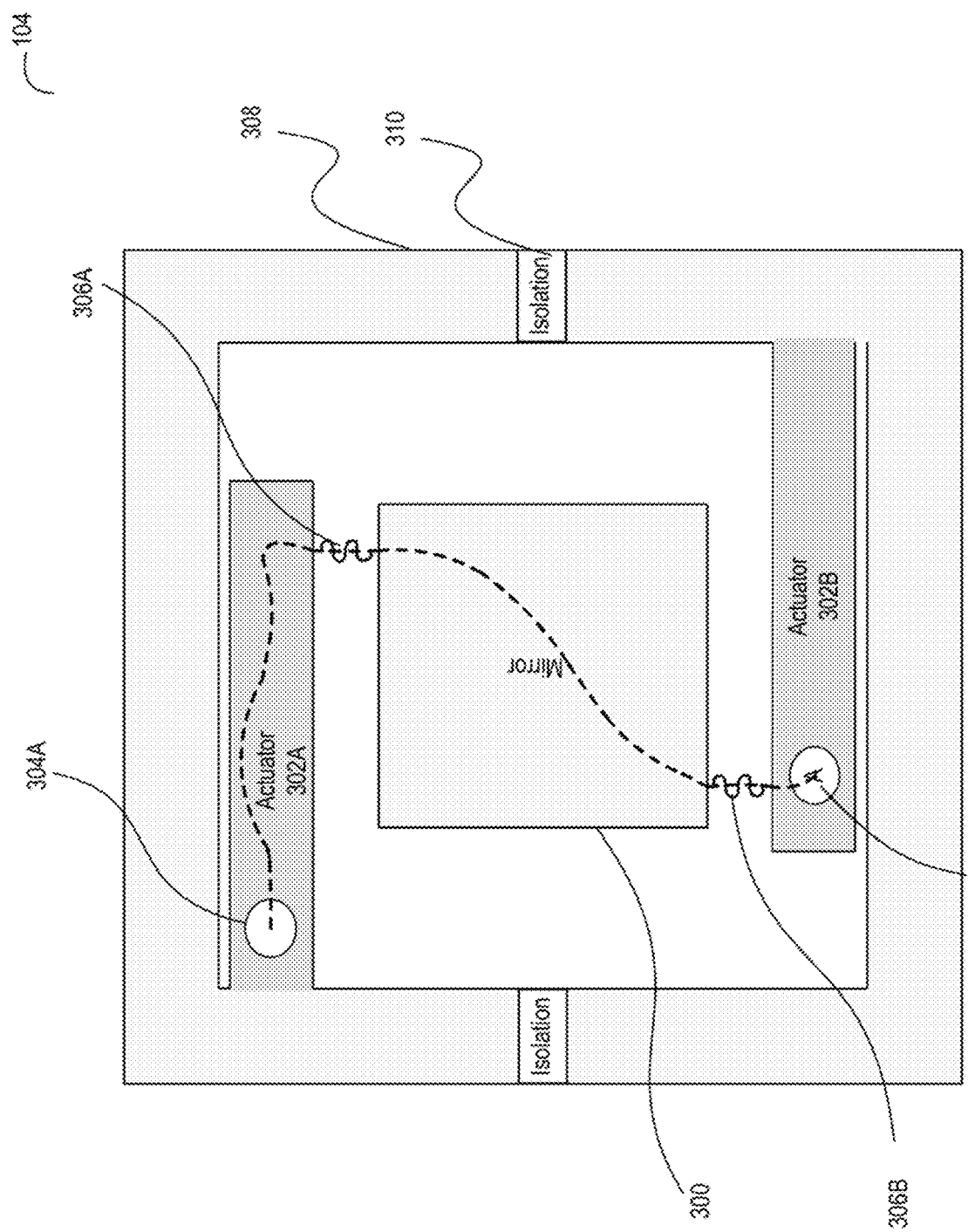
FIGS. 3A, 3B, 3C, and 3D are diagrams illustrating different configurations of scanning units in accordance with some embodiments of the present disclosure.
Figure 3B:
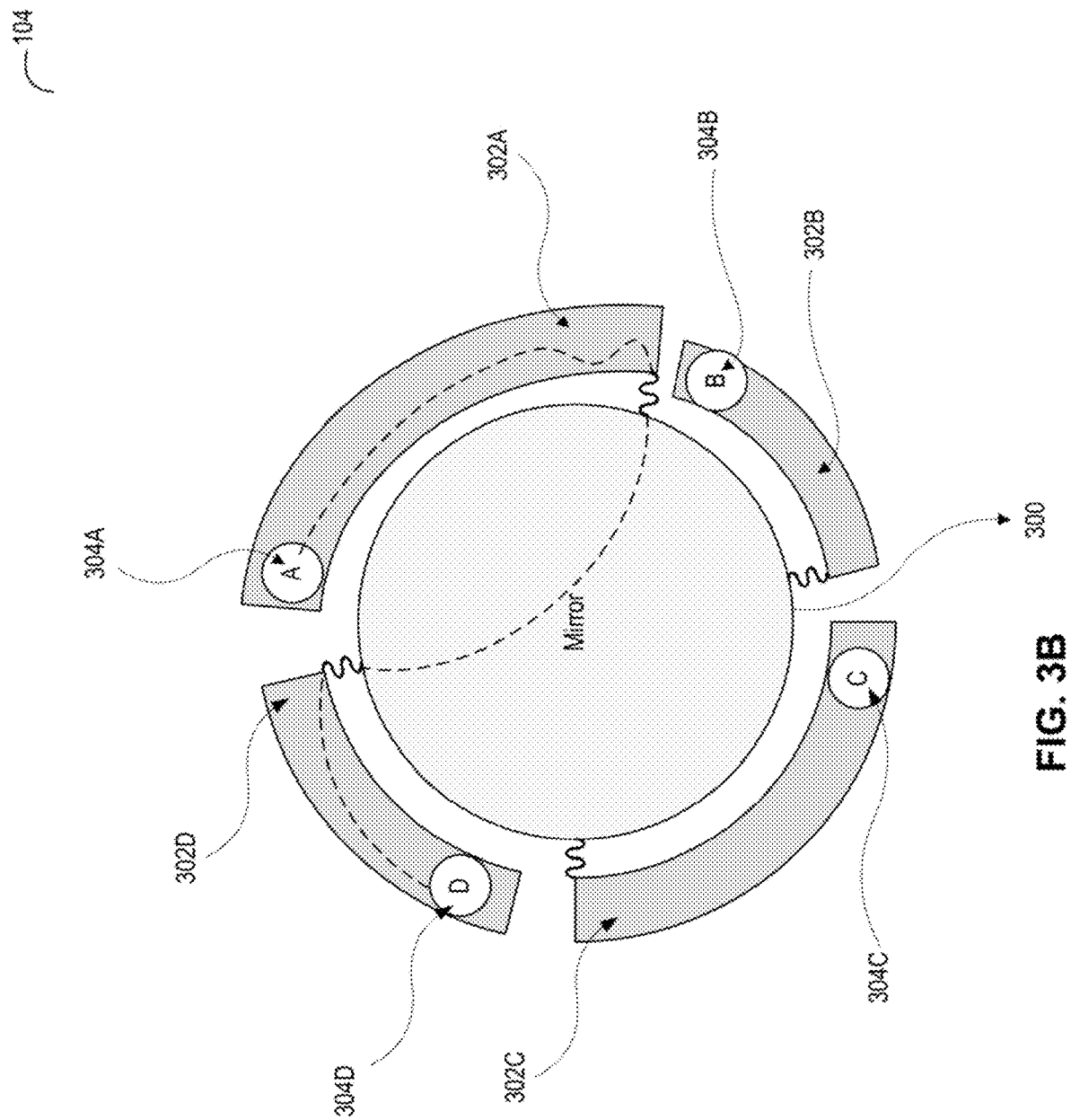
Figure 3C:
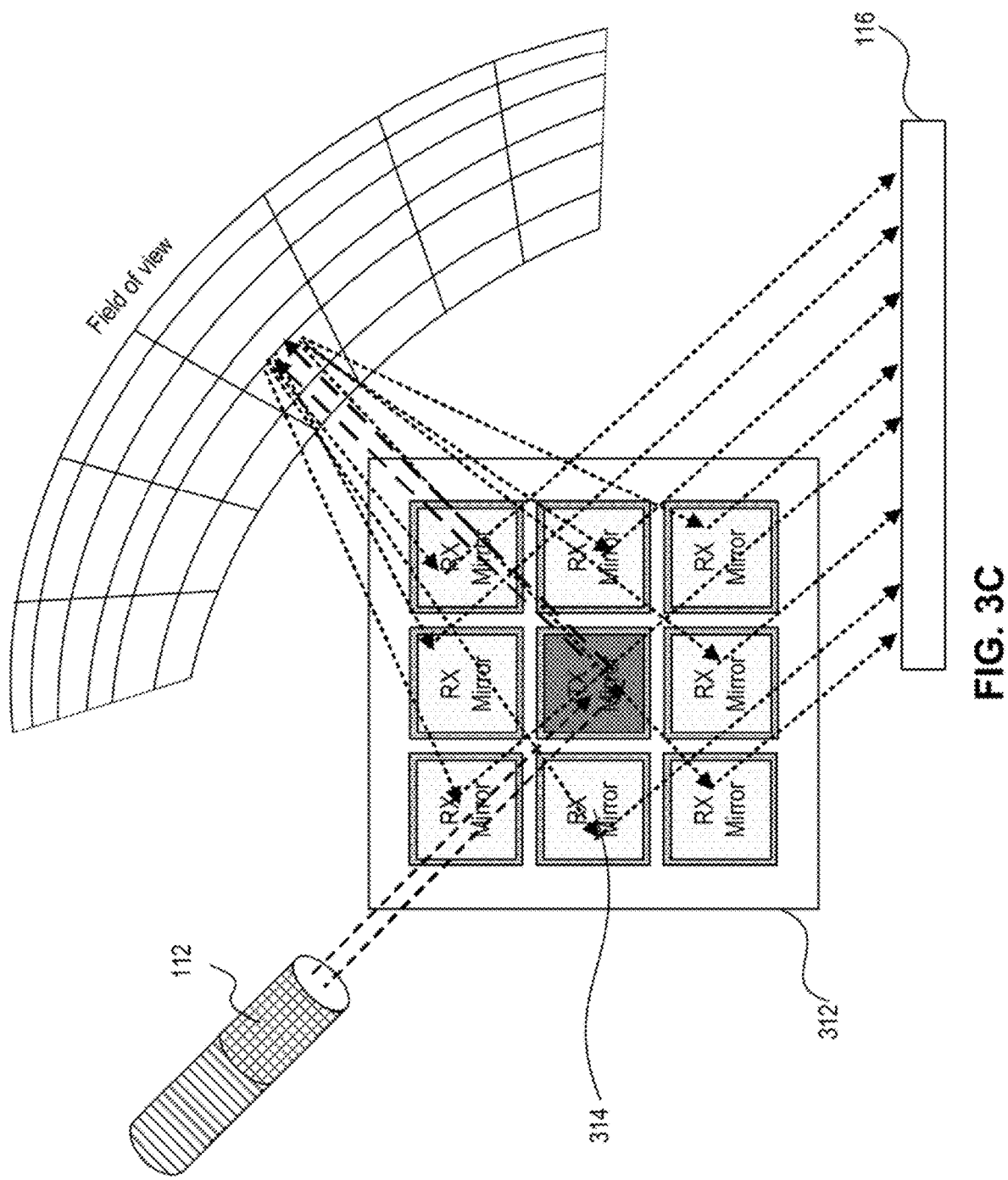
Figure 3D:
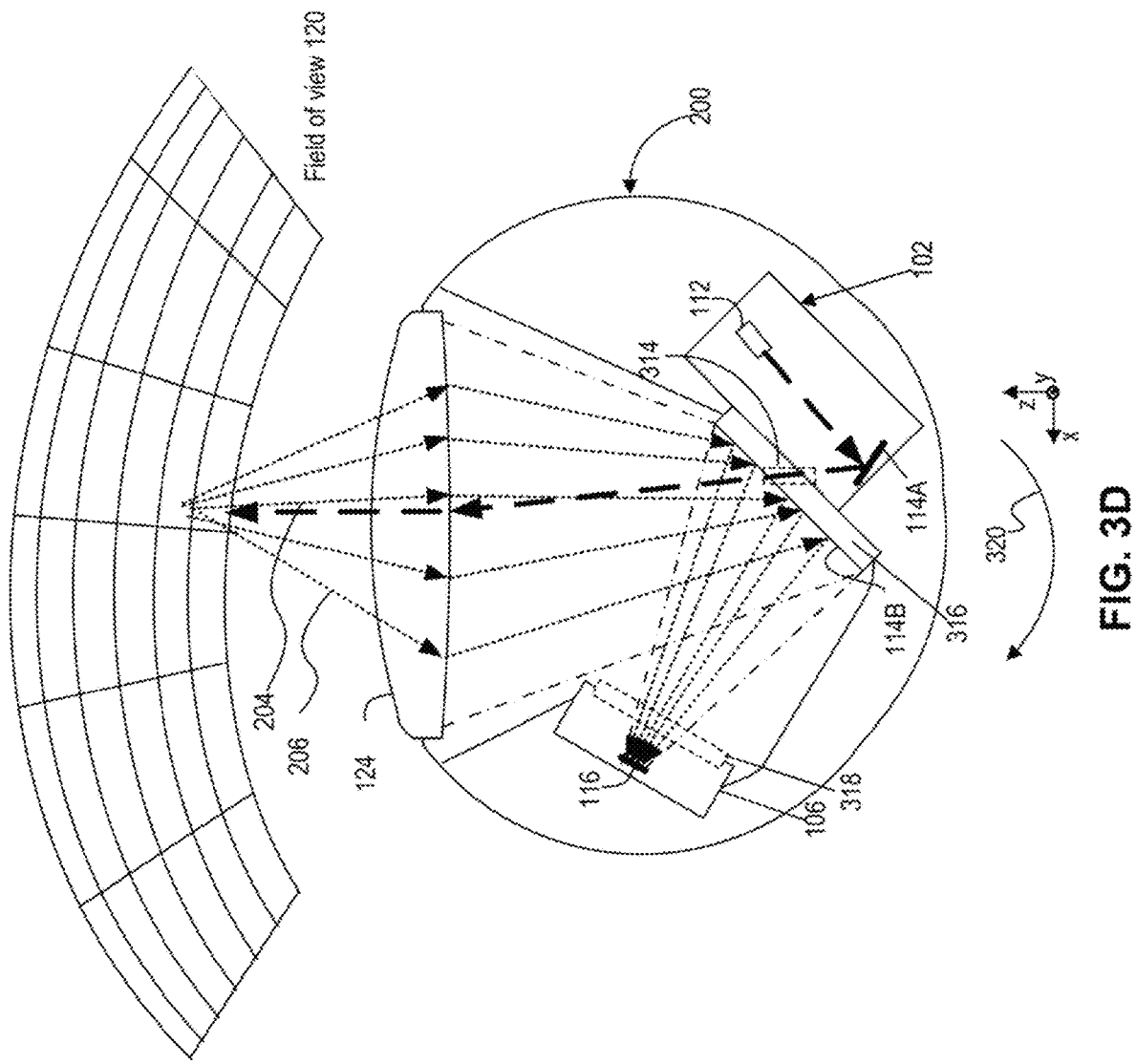

FIGS. 3A-3D depict various configurations of scanning unit 104 and its role in LIDAR system 100. Specifically, FIG. 3A is a diagram illustrating scanning unit 104 with a MEMS mirror (e.g., square shaped), FIG. 3B is a diagram illustrating another scanning unit 104 with a MEMS mirror (e.g., round shaped), FIG. 3C is a diagram illustrating scanning unit 104 with an array of reflectors used for monostatic scanning LIDAR system, and FIG. 3D is a diagram illustrating an example LIDAR system 100 that mechanically scans the environment around LIDAR system 100. One skilled in the art will appreciate that the depicted configurations of scanning unit 104 are exemplary only, and may have numerous variations and modifications within the scope of this disclosure.

FIG. 3A illustrates an example scanning unit 104 with a single axis square MEMS mirror 300. In this example MEMS mirror 300 functions as at least one deflector 114. As shown, scanning unit 104 may include one or more actuators 302 (specifically, 302A and 302B). In one embodiment, actuator 302 may be made of semiconductor (e.g., silicon) and includes a piezoelectric layer (e.g. PZT, Lead zirconate titanate, aluminum nitride), which changes its dimension in response to electric signals applied by an actuation controller, a semi conductive layer, and a base layer. In one embodiment, the physical properties of actuator 302 may determine the mechanical stresses that actuator 302 experiences when electrical current passes through it. When the piezoelectric material is activated it exerts force on actuator 302 and causes it to bend. In one embodiment, the resistivity of one or more actuators 302 may be measured in an active state (Ractive) when mirror 300 is deflected at a certain angular position and compared to the resistivity at a resting state (Rrest). Feedback including Ractive may provide information to determine the actual mirror deflection angle compared to an expected angle, and, if needed, mirror 300 deflection may be corrected. The difference between Rrest and Ractive may be correlated by a mirror drive into an angular deflection value that may serve to close the loop. This embodiment may be used for dynamic tracking of the actual mirror position and may optimize response, amplitude, deflection efficiency, and frequency for both linear mode and resonant mode MEMS mirror schemes. This embodiment is described in greater detail below with reference to FIGS. 32-34.

During scanning, current (represented in the figure as the dashed line) may flow from contact 304A to contact 304B (through actuator 302A, spring 306A, mirror 300, spring 306B, and actuator 302B). Isolation gaps in semiconducting frame 308 such as isolation gap 310 may cause actuator 302A and 302B to be two separate islands connected electrically through springs 306 and frame 308. The current flow, or any associated electrical parameter (voltage, current frequency, capacitance, relative dielectric constant, etc.), may be monitored by an associated position feedback. In case of a mechanical failure—where one of the components is damaged—the current flow through the structure would alter and change from its functional calibrated values. At an extreme situation (for example, when a spring is broken), the current would stop completely due to a circuit break in the electrical chain by means of a faulty element.

FIG. 3B illustrates another example scanning unit 104 with a dual axis round MEMS mirror 300. In this example MEMS mirror 300 functions as at least one deflector 114. In one embodiment, MEMS mirror 300 may have a diameter of between about 1 mm to about 5 mm. As shown, scanning unit 104 may include four actuators 302 (302A, 302B, 302C, and 302D) each may be at a differing length. In the illustrated example, the current (represented in the figure as the dashed line) flows from contact 304A to contact 304D, but in other cases current may flow from contact 304A to contact 304B, from contact 304A to contact 304C, from contact 304B to contact 304C, from contact 304B to contact 304D, or from contact 304C to contact 304D. Consistent with some embodiments, a dual axis MEMS mirror may be configured to deflect light in a horizontal direction and in a vertical direction. For example, the angles of deflection of a dual axis MEMS mirror may be between about 0° to 30° in the vertical direction and between about 0° to 50° in the horizontal direction. One skilled in the art will appreciate that the depicted configuration of mirror 300 may have numerous variations and modifications. In one example, at least of deflector 114 may have a dual axis square-shaped mirror or single axis round-shaped mirror. Examples of round and square mirror are depicted in FIGS. 3A and 3B as examples only. Any shape may be employed depending on system specifications. In one embodiment, actuators 302 may be incorporated as an integral part of at least of deflector 114, such that power to move MEMS mirror 300 is applied directly towards it. In addition, MEMS mirror 300 may be connected to frame 308 by one or more rigid supporting elements. In another embodiment, at least of deflector 114 may include an electrostatic or electromagnetic MEMS mirror.

As described above, a monostatic scanning LIDAR system utilizes at least a portion of the same optical path for emitting projected light 204 and for receiving reflected light 206. The light beam in the outbound path may be collimated and focused into a narrow beam while the reflections in the return path spread into a larger patch of light, due to dispersion. In one embodiment, scanning unit 104 may have a large reflection area in the return path and asymmetrical deflector 216 that redirects the reflections (i.e., reflected light 206) to sensor 116. In one embodiment, scanning unit 104 may include a MEMS mirror with a large reflection area and negligible impact on the field of view and the frame rate performance. Additional details about the asymmetrical deflector 216 are provided below with reference to FIG. 2D.

In some embodiments (e.g. as exemplified in FIG. 3C), scanning unit 104 may include a deflector array (e.g. a reflector array) with small light deflectors (e.g. mirrors). In one embodiment, implementing light deflector 114 as a group of smaller individual light deflectors working in synchronization may allow light deflector 114 to perform at a high scan rate with larger angles of deflection. The deflector array may essentially act as a large light deflector (e.g. a large mirror) in terms of effective area. The deflector array may be operated using a shared steering assembly configuration that allows sensor 116 to collect reflected photons from substantially the same portion of field of view 120 being concurrently illuminated by light source 112. The term "concurrently" means that the two selected functions occur during coincident or overlapping time periods, either where one begins and ends during the duration of the other, or where a later one starts before the completion of the other.

FIG. 3C illustrates an example of scanning unit 104 with a reflector array 312 having small mirrors. In this embodiment, reflector array 312 functions as at least one deflector 114. Reflector array 312 may include a plurality of reflector units 314 configured to pivot (individually or together) and steer light pulses toward field of view 120. For example, reflector array 312 may be a part of an outbound path of light projected from light source 112. Specifically, reflector array 312 may direct projected light 204 towards a portion of field of view 120. Reflector array 312 may also be part of a return path for light reflected from a surface of an object located within an illumined portion of field of view 120. Specifically, reflector array 312 may direct reflected light 206 towards sensor 116 or towards asymmetrical deflector 216. In one example, the area of reflector array 312 may be between about 75 to about 150 mm$^2$, where each reflector units 314 may have a width of about 10 μm and the supporting structure may be lower than 100 μm.

According to some embodiments, reflector array 312 may include one or more sub-groups of steerable deflectors. Each sub-group of electrically steerable deflectors may include one or more deflector units, such as reflector unit 314. For example, each steerable deflector unit 314 may include at least one of a MEMS mirror, a reflective surface assembly, and an electromechanical actuator. In one embodiment, each reflector unit 314 may be individually controlled by an individual processor (not shown), such that it may tilt towards a specific angle along each of one or two separate axes. Alternatively, reflector array 312 may be associated with a common controller (e.g., processor 118) configured to synchronously manage the movement of reflector units 314 such that at least part of them will pivot concurrently and point in approximately the same direction.

In addition, at least one processor 118 may select at least one reflector unit 314 for the outbound path (referred to hereinafter as "TX Mirror") and a group of reflector units 314 for the return path (referred to hereinafter as "RX Mirror"). Consistent with the present disclosure, increasing the number of TX Mirrors may increase a reflected photons beam spread. Additionally, decreasing the number of RX Mirrors may narrow the reception field and compensate for ambient light conditions (such as clouds, rain, fog, extreme heat, and other environmental conditions) and improve the signal to noise ratio. Also, as indicated above, the emitted light beam is typically narrower than the patch of reflected light, and therefore can be fully deflected by a small portion of the deflection array. Moreover, it is possible to block light reflected from the portion of the deflection array used for transmission (e.g. the TX mirror) from reaching sensor 116, thereby reducing an effect of internal reflections of the LIDAR system 100 on system operation. In addition, at least one processor 118 may pivot one or more reflector units 314 to overcome mechanical impairments and drifts due, for example, to thermal and gain effects. In an example, one or more reflector units 314 may move differently than intended (frequency, rate, speed etc.) and their movement may be compensated for by electrically controlling the deflectors appropriately.

FIG. 3D illustrates an exemplary LIDAR system 100 that mechanically scans the environment of LIDAR system 100. In this example, LIDAR system 100 may include a motor or other mechanisms for rotating housing 200 about the axis of the LIDAR system 100. Alternatively, the motor (or other mechanism) may mechanically rotate a rigid structure of LIDAR system 100 on which one or more light sources 112 and one or more sensors 116 are installed, thereby scanning the environment. As described above, projecting unit 102 may include at least one light source 112 configured to project light emission. The projected light emission may travel along an outbound path towards field of view 120. Specifically, the projected light emission may be reflected by deflector 114A through an exit aperture 314 when projected light 204 travel towards optional optical window 124. The reflected light emission may travel along a return path from object 208 towards sensing unit 106. For example, the reflected light 206 may be reflected by deflector 114B when reflected light 206 travels towards sensing unit 106. A person skilled in the art would appreciate that a LIDAR system with a rotation mechanism for synchronically rotating one or more light sources or one or more sensors, may use this synchronized rotation instead of (or in addition to) steering an internal light deflector.

In embodiments in which the scanning of field of view 120 is mechanical, the projected light emission may be directed to exit aperture 314 that is part of a wall 316 separating projecting unit 102 from other parts of LIDAR system 100. In some examples, wall 316 can be formed from a transparent material (e.g., glass) coated with a reflective material to form deflector 114B. In this example, exit aperture 314 may correspond to the portion of wall 316 that is not coated by the reflective material. Additionally, or alternatively, exit aperture 314 may include a hole or cutaway in the wall 316. Reflected light 206 may be reflected by deflector 114B and directed towards an entrance aperture 318 of sensing unit 106. In some examples, an entrance aperture 318 may include a filtering window configured to allow wavelengths in a certain wavelength range to enter sensing unit 106 and attenuate other wavelengths. The reflections of object 208 from field of view 120 may be reflected by deflector 114B and hit sensor 116. By comparing several properties of reflected light 206 with projected light 204, at least one aspect of object 208 may be determined. For example, by comparing a time when projected light 204 was emitted by light source 112 and a time when sensor 116 received reflected light 206, a distance between object 208 and LIDAR system 100 may be determined. In some examples, other aspects of object 208, such as shape, color, material, etc. may also be determined.

In some examples, the LIDAR system 100 (or part thereof, including at least one light source 112 and at least one sensor 116) may be rotated about at least one axis to determine a three-dimensional map of the surroundings of the LIDAR system 100. For example, the LIDAR system 100 may be rotated about a substantially vertical axis as illustrated by arrow 320 in order to scan field of 120. Although FIG. 3D illustrates that the LIDAR system 100 is rotated clock-wise about the axis as illustrated by the arrow 320, additionally or alternatively, the LIDAR system 100 may be rotated in a counterclockwise direction. In some examples, the LIDAR system 100 may be rotated 360 degrees about the vertical axis. In other examples, the LIDAR system 100 may be rotated back and forth along a sector smaller than 360-degree of the LIDAR system 100. For example, the LIDAR system 100 may be mounted on a platform that wobbles back and forth about the axis without making a complete rotation.

The Sensing Unit

Figure 4A:
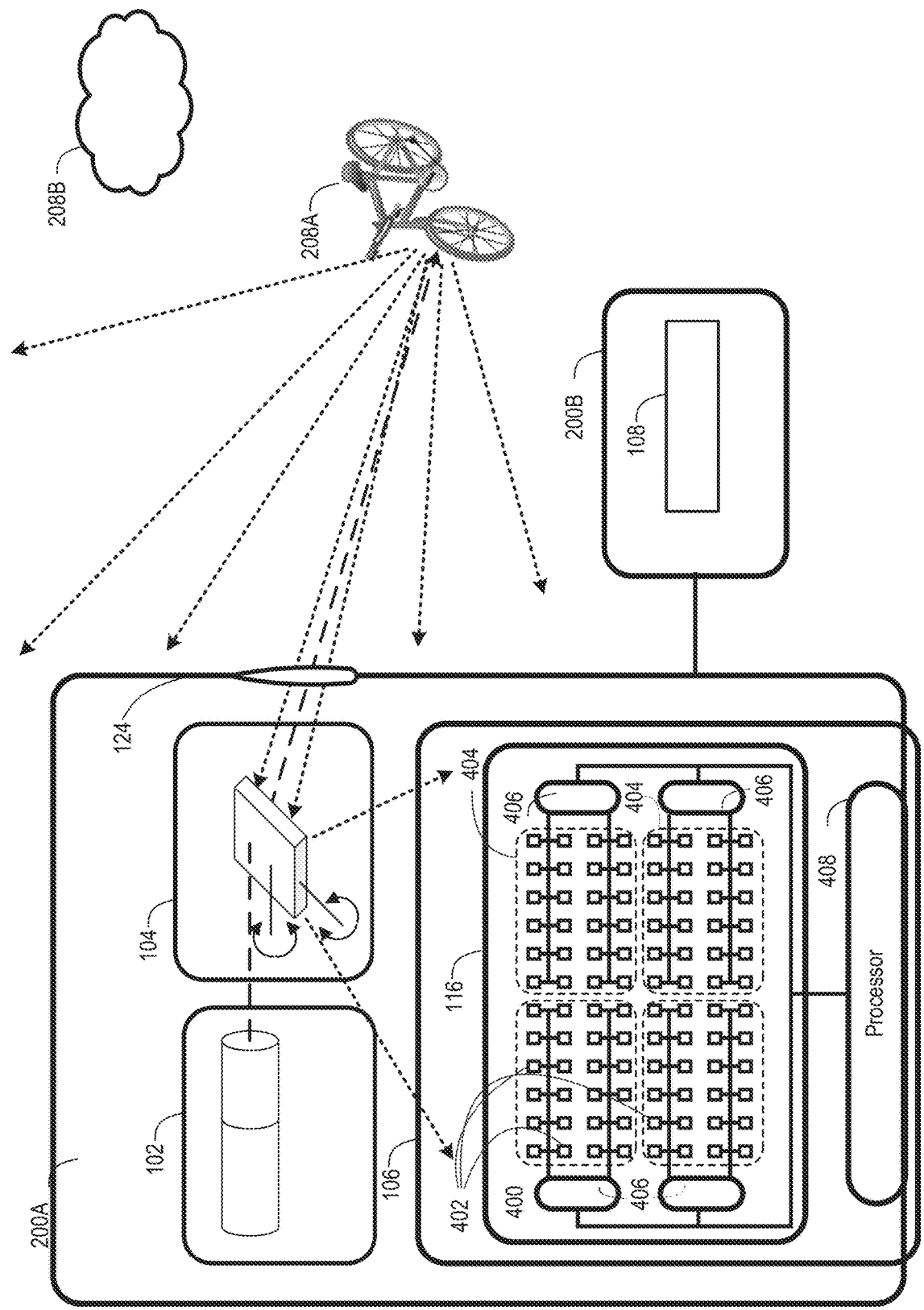
FIGS. 4A, 4B, 4C, 4D, and 4E are diagrams illustrating different configurations of sensing units in accordance with some embodiments of the present disclosure.
Figure 4B:
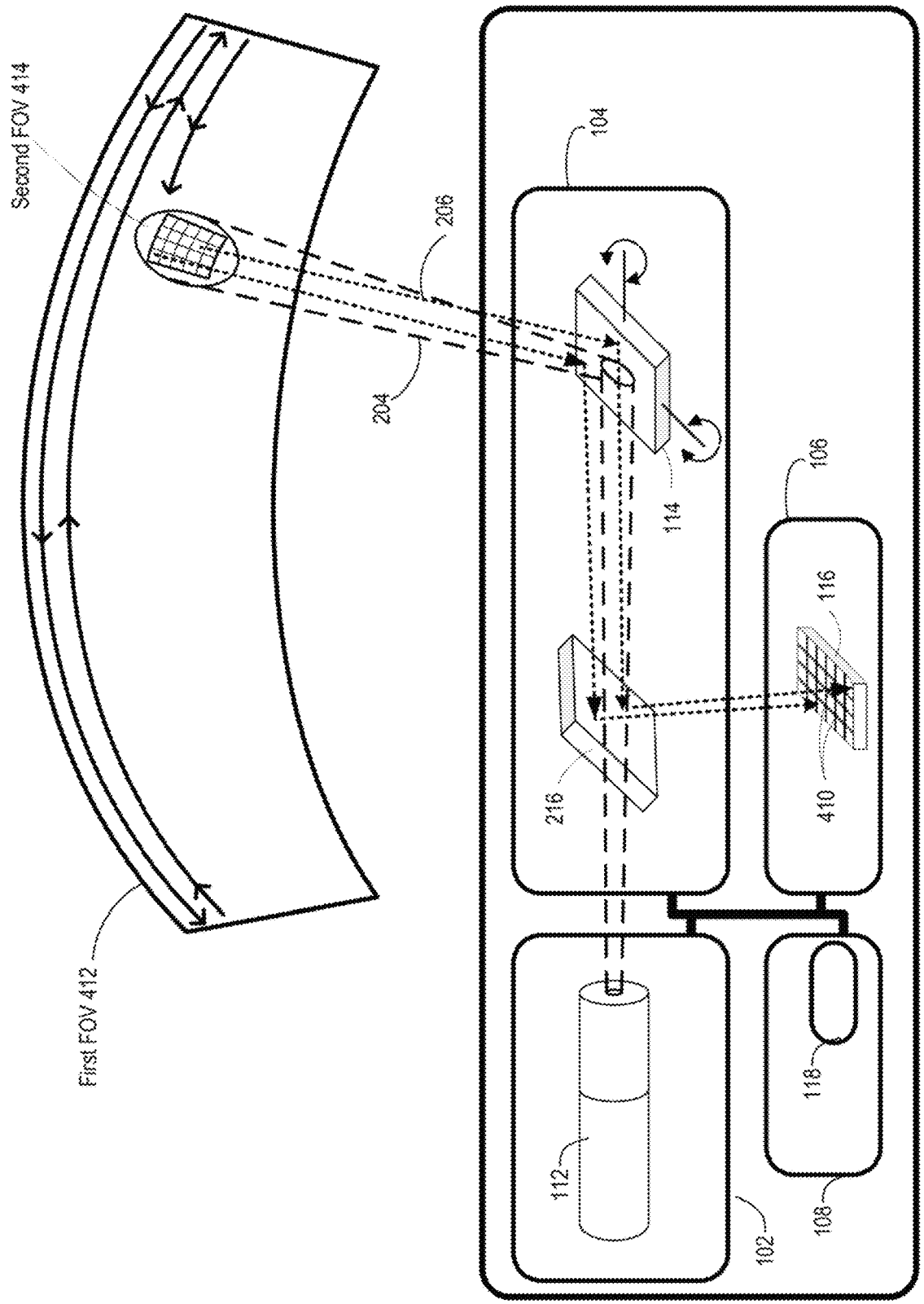
Figure 4C:
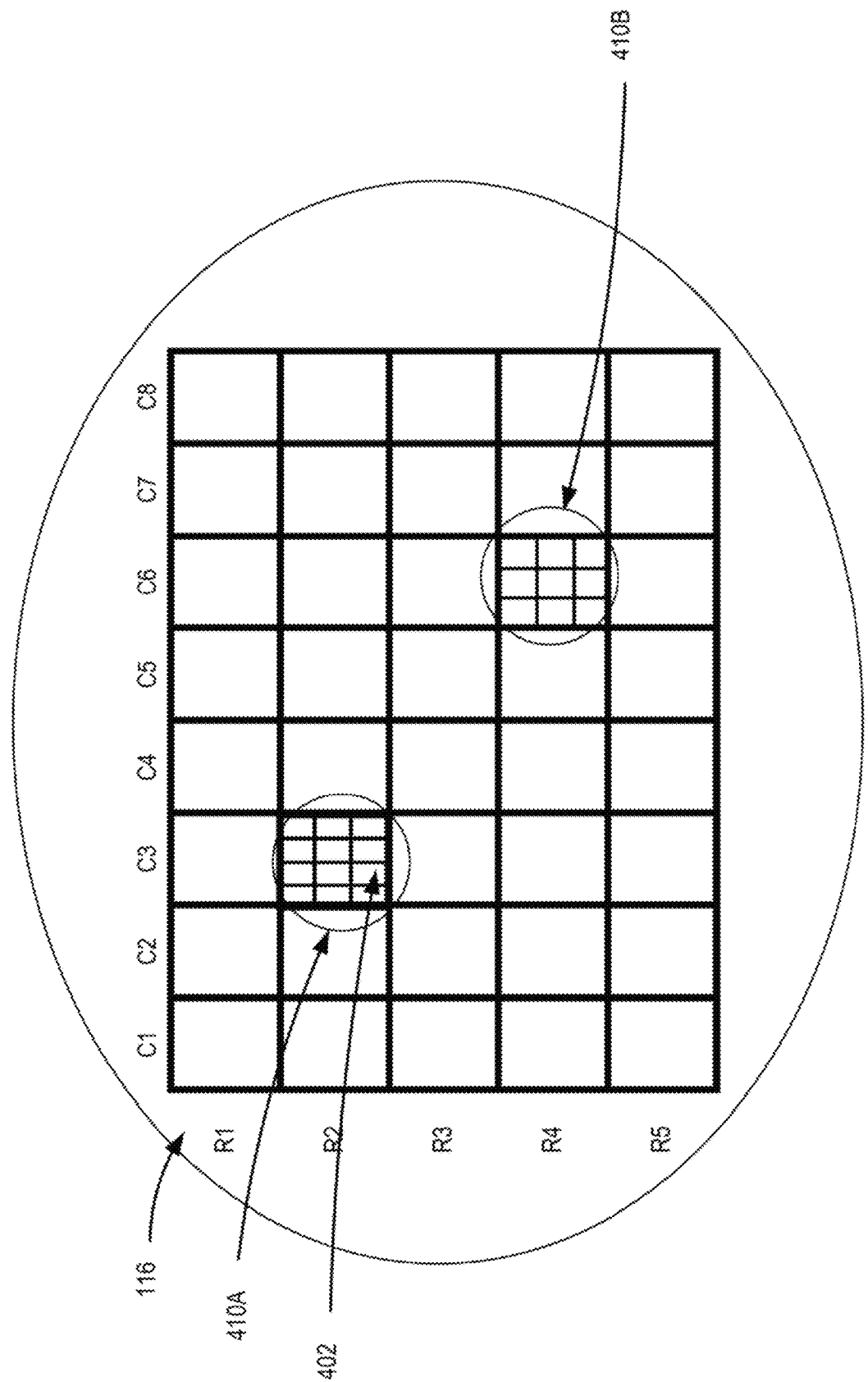
Figure 4D:
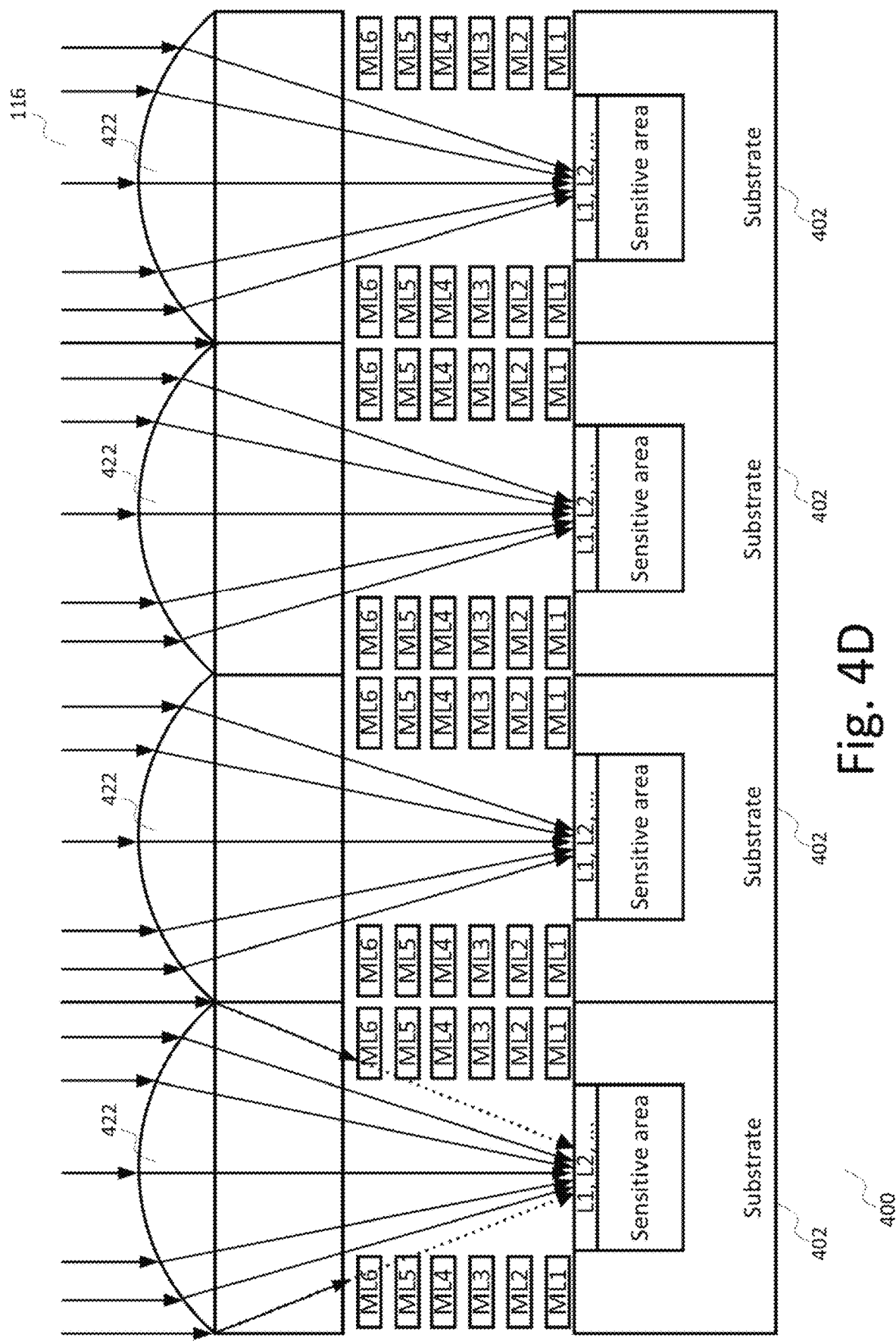

FIGS. 4A-4E depict various configurations of sensing unit 106 and its role in LIDAR system 100. Specifically, FIG. 4A is a diagram illustrating an example sensing unit 106 with a detector array, FIG. 4B is a diagram illustrating monostatic scanning using a two-dimensional sensor, FIG. 4C is a diagram illustrating an example of a two-dimensional sensor 116, FIG. 4D is a diagram illustrating a lens array associated with sensor 116, and FIG. 4E includes three diagram illustrating the lens structure. One skilled in the art will appreciate that the depicted configurations of sensing unit 106 are exemplary only and may have numerous alternative variations and modifications consistent with the principles of this disclosure.

FIG. 4A illustrates an example of sensing unit 106 with detector array 400. In this example, at least one sensor 116 includes detector array 400. LIDAR system 100 is configured to detect objects (e.g., bicycle 208A and cloud 208B) in field of view 120 located at different distances from LIDAR system 100 (could be meters or more). Objects 208 may be a solid object (e.g. a road, a tree, a car, a person), fluid object (e.g. fog, water, atmosphere particles), or object of another type (e.g. dust or a powdery illuminated object). When the photons emitted from light source 112 hit object 208 they either reflect, refract, or get absorbed. Typically, as shown in the figure, only a portion of the photons reflected from object 208A enters optional optical window 124. As each ~15 cm change in distance results in a travel time difference of 1 ns (since the photons travel at the speed of light to and from object 208), the time differences between the travel times of different photons hitting the different objects may be detectable by a time-of-flight sensor with sufficiently quick response.

Sensor 116 includes a plurality of detection elements 402 for detecting photons of a photonic pulse reflected back from field of view 120. The detection elements may all be included in detector array 400, which may have a rectangular arrangement (e.g. as shown) or any other arrangement. Detection elements 402 may operate concurrently or partially concurrently with each other. Specifically, each detection element 402 may issue detection information for every sampling duration (e.g. every 1 nanosecond). In one example, detector array 400 may be a SiPM (Silicon photomultipliers) which is a solid-state single-photon-sensitive device built from an array of single photon avalanche diodes (SPADs, serving as detection elements 402) on a common silicon substrate. Similar photomultipliers from other, non-silicon materials may also be used. Although a SiPM device works in digital/switching mode, the SiPM is an analog device because all the microcells are read in parallel, making it possible to generate signals within a dynamic range from a single photon to hundreds and thousands of photons detected by the different SPADs. As mentioned above, more than one type of sensor may be implemented (e.g. SiPM and APD). Possibly, sensing unit 106 may include at least one APD integrated into an SiPM array and/or at least one APD detector located next to a SiPM on a separate or common silicon substrate.

In one embodiment, detection elements 402 may be grouped into a plurality of regions 404. The regions are geometrical locations or environments within sensor 116 (e.g. within detector array 400)—and may be shaped in different shapes (e.g. rectangular as shown, squares, rings, and so on, or in any other shape). While not all of the individual detectors, which are included within the geometrical area of a region 404, necessarily belong to that region, in most cases they will not belong to other regions 404 covering other areas of the sensor 310—unless some overlap is desired in the seams between regions. As illustrated in FIG. 4A, the regions may be non-overlapping regions 404, but alternatively, they may overlap. Every region may be associated with a regional output circuitry 406 associated with that region. The regional output circuitry 406 may provide a region output signal of a corresponding group of detection elements 402. For example, the region of output circuitry 406 may be a summing circuit, but other forms of combined output of the individual detector into a unitary output (whether scalar, vector, or any other format) may be employed. Optionally, each region 404 is a single SiPM, but this is not necessarily so, and a region may be a sub-portion of a single SiPM, a group of several SiPMs, or even a combination of different types of detectors.

In the illustrated example, processing unit 108 is located at a separated housing 200B (within or outside) host 210 (e.g. within vehicle 110), and sensing unit 106 may include a dedicated processor 408 for analyzing the reflected light. Alternatively, processing unit 108 may be used for analyzing reflected light 206. It is noted that LIDAR system 100 may be implemented multiple housings in other ways than the illustrated example. For example, light deflector 114 may be located in a different housing than projecting unit 102 and/or sensing module 106. In one embodiment, LIDAR system 100 may include multiple housings connected to each other in different ways, such as: electric wire connection, wireless connection (e.g., RF connection), fiber optics cable, and any combination of the above.

In one embodiment, analyzing reflected light 206 may include determining a time of flight for reflected light 206, based on outputs of individual detectors of different regions. Optionally, processor 408 may be configured to determine the time of flight for reflected light 206 based on the plurality of regions of output signals. In addition to the time of flight, processing unit 108 may analyze reflected light 206 to determine the average power across an entire return pulse, and the photon distribution/signal may be determined over the return pulse period ("pulse shape"). In the illustrated example, the outputs of any detection elements 402 may not be transmitted directly to processor 408, but rather combined (e.g. summed) with signals of other detectors of the region 404 before being passed to processor 408. However, this is only an example and the circuitry of sensor 116 may transmit information from a detection element 402 to processor 408 via other routes (not via a region output circuitry 406).

FIG. 4B is a diagram illustrating LIDAR system 100 configured to scan the environment of LIDAR system 100 using a two-dimensional sensor 116. In the example of FIG. 4B, sensor 116 is a matrix of 4X6 detectors 410 (also referred to as "pixels"). In one embodiment, a pixel size may be about 1×1 mm. Sensor 116 is two-dimensional in the sense that it has more than one set (e.g. row, column) of detectors 410 in two non-parallel axes (e.g. orthogonal axes, as exemplified in the illustrated examples). The number of detectors 410 in sensor 116 may vary between differing implementations, e.g. depending on the desired resolution, signal to noise ratio (SNR), desired detection distance, and so on. For example, sensor 116 may have anywhere between 5 and 5,000 pixels. In another example (not shown in the figure) Also, sensor 116 may be a one-dimensional matrix (e.g. 1×8 pixels).

It is noted that each detector 410 may include a plurality of detection elements 402, such as Avalanche Photo Diodes (APD), Single Photon Avalanche Diodes (SPADs), combination of Avalanche Photo Diodes (APD) and Single Photon Avalanche Diodes (SPADs)or detecting elements that measure both the time of flight from a laser pulse transmission event to the reception event and the intensity of the received photons. For example, each detector 410 may include anywhere between 20 and 5,000 SPADs. The outputs of detection elements 402 in each detector 410 may be summed, averaged, or otherwise combined to provide a unified pixel output.

In the illustrated example, sensing unit 106 may include a two-dimensional sensor 116 (or a plurality of two-dimensional sensors 116), whose field of view is smaller than field of view 120 of LIDAR system 100. In this discussion, field of view 120 (the overall field of view which can be scanned by LIDAR system 100 without moving, rotating or rolling in any direction) is denoted "first FOV 412", and the smaller FOV of sensor 116 is denoted "second FOV 412" (interchangeably "instantaneous FOV"). The coverage area of second FOV 414 relative to the first FOV 412 may differ, depending on the specific use of LIDAR system 100, and may be, for example, between 0.5% and 50%. In one example, second FOV 412 may be between about 0.05° and 1° elongated in the vertical dimension. Even if LIDAR system 100 includes more than one two-dimensional sensor 116, the combined field of view of the sensors array may still be smaller than the first FOV 412, e.g. by a factor of at least 5, by a factor of at least 10, by a factor of at least 20, or by a factor of at least 50, for example.

In order to cover first FOV 412, scanning unit 106 may direct photons arriving from different parts of the environment to sensor 116 at different times. In the illustrated monostatic configuration, together with directing projected light 204 towards field of view 120 and when least one light deflector 114 is located in an instantaneous position, scanning unit 106 may also direct reflected light 206 to sensor 116. Typically, at every moment during the scanning of first FOV 412, the light beam emitted by LIDAR system 100 covers part of the environment which is larger than the second FOV 414 (in angular opening) and includes the part of the environment from which light is collected by scanning unit 104 and sensor 116.

FIG. 4C is a diagram illustrating an example of a two-dimensional sensor 116. In this embodiment, sensor 116 is a matrix of 8X5 detectors 410 and each detector 410 includes a plurality of detection elements 402. In one example, detector 410A is located in the second row (denoted "R2") and third column (denoted "C3") of sensor 116, which includes a matrix of 4×3 detection elements 402. In another example, detector 410B located in the fourth row (denoted "R4") and sixth column (denoted "C6") of sensor 116 includes a matrix of 3×3 detection elements 402. Accordingly, the number of detection elements 402 in each detector 410 may be constant, or may vary, and differing detectors 410 in a common array may have a different number of detection elements 402. The outputs of all detection elements 402 in each detector 410 may be summed, averaged, or otherwise combined to provide a single pixel-output value. It is noted that while detectors 410 in the example of FIG. 4C are arranged in a rectangular matrix (straight rows and straight columns), other arrangements may also be used, e.g. a circular arrangement or a honeycomb arrangement.

According to some embodiments, measurements from each detector 410 may enable determination of the time of flight from a light pulse emission event to the reception event and the intensity of the received photons. The reception event may be the result of the light pulse being reflected from object 208. The time of flight may be a timestamp value that represents the distance of the reflecting object to optional optical window 124. Time of flight values may be realized by photon detection and counting methods, such as Time Correlated Single Photon Counters (TCSPC), analog methods for photon detection such as signal integration and qualification (via analog to digital converters or plain comparators) or otherwise.

In some embodiments and with reference to FIG. 4B, during a scanning cycle, each instantaneous position of at least one light deflector 114 may be associated with a particular portion 122 of field of view 120. The design of sensor 116 enables an association between the reflected light from a single portion of field of view 120 and multiple detectors 410. Therefore, the scanning resolution of LIDAR system may be represented by the number of instantaneous positions (per scanning cycle) times the number of detectors 410 in sensor 116. The information from each detector 410 (i.e., each pixel) represents the basic data element that from which the captured field of view in the three-dimensional space is built. This may include, for example, the basic element of a point cloud representation, with a spatial position and an associated reflected intensity value. In one embodiment, the reflections from a single portion of field of view 120 that are detected by multiple detectors 410 may be returning from different objects located in the single portion of field of view 120. For example, the single portion of field of view 120 may be greater than 50×50 cm at the far field, which can easily include two, three, or more objects partly covered by each other.

FIG. 4D is a crosscut diagram of a part of sensor 116, in accordance with examples of the presently disclosed subject matter. The illustrated part of sensor 116 includes a part of a detector array 400 which includes four detection elements 402 (e.g., four SPADs, four APDs). Detector array 400 may be a photodetector sensor realized in complementary metal-oxide-semiconductor (CMOS). Each of the detection elements 402 has a sensitive area, which is positioned within a substrate surrounding. While not necessarily so, sensor 116 may be used in a monostatic LiDAR system having a narrow field of view (e.g., because scanning unit 104 scans different parts of the field of view at different times). The narrow field of view for the incoming light beam—if implemented—eliminates the problem of out-of-focus imaging. As exemplified in FIG. 4D, sensor 116 may include a plurality of lenses 422 (e.g., microlenses), each lens 422 may direct incident light toward a different detection element 402 (e.g., toward an active area of detection element 402), which may be usable when out-of-focus imaging is not an issue. Lenses 422 may be used for increasing an optical fill factor and sensitivity of detector array 400, because most of the light that reaches sensor 116 may be deflected toward the active areas of detection elements 402

Detector array 400, as exemplified in FIG. 4D, may include several layers built into the silicon substrate by various methods (e.g., implant) resulting in a sensitive area, contact elements to the metal layers and isolation elements (e.g., shallow trench implant STI, guard rings, optical trenches, etc.). The sensitive area may be a volumetric element in the CMOS detector that enables the optical conversion of incoming photons into a current flow given an adequate voltage bias is applied to the device. In the case of an APD/SPAD, the sensitive area would be a combination of an electrical field that pulls electrons created by photon absorption towards a multiplication area where a photon induced electron is amplified creating a breakdown avalanche of multiplied electrons.

A front side illuminated detector (e.g., as illustrated in FIG. 4D) has the input optical port at the same side as the metal layers residing on top of the semiconductor (Silicon). The metal layers are required to realize the electrical connections of each individual photodetector element (e.g., anode and cathode) with various elements such as: bias voltage, quenching/ballast elements, and other photodetectors in a common array. The optical port through which the photons impinge upon the detector sensitive area is comprised of a passage through the metal layer. It is noted that passage of light from some directions through this passage may be blocked by one or more metal layers (e.g., metal layer ML6, as illustrated for the leftmost detector elements 402 in FIG. 4D). Such blockage reduces the total optical light absorbing efficiency of the detector.

Figure 4E:
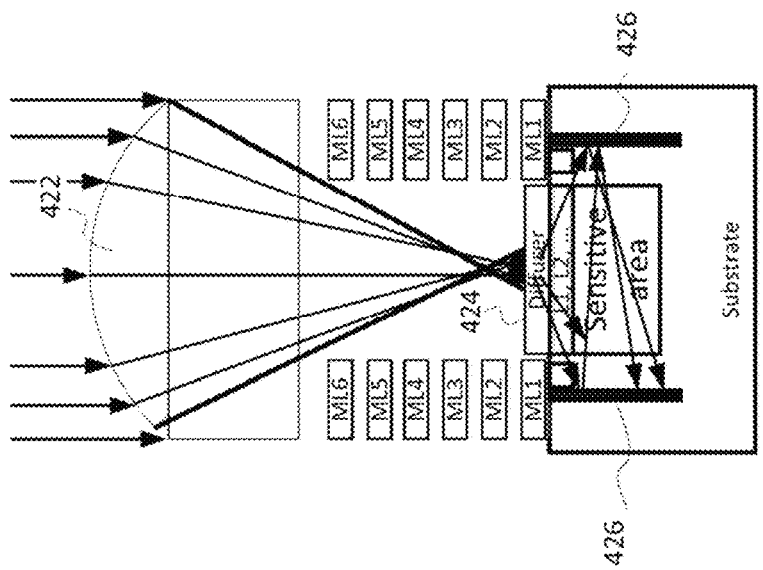
Figure 4E:
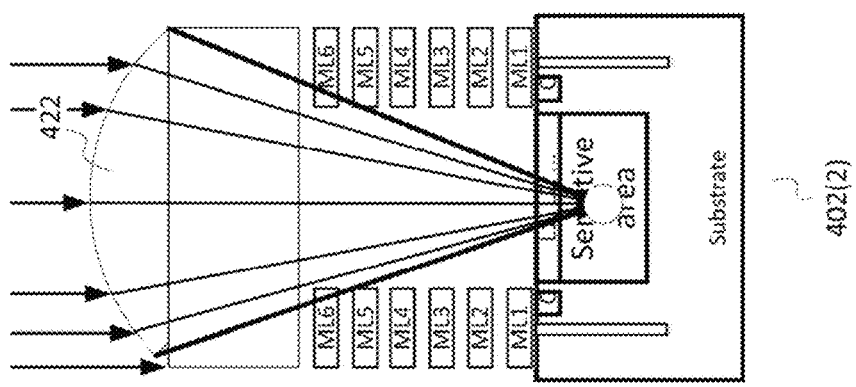
Figure 4E:
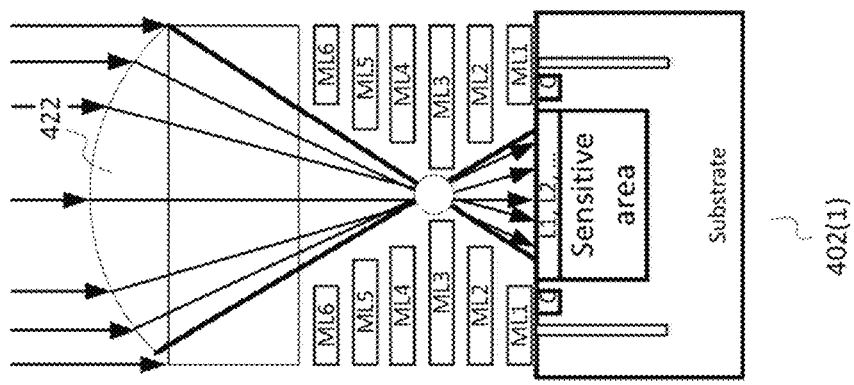

FIG. 4E illustrates three detection elements 402, each with an associated lens 422, in accordance with examples of the presenting disclosed subject matter. Each of the three detection elements of FIG. 4E, denoted 402(1), 402(2), and 402(3), illustrates a lens configuration which may be implemented in associated with one or more of the detecting elements 402 of sensor 116. It is noted that combinations of these lens configurations may also be implemented.

In the lens configuration illustrated with regards to detection element 402(1), a focal point of the associated lens 422 may be located above the semiconductor surface. Optionally, openings in different metal layers of the detection element may have different sizes aligned with the cone of focusing light generated by the associated lens 422. Such a structure may improve the signal-to-noise and resolution of the array 400 as a whole device. Large metal layers may be important for delivery of power and ground shielding. This approach may be useful, e.g., with a monostatic LiDAR design with a narrow field of view where the incoming light beam is comprised of parallel rays and the imaging focus does not have any consequence to the detected signal.

In the lens configuration illustrated with regards to detection element 402(2), an efficiency of photon detection by the detection elements 402 may be improved by identifying a sweet spot. Specifically, a photodetector implemented in CMOS may have a sweet spot in the sensitive volume area where the probability of a photon creating an avalanche effect is the highest. Therefore, a focal point of lens 422 may be positioned inside the sensitive volume area at the sweet spot location, as demonstrated by detection elements 402(2). The lens shape and distance from the focal point may take into account the refractive indices of all the elements the laser beam is passing along the way from the lens to the sensitive sweet spot location buried in the semiconductor material.

In the lens configuration illustrated with regards to the detection element on the right of FIG. 4E, an efficiency of photon absorption in the semiconductor material may be improved using a diffuser and reflective elements. Specifically, a near IR wavelength requires a significantly long path of silicon material in order to achieve a high probability of absorbing a photon that travels through. In a typical lens configuration, a photon may traverse the sensitive area and may not be absorbed into a detectable electron. A long absorption path that improves the probability for a photon to create an electron renders the size of the sensitive area towards less practical dimensions (tens of um for example) for a CMOS device fabricated with typical foundry processes. The rightmost detector element in FIG. 4E demonstrates a technique for processing incoming photons. The associated lens 422 focuses the incoming light onto a diffuser element 424. In one embodiment, light sensor 116 may further include a diffuser located in the gap distant from the outer surface of at least some of the detectors. For example, diffuser 424 may steer the light beam sideways (e.g., as perpendicular as possible) towards the sensitive area and the reflective optical trenches 426. The diffuser is located at the focal point, above the focal point, or below the focal point. In this embodiment, the incoming light may be focused on a specific location where a diffuser element is located. Optionally, detector element 422 is designed to optically avoid the inactive areas where a photon induced electron may get lost and reduce the effective detection efficiency. Reflective optical trenches 426 (or other forms of optically reflective structures) cause the photons to bounce back and forth across the sensitive area, thus increasing the likelihood of detection. Ideally, the photons will get trapped in a cavity consisting of the sensitive area and the reflective trenches indefinitely until the photon is absorbed and creates an electron/hole pair.

Consistent with the present disclosure, a long path is created for the impinging photons to be absorbed and contribute to a higher probability of detection. Optical trenches may also be implemented in detecting element 422 for reducing cross talk effects of parasitic photons created during an avalanche that may leak to other detectors and cause false detection events. According to some embodiments, a photo detector array may be optimized so that a higher yield of the received signal is utilized, meaning, that as much of the received signal is received and less of the signal is lost to internal degradation of the signal. The photo detector array may be improved by: (a) moving the focal point at a location above the semiconductor surface, optionally by designing the metal layers above the substrate appropriately; (b) by steering the focal point to the most responsive/sensitive area (or "sweet spot") of the substrate and (c) adding a diffuser above the substrate to steer the signal toward the "sweet spot" and/or adding reflective material to the trenches so that deflected signals are reflected back to the "sweet spot."

While in some lens configurations, lens 422 may be positioned so that its focal point is above a center of the corresponding detection element 402, it is noted that this is not necessarily so. In other lens configuration, a position of the focal point of the lens 422 with respect to a center of the corresponding detection element 402 is shifted based on a distance of the respective detection element 402 from a center of the detection array 400. This may be useful in relatively larger detection arrays 400, in which detector elements further from the center receive light in angles which are increasingly off-axis. Shifting the location of the focal points (e.g., toward the center of detection array 400) allows correcting for the incidence angles. Specifically, shifting the location of the focal points (e.g., toward the center of detection array 400) allows correcting for the incidence angles while using substantially identical lenses 422 for all detection elements, which are positioned at the same angle with respect to a surface of the detector.

Adding an array of lenses 422 to an array of detection elements 402 may be useful when using a relatively small sensor 116 which covers only a small part of the field of view because in such a case, the reflection signals from the scene reach the detectors array 400 from substantially the same angle, and it is, therefore, easy to focus all the light onto individual detectors. It is also noted, that in one embodiment, lenses 422 may be used in LIDAR system 100 for favoring about increasing the overall probability of detection of the entire array 400 (preventing photons from being "wasted" in the dead area between detectors/sub-detectors) at the expense of spatial distinctiveness. This embodiment is in contrast to prior art implementations such as CMOS RGB camera, which prioritize spatial distinctiveness (i.e., light that propagates in the direction of detection element A is not allowed to be directed by the lens toward detection element B, that is, to "bleed" to another detection element of the array). Optionally, sensor 116 includes an array of lens 422, each being correlated to a corresponding detection element 402, while at least one of the lenses 422 deflects light which propagates to a first detection element 402 toward a second detection element 402 (thereby it may increase the overall probability of detection of the entire array).

Specifically, consistent with some embodiments of the present disclosure, light sensor 116 may include an array of light detectors (e.g., detector array 400), each light detector (e.g., detector 410) being configured to cause an electric current to flow when light passes through an outer surface of a respective detector. In addition, light sensor 116 may include at least one micro-lens configured to direct light toward the array of light detectors, the at least one micro-lens having a focal point. Light sensor 116 may further include at least one layer of conductive material interposed between the at least one micro-lens and the array of light detectors and having a gap therein to permit light to pass from the at least one micro-lens to the array, the at least one layer being sized to maintain a space between the at least one micro-lens and the array to cause the focal point (e.g., the focal point may be a plane) to be located in the gap, at a location spaced from the detecting surfaces of the array of light detectors.

In related embodiments, each detector may include a plurality of Single Photon Avalanche Diodes (SPADs) or a plurality of Avalanche Photo Diodes (APD). The conductive material may be a multi-layer metal constriction, and the at least one layer of conductive material may be electrically connected to detectors in the array. In one example, the at least one layer of conductive material includes a plurality of layers. In addition, the gap may be shaped to converge from the at least one micro-lens toward the focal point, and to diverge from a region of the focal point toward the array. In other embodiments, light sensor 116 may further include at least one reflector adjacent each photo detector. In one embodiment, a plurality of micro-lenses may be arranged in a lens array and the plurality of detectors may be arranged in a detector array. In another embodiment, the plurality of micro-lenses may include a single lens configured to project light to a plurality of detectors in the array.

Referring by way of a nonlimiting example to FIGS. 2E, 2F and 2G, it is noted that the one or more sensors 116 of system 100 may receive light from a scanning deflector 114 or directly from the FOV without scanning. Even if light from the entire FOV arrives to the at least one sensor 116 at the same time, in some implementations the one or more sensors 116 may sample only parts of the FOV for detection output at any given time. For example, if the illumination of projection unit 102 illuminates different parts of the FOV at different times (whether using a deflector 114 and/or by activating different light sources 112 at different times), light may arrive at all of the pixels or sensors 116 of sensing unit 106, and only pixels/sensors which are expected to detect the LIDAR illumination may be actively collecting data for detection outputs. This way, the rest of the pixels/sensors do not unnecessarily collect ambient noise. Referring to the scanning—in the outbound or in the inbound directions—it is noted that substantially different scales of scanning may be implemented. For example, in some implementations the scanned area may cover 1‰ or 0.1‰ of the FOV, while in other implementations the scanned area may cover 10% or 25% of the FOV. All other relative portions of the FOV values may also be implemented, of course.

The Processing Unit

Figure 5A:
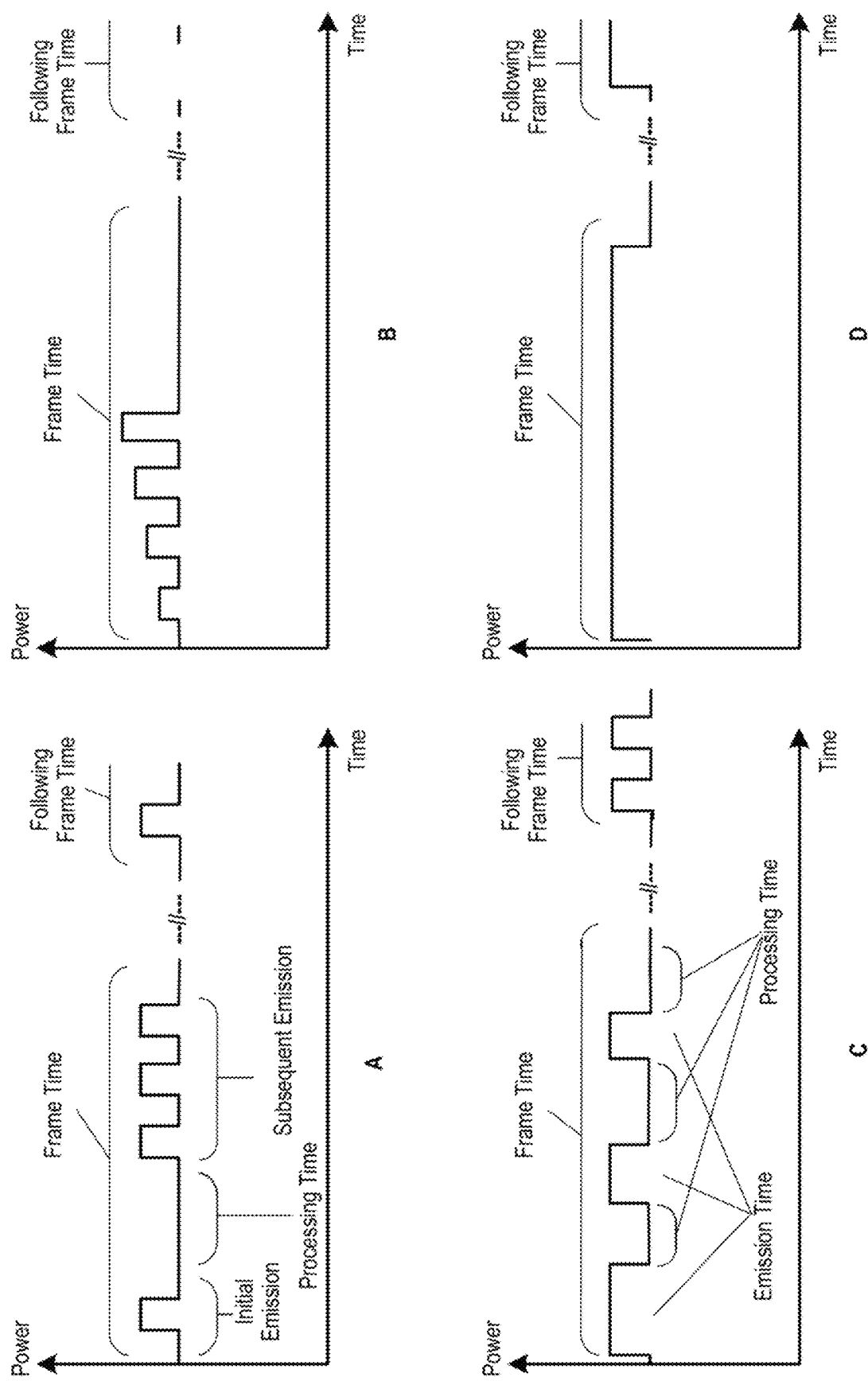
FIG. 5A includes four example diagrams illustrating emission patterns in a single frame-time for a single portion of the field of view.
Figure 5B:
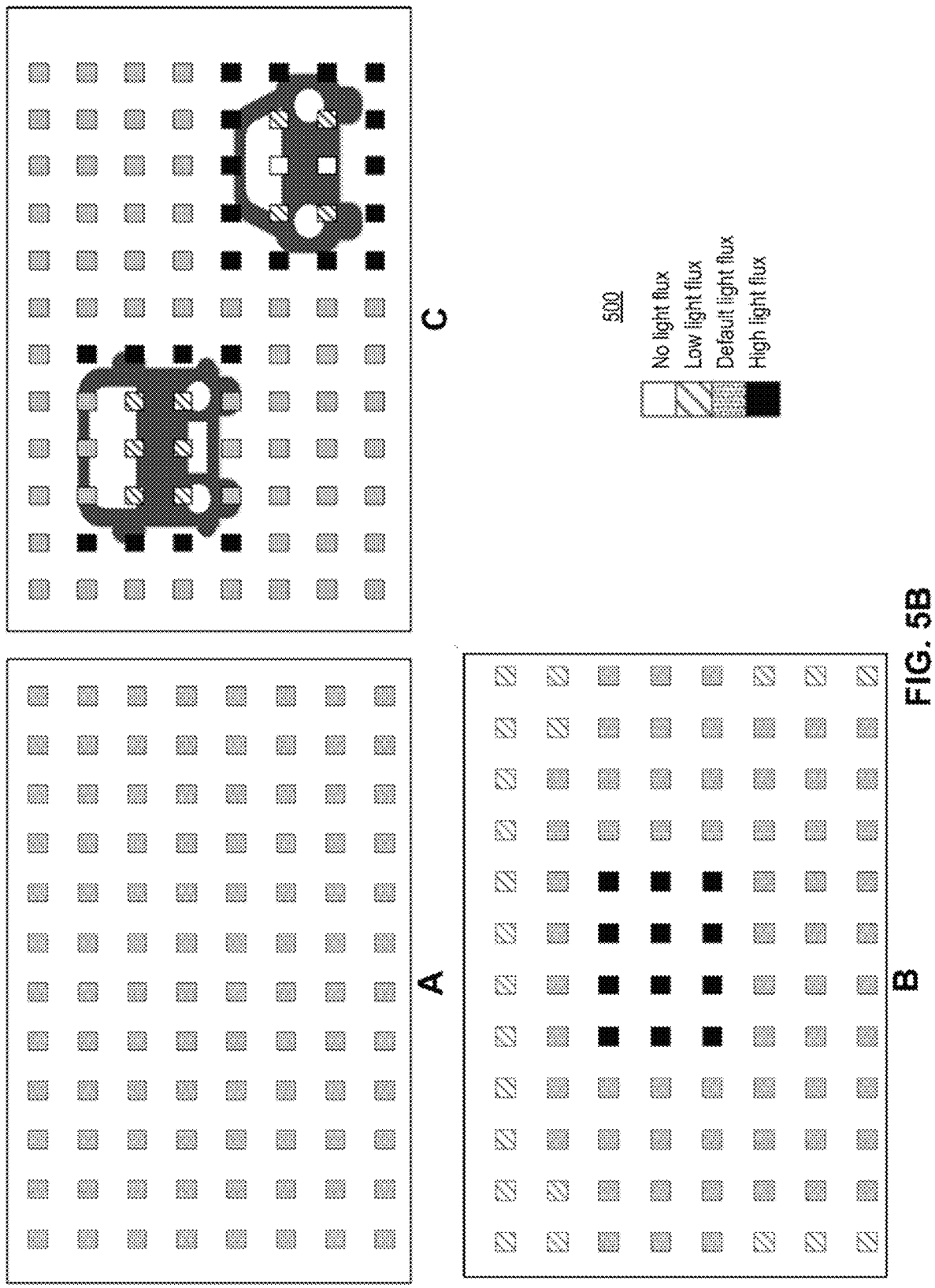
FIG. 5B includes three example diagrams illustrating emission scheme in a single frame-time for the whole field of view.
Figure 5C:
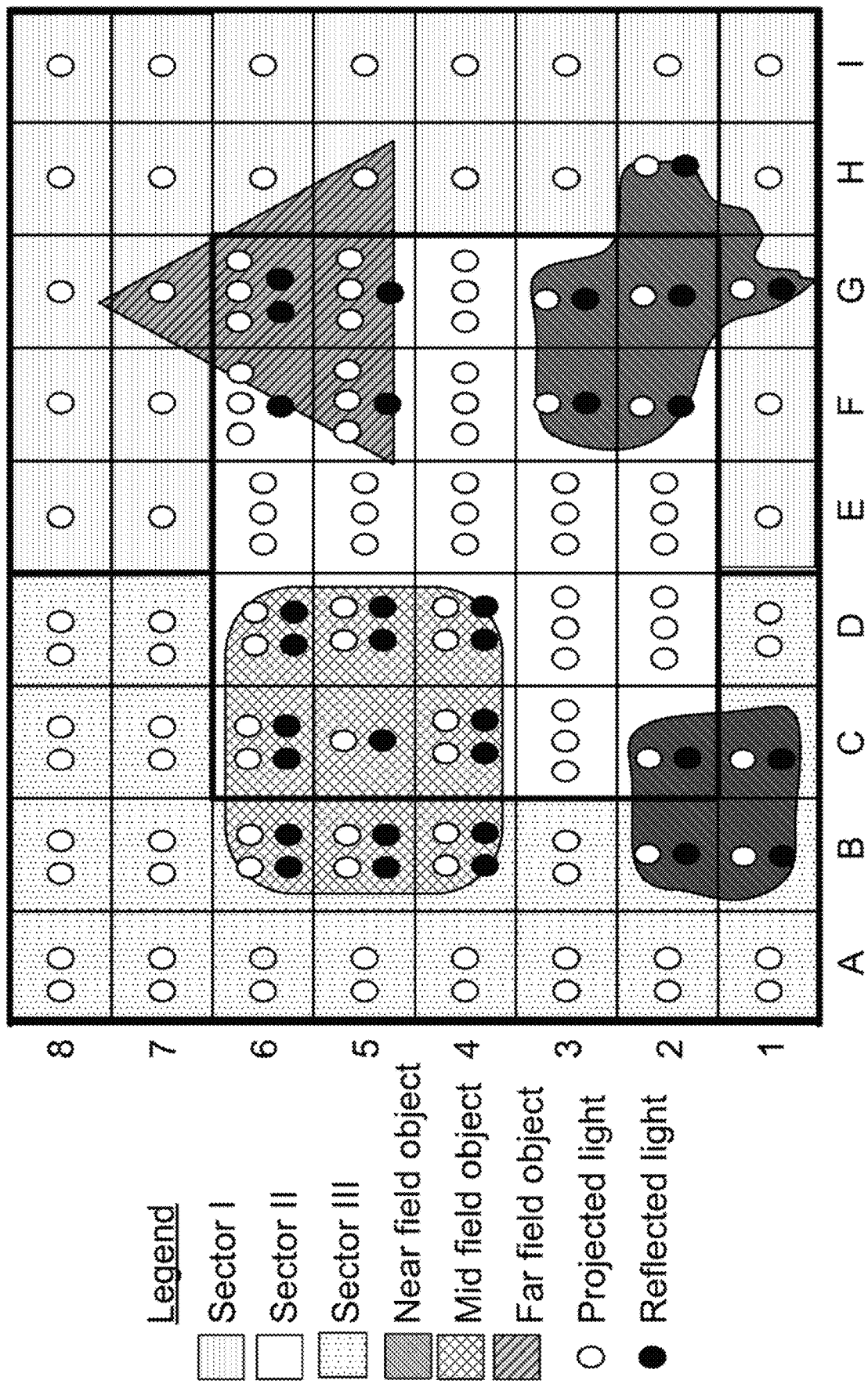
FIG. 5C is a diagram illustrating the actual light emission projected towards and reflections received during a single frame-time for the whole field of view.

FIGS. 5A-5C depict different functionalities of processing units 108 in accordance with some embodiments of the present disclosure. Specifically, FIG. 5A is a diagram illustrating emission patterns in a single frame-time for a single portion of the field of view, FIG. 5B is a diagram illustrating emission scheme in a single frame-time for the whole field of view, and. FIG. 5C is a diagram illustrating the actual light emission projected towards field of view during a single scanning cycle.

FIG. 5A illustrates four examples of emission patterns in a single frame-time for a single portion 122 of field of view 120 associated with an instantaneous position of at least one light deflector 114. Consistent with embodiments of the present disclosure, processing unit 108 may control at least one light source 112 and light deflector 114 (or coordinate the operation of at least one light source 112 and at least one light deflector 114) in a manner enabling light flux to vary over a scan of field of view 120. Consistent with other embodiments, processing unit 108 may control only at least one light source 112 and light deflector 114 may be moved or pivoted in a fixed predefined pattern.

Diagrams A-D in FIG. 5A depict the power of light emitted towards a single portion 122 of field of view 120 over time. In Diagram A, processor 118 may control the operation of light source 112 in a manner such that during scanning of field of view 120 an initial light emission is projected toward portion 122 of field of view 120. When projecting unit 102 includes a pulsed-light light source, the initial light emission may include one or more initial pulses (also referred to as "pilot pulses"). Processing unit 108 may receive from sensor 116 pilot information about reflections associated with the initial light emission. In one embodiment, the pilot information may be represented as a single signal based on the outputs of one or more detectors (e.g. one or more SPADs, one or more APDs, one or more SiPMs, etc.) or as a plurality of signals based on the outputs of multiple detectors. In one example, the pilot information may include analog and/or digital information. In another example, the pilot information may include a single value and/or a plurality of values (e.g. for different times and/or parts of the segment).

Based on information about reflections associated with the initial light emission, processing unit 108 may be configured to determine the type of subsequent light emission to be projected towards portion 122 of field of view 120. The determined subsequent light emission for the particular portion of field of view 120 may be made during the same scanning cycle (i.e., in the same frame) or in a subsequent scanning cycle (i.e., in a subsequent frame).

In Diagram B, processor 118 may control the operation of light source 112 in a manner such that during scanning of field of view 120 light pulses in different intensities are projected towards a single portion 122 of field of view 120. In one embodiment, LIDAR system 100 may be operable to generate depth maps of one or more different types, such as any one or more of the following types: point cloud model, polygon mesh, depth image (holding depth information for each pixel of an image or of a 2D array), or any other type of 3D model of a scene. The sequence of depth maps may be a temporal sequence, in which different depth maps are generated at a different time. Each depth map of the sequence associated with a scanning cycle (interchangeably "frame") may be generated within the duration of a corresponding subsequent frame-time. In one example, a typical frame-time may last less than a second. In some embodiments, LIDAR system 100 may have a fixed frame rate (e.g. 10 frames per second, 25 frames per second, 50 frames per second) or the frame rate may be dynamic. In other embodiments, the frame-times of different frames may not be identical across the sequence. For example, LIDAR system 100 may implement a 10 frames-per-second rate that includes generating a first depth map in 100 milliseconds (the average), a second frame in 92 milliseconds, a third frame at 142 milliseconds, and so on.

In Diagram C, processor 118 may control the operation of light source 112 in a manner such that during scanning of field of view 120 light pulses associated with different durations are projected towards a single portion 122 of field of view 120. In one embodiment, LIDAR system 100 may be operable to generate a different number of pulses in each frame. The number of pulses may vary between 0 to 32 pulses (e.g., 1, 5, 12, 28, or more pulses) and may be based on information derived from previous emissions. The time between light pulses may depend on desired detection range and can be between 500 ns and 5000 ns. In one example, processing unit 108 may receive from sensor 116 information about reflections associated with each light-pulse. Based on the information (or the lack of information), processing unit 108 may determine if additional light pulses are needed. It is noted that the durations of the processing times and the emission times in diagrams A-D are not in-scale. Specifically, the processing time may be substantially longer than the emission time. In diagram D, projecting unit 102 may include a continuous-wave light source. In one embodiment, the initial light emission may include a period of time where light is emitted and the subsequent emission may be a continuation of the initial emission, or there may be a discontinuity. In one embodiment, the intensity of the continuous emission may change over time.

Consistent with some embodiments of the present disclosure, the emission pattern may be determined per each portion of field of view 120. In other words, processor 118 may control the emission of light to allow differentiation in the illumination of different portions of field of view 120. In one example, processor 118 may determine the emission pattern for a single portion 122 of field of view 120, based on detection of reflected light from the same scanning cycle (e.g., the initial emission), which makes LIDAR system 100 extremely dynamic. In another example, processor 118 may determine the emission pattern for a single portion 122 of field of view 120, based on detection of reflected light from a previous scanning cycle. The differences in the patterns of the subsequent emissions may result from determining different values for light-source parameters for the subsequent emission, such as any one of the following:
a. Overall energy of the subsequent emission.
b. Energy profile of the subsequent emission.
c. A number of light-pulse-repetition per frame.
d. Light modulation characteristics such as duration, rate, peak, average power, and pulse shape.
e. Wave properties of the subsequent emission, such as polarization, wavelength, etc.

Consistent with the present disclosure, the differentiation in the subsequent emissions may be put to different uses. In one example, it is possible to limit emitted power levels in one portion of field of view 120 where safety is a consideration, while emitting higher power levels (thus improving signal-to-noise ratio and detection range) for other portions of field of view 120. This is relevant for eye safety, but may also be relevant for skin safety, safety of optical systems, safety of sensitive materials, and more. In another example, it is possible to direct more energy towards portions of field of view 120 where it will be of greater use (e.g. regions of interest, further distanced targets, low reflection targets, etc.) while limiting the lighting energy to other portions of field of view 120 based on detection results from the same frame or previous frame. It is noted that processing unit 108 may process detected signals from a single instantaneous field of view several times within a single scanning frame time; for example, subsequent emission may be determined upon after every pulse emitted, or after a number of pulses emitted.

FIG. 5B illustrates three examples of emission schemes in a single frame-time for field of view 120. Consistent with embodiments of the present disclosure, at least on processing unit 108 may use obtained information to dynamically adjust the operational mode of LIDAR system 100 and/or determine values of parameters of specific components of LIDAR system 100. The obtained information may be determined from processing data captured in field of view 120, or received (directly or indirectly) from host 210. Processing unit 108 may use the obtained information to determine a scanning scheme for scanning the different portions of field of view 120. The obtained information may include a current light condition, a current weather condition, a current driving environment of the host vehicle, a current location of the host vehicle, a current trajectory of the host vehicle, a current topography of road surrounding the host vehicle, or any other condition or object detectable through light reflection. In some embodiments, the determined scanning scheme may include at least one of the following: (a) a designation of portions within field of view 120 to be actively scanned as part of a scanning cycle, (b) a projecting plan for projecting unit 102 that defines the light emission profile at different portions of field of view 120; (c) a deflecting plan for scanning unit 104 that defines, for example, a deflection direction, frequency, and designating idle elements within a reflector array; and (d) a detection plan for sensing unit 106 that defines the detectors sensitivity or responsivity pattern.

In addition, processing unit 108 may determine the scanning scheme at least partially by obtaining an identification of at least one region of interest within the field of view 120 and at least one region of non-interest within the field of view 120. In some embodiments, processing unit 108 may determine the scanning scheme at least partially by obtaining an identification of at least one region of high interest within the field of view 120 and at least one region of lower-interest within the field of view 120. The identification of the at least one region of interest within the field of view 120 may be determined, for example, from processing data captured in field of view 120, based on data of another sensor (e.g. camera, GPS), received (directly or indirectly) from host 210, or any combination of the above. In some embodiments, the identification of at least one region of interest may include identification of portions, areas, sections, pixels, or objects within field of view 120 that are important to monitor. Examples of areas that may be identified as regions of interest may include, crosswalks, moving objects, people, nearby vehicles or any other environmental condition or object that may be helpful in vehicle navigation. Examples of areas that may be identified as regions of non-interest (or lower-interest) may be static (non-moving) far-away buildings, a skyline, an area above the horizon and objects in the field of view. Upon obtaining the identification of at least one region of interest within the field of view 120, processing unit 108 may determine the scanning scheme or change an existing scanning scheme. Further to determining or changing the light-source parameters (as described above), processing unit 108 may allocate detector resources based on the identification of the at least one region of interest. In one example, to reduce noise, processing unit 108 may activate detectors 410 where a region of interest is expected and disable detectors 410 where regions of non-interest are expected. In another example, processing unit 108 may change the detector sensitivity, e.g., increasing sensor sensitivity for long range detection where the reflected power is low.

Diagrams A-C in FIG. 5B depict examples of different scanning schemes for scanning field of view 120. Each square in field of view 120 represents a different portion 122 associated with an instantaneous position of at least one light deflector 114. Legend 500 details the level of light flux represented by the filling pattern of the squares. Diagram A depicts a first scanning scheme in which all of the portions have the same importance/priority and a default light flux is allocated to them. The first scanning scheme may be utilized in a start-up phase or periodically interleaved with another scanning scheme to monitor the whole field of view for unexpected/new objects. In one example, the light source parameters in the first scanning scheme may be configured to generate light pulses at constant amplitudes. Diagram B depicts a second scanning scheme in which a portion of field of view 120 is allocated with high light flux while the rest of field of view 120 is allocated with default light flux and low light flux. The portions of field of view 120 that are the least interesting may be allocated with low light flux. Diagram C depicts a third scanning scheme in which a compact vehicle and a bus (see silhouettes) are identified in field of view 120. In this scanning scheme, the edges of the vehicle and bus may be tracked with high power and the central mass of the vehicle and bus may be allocated with less light flux (or no light flux). Such light flux allocation enables concentration of more of the optical budget on the edges of the identified objects and less on their center which have less importance.

FIG. 5C illustrating the emission of light towards field of view 120 during a single scanning cycle. In the depicted example, field of view 120 is represented by an 8×9 matrix, where each of the 72 cells corresponds to a separate portion 122 associated with a different instantaneous position of at least one light deflector 114. In this exemplary scanning cycle, each portion includes one or more white dots that represent the number of light pulses projected toward that portion, and some portions include black dots that represent reflected light from that portion detected by sensor 116. As shown, field of view 120 is divided into three sectors: sector I on the right side of field of view 120, sector II in the middle of field of view 120, and sector III on the left side of field of view 120. In this exemplary scanning cycle, sector I was initially allocated with a single light pulse per portion; sector II, previously identified as a region of interest, was initially allocated with three light pulses per portion; and sector III was initially allocated with two light pulses per portion. Also as shown, scanning of field of view 120 reveals four objects 208: two free-form objects in the near field (e.g., between 5 and 50 meters), a rounded-square object in the mid field (e.g., between 50 and 150 meters), and a triangle object in the far field (e.g., between 150 and 500 meters). While the discussion of FIG. 5C uses number of pulses as an example of light flux allocation, it is noted that light flux allocation to different parts of the field of view may also be implemented in other ways such as: pulse duration, pulse angular dispersion, wavelength, instantaneous power, photon density at different distances from light source 112, average power, pulse power intensity, pulse width, pulse repetition rate, pulse sequence, pulse duty cycle, wavelength, phase, polarization, and more. The illustration of the light emission as a single scanning cycle in FIG. 5C demonstrates different capabilities of LIDAR system 100. In a first embodiment, processor 118 is configured to use two light pulses to detect a first object (e.g., the rounded-square object) at a first distance, and to use three light pulses to detect a second object (e.g., the triangle object) at a second distance greater than the first distance. In a second embodiment, processor 118 is configured to allocate more light to portions of the field of view where a region of interest is identified. Specifically, in the present example, sector II was identified as a region of interest and accordingly it was allocated with three light pulses while the rest of field of view 120 was allocated with two or less light pulses. In a third embodiment, processor 118 is configured to control light source 112 in a manner such that only a single light pulse is projected toward to portions B1, B2, and C1 in FIG. 5C, although they are part of sector III that was initially allocated with two light pulses per portion. This occurs because the processing unit 108 detected an object in the near field based on the first light pulse. Allocation of less than maximal amount of pulses may also be a result of other considerations. For examples, in at least some regions, detection of object at a first distance (e.g. a near field object) may result in reducing an overall amount of light emitted to this portion of field of view 120.

Additional details and examples on different components of LIDAR system 100 and their associated functionalities are included in Applicant's U.S. patent application Ser. No. 15/391,916 filed Dec. 28, 2016; Applicant's U.S. patent application Ser. No. 15/393,749 filed Dec. 29, 2016; Applicant's U.S. patent application Ser. No. 15/393,285 filed Dec. 29, 2016; and Applicant's U.S. patent application Ser. No. 15/393,593 filed Dec. 29, 2016, which are incorporated herein by reference in their entirety.

Example Implementation: Vehicle

Figure 6C:
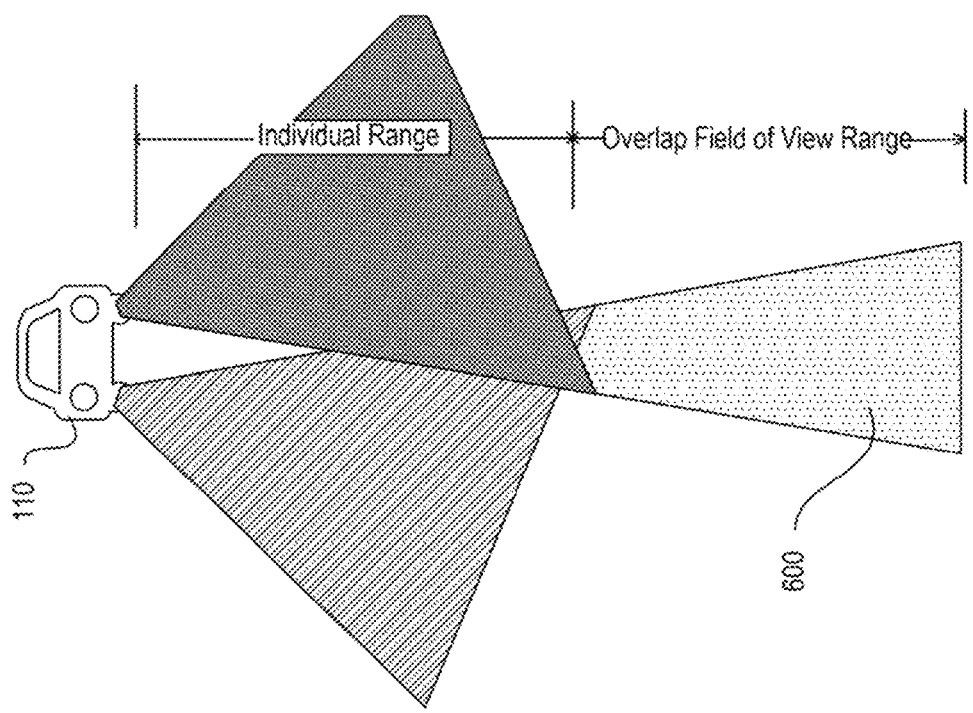
FIGS. 6A, 6B, and 6C are diagrams illustrating a first example implementation consistent with some embodiments of the present disclosure.
Figure 6A:
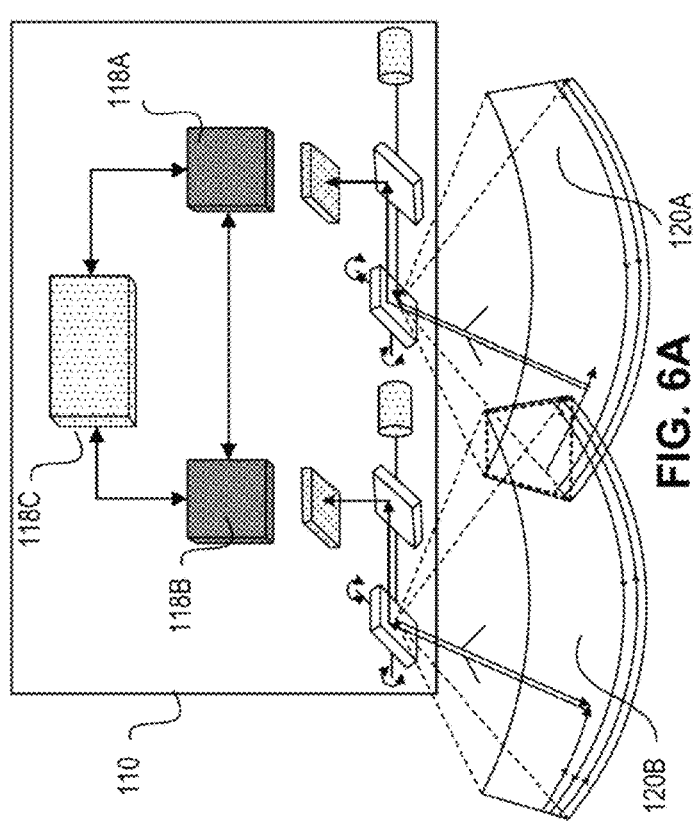
Figure 6B:
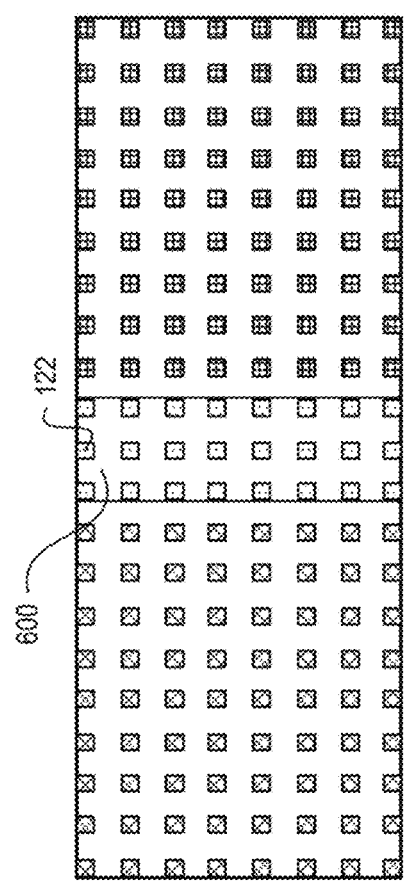

FIGS. 6A-6C illustrate the implementation of LIDAR system 100 in a vehicle (e.g., vehicle 110). Any of the aspects of LIDAR system 100 described above or below may be incorporated into vehicle 110 to provide a range-sensing vehicle. Specifically, in this example, LIDAR system 100 integrates multiple scanning units 104 and potentially multiple projecting units 102 in a single vehicle. In one embodiment, a vehicle may take advantage of such a LIDAR system to improve power, range, and accuracy in the overlap zone and beyond it, as well as redundancy in sensitive parts of the FOV (e.g. the forward movement direction of the vehicle). As shown in FIG. 6A, vehicle 110 may include a first processor 118A for controlling the scanning of field of view 120A, a second processor 118B for controlling the scanning of field of view 120B, and a third processor 118C for controlling synchronization of scanning the two fields of view. In one example, processor 118C may be the vehicle controller and may have a shared interface between first processor 118A and second processor 118B. The shared interface may enable an exchanging of data at intermediate processing levels and a synchronization of scanning of the combined field of view in order to form an overlap in the temporal and/or spatial space. In one embodiment, the data exchanged using the shared interface may be: (a) time of flight of received signals associated with pixels in the overlapped field of view and/or in its vicinity; (b) laser steering position status; (c) detection status of objects in the field of view.

FIG. 6B illustrates overlap region 600 between field of view 120A and field of view 120B. In the depicted example, the overlap region is associated with 24 portions 122 from field of view 120A and 24 portions 122 from field of view 120B. Given that the overlap region is defined and known by processors 118A and 118B, each processor may be designed to limit the amount of light emitted in overlap region 600 in order to conform with an eye safety limit that spans multiple source lights, or for other reasons such as maintaining an optical budget. In addition, processors 118A and 118B may avoid interferences between the light emitted by the two light sources by loose synchronization between the scanning unit 104A and scanning unit 104B, and/or by control of the laser transmission timing, and/or the detection circuit enabling timing.

FIG. 6C illustrates how overlap region 600 between field of view 120A and field of view 120B may be used to increase the detection distance of vehicle 110. Consistent with the present disclosure, two or more light sources 112 projecting their nominal light emission into the overlap zone may be leveraged to increase the effective detection range. The term "detection range" may include an approximate distance from vehicle 110 at which LIDAR system 100 can clearly detect an object. In one embodiment, the maximum detection range of LIDAR system 100 is about 300 meters, about 400 meters, or about 500 meters. For example, for a detection range of 200 meters, LIDAR system 100 may detect an object located 200 meters (or less) from vehicle 110 at more than 95%, more than 99%, more than 99.5% of the times. Even when the object's reflectivity may be less than 50% (e.g., less than 20%, less than 10%, or less than 5%). In addition, LIDAR system 100 may have less than 1% false alarm rate. In one embodiment, light from projected from two light sources that are collocated in the temporal and spatial space can be utilized to improve SNR and therefore increase the range and/or quality of service for an object located in the overlap region. Processor 118C may extract high-level information from the reflected light in field of view 120A and 120B. The term "extracting information" may include any process by which information associated with objects, individuals, locations, events, etc., is identified in the captured image data by any means known to those of ordinary skill in the art. In addition, processors 118A and 118B may share the high-level information, such as objects (road delimiters, background, pedestrians, vehicles, etc.), and motion vectors, to enable each processor to become alert to the peripheral regions about to become regions of interest. For example, a moving object in field of view 120A may be determined to soon be entering field of view 120B.

Example Implementation: Surveillance System

Figure 6D:
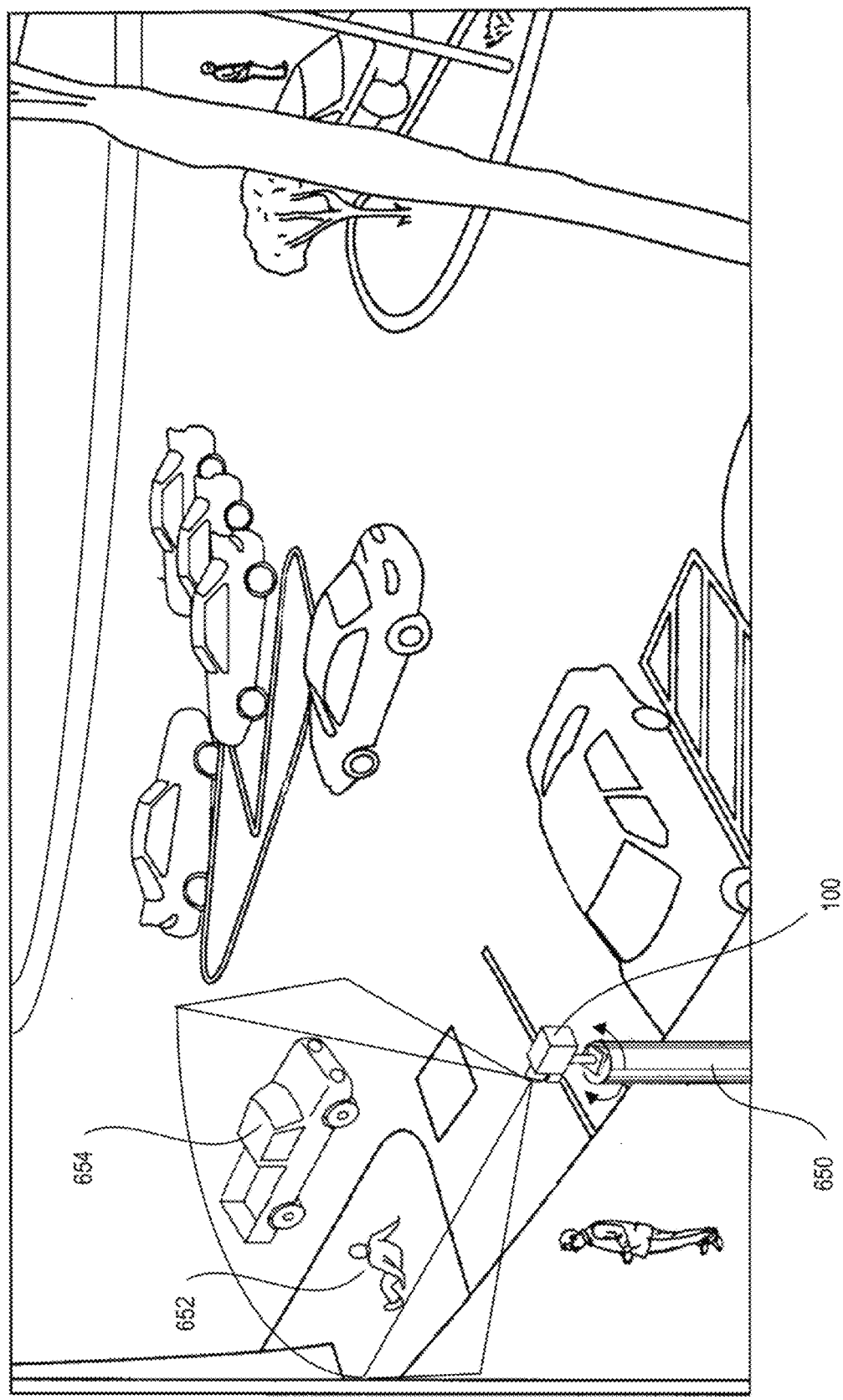
FIG. 6D is a diagram illustrating a second example implementation consistent with some embodiments of the present disclosure.

FIG. 6D illustrates the implementation of LIDAR system 100 in a surveillance system. As mentioned above, LIDAR system 100 may be fixed to a stationary object 650 that may include a motor or other mechanism for rotating the housing of the LIDAR system 100 to obtain a wider field of view. Alternatively, the surveillance system may include a plurality of LIDAR units. In the example depicted in FIG. 6D, the surveillance system may use a single rotatable LIDAR system 100 to obtain 3D data representing field of view 120 and to process the 3D data to detect people 652, vehicles 654, changes in the environment, or any other form of security-significant data.

Consistent with some embodiment of the present disclosure, the 3D data may be analyzed to monitor retail business processes. In one embodiment, the 3D data may be used in retail business processes involving physical security (e.g., detection of: an intrusion within a retail facility, an act of vandalism within or around a retail facility, unauthorized access to a secure area, and suspicious behavior around cars in a parking lot). In another embodiment, the 3D data may be used in public safety (e.g., detection of: people slipping and falling on store property, a dangerous liquid spill or obstruction on a store floor, an assault or abduction in a store parking lot, an obstruction of a fire exit, and crowding in a store area or outside of the store). In another embodiment, the 3D data may be used for business intelligence data gathering (e.g., tracking of people through store areas to determine, for example, how many people go through, where they dwell, how long they dwell, how their shopping habits compare to their purchasing habits).

Consistent with other embodiments of the present disclosure, the 3D data may be analyzed and used for traffic enforcement. Specifically, the 3D data may be used to identify vehicles traveling over the legal speed limit or some other road legal requirement. In one example, LIDAR system 100 may be used to detect vehicles that cross a stop line or designated stopping place while a red traffic light is showing. In another example, LIDAR system 100 may be used to identify vehicles traveling in lanes reserved for public transportation. In yet another example, LIDAR system 100 may be used to identify vehicles turning in intersections where specific turns are prohibited on red.

It should be noted that while examples of various disclosed embodiments have been described above and below with respect to a control unit that controls scanning of a deflector, the various features of the disclosed embodiments are not limited to such systems. Rather, the techniques for allocating light to various portions of a LIDAR FOV may be applicable to type of light-based sensing system (LIDAR or otherwise) in which there may be a desire or need to direct different amounts of light to different portions of field of view. In some cases, such light allocation techniques may positively impact detection capabilities, as described herein, but other advantages may also result.

It should also be noted that various sections of the disclosure and the claims may refer to various components or portions of components (e.g., light sources, sensors, sensor pixels, field of view portions, field of view pixels, etc.) using such terms as "first," "second," "third," etc. These terms are used only to facilitate the description of the various disclosed embodiments and are not intended to be limiting or to indicate any necessary correlation with similarly named elements or components in other embodiments. For example, characteristics described as associated with a "first sensor" in one described embodiment in one section of the disclosure may or may not be associated with a "first sensor" of a different embodiment described in a different section of the disclosure.

It is noted that LIDAR system 100, or any of its components, may be used together with any of the particular embodiments and methods disclosed below. Nevertheless, the particular embodiments and methods disclosed below are not necessarily limited to LIDAR system 100, and may possibly be implemented in or by other systems (such as but not limited to other LIDAR systems, other electrooptical systems, other optical systems, etc.—whichever is applicable). Also, while system 100 is described relative to an exemplary vehicle-based LIDAR platform, system 100, any of its components, and any of the processes described herein may be applicable to LIDAR systems disposed on other platform types. Likewise, the embodiments and processes disclosed below may be implemented on or by LIDAR systems (or other systems such as other electro-optical systems etc.) which are installed on systems disposed on platforms other than vehicles, or even regardless of any specific platform.

Exemplary Ultralight Mirror

Figure 7:
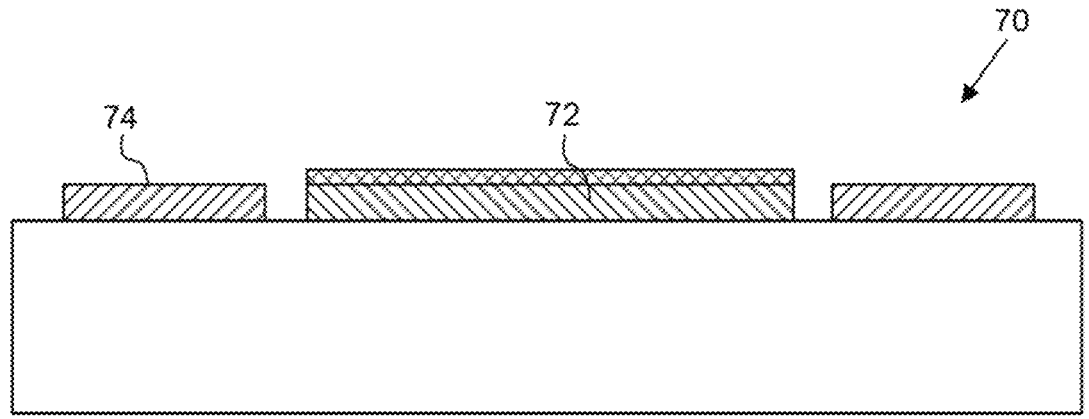
FIG. 7 is a schematic illustration of an exemplary mirror of the current disclosure.
Figure 8:
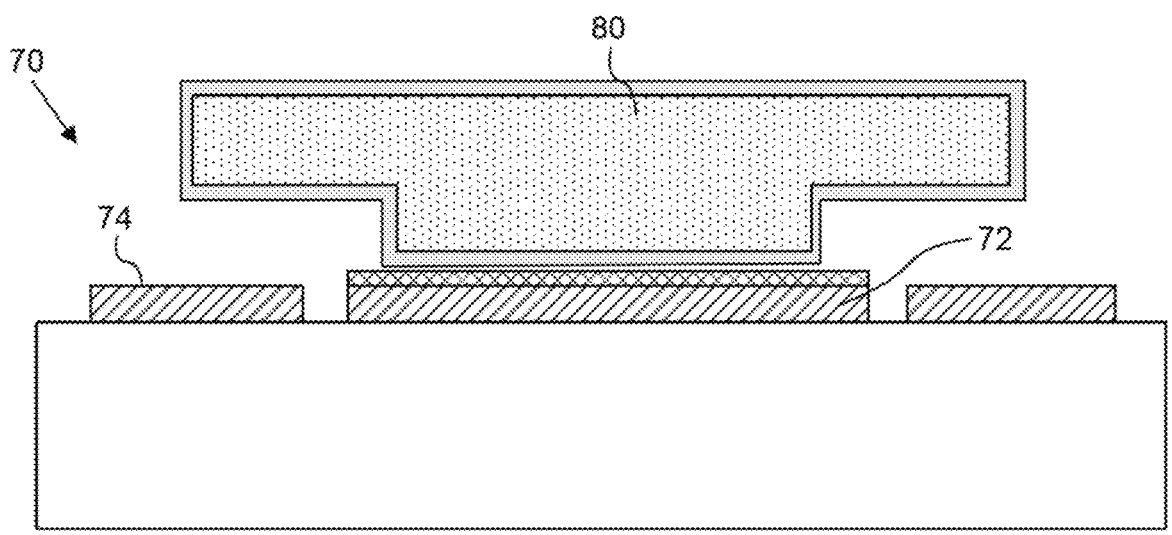
FIG. 8 is a schematic illustration of another exemplary mirror of the current disclosure.

An exemplary optical component that may be used, for example, in the above-described LIDAR systems will now be described. Although an optical component in the form of a mirror is described below, a person of skill in the art would recognize that the disclosure below is applicable to many other optical components. FIG. 7 is a schematic illustration of an exemplary scanning mirror that may be used in an application (e.g., in a LIDAR system). As illustrated in FIG. 7, scanning mirror 72 may be part of a MEMS (Micro Electro Mechanical System) scanning device 70 having a scanning manipulator 74. Mirror 72 may be a metal plated MEMS mirror. Mirror 72 may be coated with any suitable metal (e.g., gold) by any suitable method. In some embodiments, as schematically illustrated in FIG. 8, scanning device 70 may also include an ultralight mirror 80 that may be used in the scanning device 70. In some embodiments, ultralight mirror 80 may be coated with gold and may be attached to mirror 72.

Ultralight mirror 80 may be fabricated on a substrate material that is ultralight (or very light). The term "ultralight" is used to refer to a material having a bulk density less than about 300 kg/m$^3$, or less than about 100 kg/m$^3$. In some embodiments, the bulk density of the ultralight material may be between about 20-500 kg/m$^3$. In some embodiments, the bulk density of the ultralight material used may be between about 50-300 kg/m$^3$. In some embodiments, the ultralight material used in the disclosed mirrors 80 may be a porous material (such as, for example, an aerogel). The porosity may help to decrease the weight of the material. For example, in some embodiments, the ultralight material used as the substrate of a disclosed ultralight mirror 80 may be silica aerogel. The skeletal density of silica aerogel is about 2200 kg/m$^3$, but the material has a bulk density between about 70-150 kg/m$^3$ due to the high porosity of the material. In general, any ultralight material (organic, inorganic, etc.) may be used. In some embodiments, an ultralight porous material may be used as the substrate of the disclosed mirrors 80. For example, in some embodiments, an aerogel, xerogel, or a Metal-Organic Frameworks (MOF) material may be used as the substrate for the disclosed mirrors 80.

Silica aerogel, which is one of the most common types of aerogel, is a highly porous foam with pores in the nanometer scale. The silica aerogel may be machined and metal coated (e.g., gold coated) to form an ultralight mirror 80 which is dimensionally stable, both static and under dynamic loads. The aerogel may be metal coated by any suitable process. In some embodiments, the aerogel substrate may be metal coated by vacuum deposition or other suitable methods. In some embodiments, the density of the aerogel substrate of mirror 80, when evacuated, may be as low as 1000 gm/m$^3$ and its coefficient of thermal expansion (CTE) may be as low as 2 μm/m/K. Due to its low mass and high rigidity, aerogel mirror 80 (or other optical and electro-optical elements using an aerogel optical component) with larger dimensions may be incorporated into MEMS and other devices.

It should be noted that although silica aerogel is described as being a suitable material for the substate of aerogel mirror 80, this is only exemplary. In general, any ultralight porous material may be used to form mirror 80. In general, aerogel mirrors of the present disclosure may have any suitable ultralight porous material, such as aerogel, xerogel, MOF, or any nano-foam material as its substrate. Examples of suitable inorganic aerogels are silica, titania, zirconia, alumina, chromium oxide, iron oxide, and other standard oxides. Chalcogel is an aerogel made of chalcogens. Examples of organic aerogels are resorcinol—formaldehyde, polyurethane, epoxy, polyacrylonitrile, polyimides, polyvinylidene fluoride or polyvinylidene difluoride (PVDF), and polyesters. In some embodiments, mirror 80 may be made of, for example, an AeroZero film made of polyimide. In some embodiments, GraPhage13 (a graphene-based aerogel) may be used. In some embodiments, a clay aerogel may be used to form mirrors 80. Suitable clay aerogels may include, for example, montmorillonite clay aerogels. In some embodiments, a hybrid aerogel system may be used to form the disclose mirrors 80. The hybrid aerogel system may include mixtures of organic and inorganic aerogels combined with matrix polymers to improve their mechanical properties (sometimes at the cost of increased bulk densities). In some embodiments, polysiloxanes, polyacrylamides, polyacrylic acid, chitosan, polyurethane, and/or polystyrene may be used matrixes for silica aerogels. The ultralight mirrors 80 of the current disclosure may be made of one or more (e.g., a multi-layer stack, a combination, etc.) of the above-described materials.

Conventional mirrors may be limited in size and shape due to their weight and mass. In some embodiments, larger mirrors may have advantages in MEMS devices. Although not a limitation, in some embodiments, an ultralight mirror 80 of the current disclosure may have a size between about 6.5 mm and 15 mm (e.g., dimension of a side of a rectangular or square mirror, diameter for a circular mirror, etc.). Additionally, or alternatively, in some embodiments, the thickness of an ultralight mirror 80 of the current disclosure may be between about 0.3 mm and 1 mm. It should be noted that the dimensions described above are only exemplary and ultralight mirrors 80 of the current disclosure may have any suitable size. Also, as explained previously, although the current disclosure is described with reference to a mirror, this is only exemplary. In general, the current disclosure is applicable to any type of optical element or component.

Figure 9A:
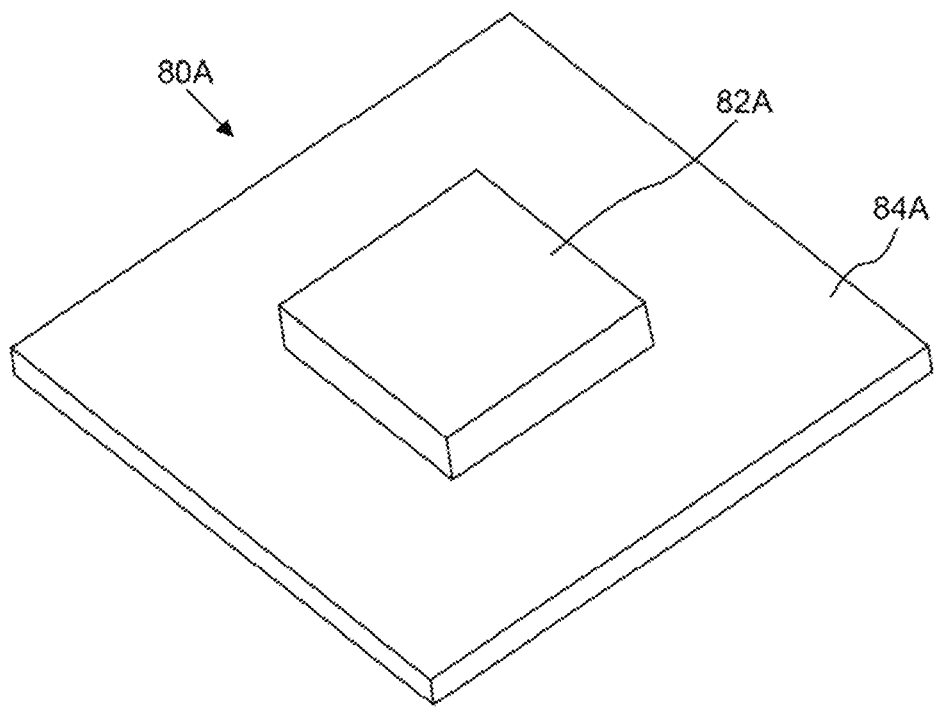
FIGS. 9A and 9B are illustrations of exemplary configurations of mirrors of the current disclosure.
Figure 9B:
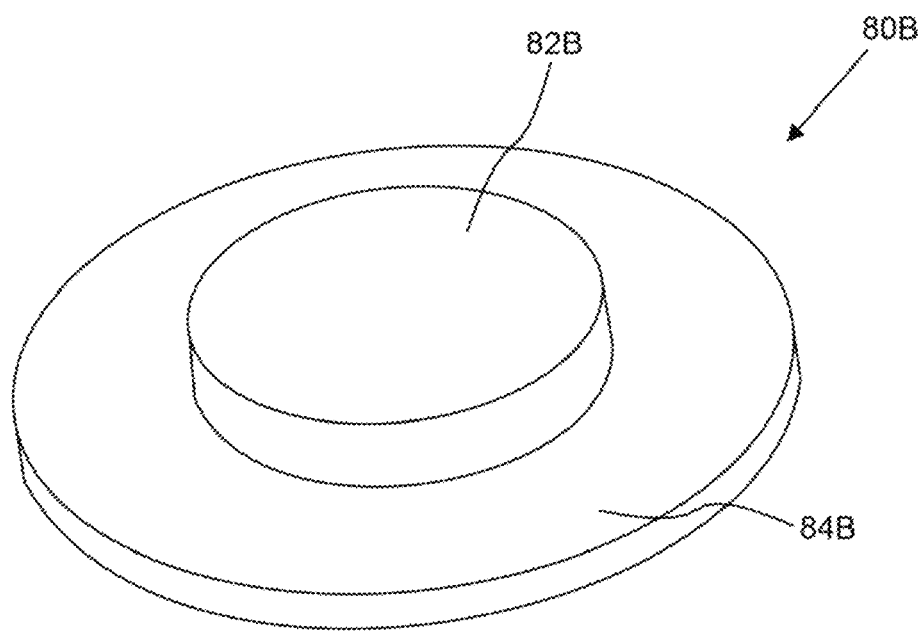

To enable assembly of the disclosed ultralight mirror 80 in a scanning manipulator (and accommodate the range of typical mirror rotations, positions, and orientations), in some embodiments, the ultralight mirror 80 may include a base part that acts like a spacer, and a mirror part that functions as the beam steering element. Exemplary configurations of mirrors 80A, 80B of the current disclosure with base and mirror parts are illustrated in FIGS. 9A and 9B. FIG. 9A illustrates an ultralight mirror 80A having a square shape, and FIG. 9B illustrates an ultralight mirror 80B having a circular shape. As illustrated in FIGS. 9A and 9B, mirror 80A has a square-shaped base part 82A and mirror part 84A and mirror 80B has a circular base part 82B and mirror part 84B. In general, mirrors 80 (and their base and mirror parts) may have any shape (circular, oval, elliptical, rectangular, square, pentagonal, hexagonal, octagonal, etc.). The base and mirror part of an ultralight mirror 80 may also have any dimension. In some embodiments, as illustrated in FIGS. 9A and 9B, the base part 82A, 82B may have smaller in-plane dimensions (or surface area) than the mirror part 84A, 84B.

In some embodiments, an axis may extend (e.g., vertically) through the base part 82A, 82B and the mirror part 84A, 84B of mirror 80A, 80B. The surface area of the base part 82A, 82B, that extends perpendicular to (or transverse to) the axis, may be smaller than the surface area of the mirror part 84A, 84B that extends perpendicular to (or transverse to) the axis. It should be noted that although FIGS. 9A and 9B illustrate the base part 82A, 82B and the mirror part 84A, 84B as having a similar cross-sectional shape (transverse to the axis), this is only exemplary. In general, the base part 82A, 82B and the mirror part 84A, 84B may have the same or different cross-sectional shapes. For example, in some cases, the mirror part may have one cross-sectional shape (e.g., square, rectangular, etc.) and the base part may have a different cross-sectional shape (e.g., circular, oval, etc.). In some embodiments, the in-plane dimensions of the base part 82A, 82B may be less than or equal to (≤) about 10 mm (or ≤ about 6.5 mm), and the thickness of the base part 82A, 82B may be ≤ about 2 mm, or between about 0.3-1 mm.

In some cases, ultralight materials may be fragile and prone to fracture (e.g., chipping, breaking, shattering, etc.) during fabrication. In some embodiments of the present disclosure, the ultralight substrate of mirror 80 may be shaped by molding and drying operations during fabrication. In some embodiments, the ultralight substrate may be formed by machining it from a solid piece (e.g., a block) of the ultralight material. In some embodiments, specialized methods of cutting and polishing may be used (e.g., computer numerical control (CNC) machining, etc.) to fabricate the mirror 80 to the desired shape (see, e.g., FIGS. 9A and 9B). Additionally, or alternatively, in some embodiments, a subtractive processes (e.g., etching, etc.) may be used to fabricate the substrate of mirror 80.

Figure 10A:
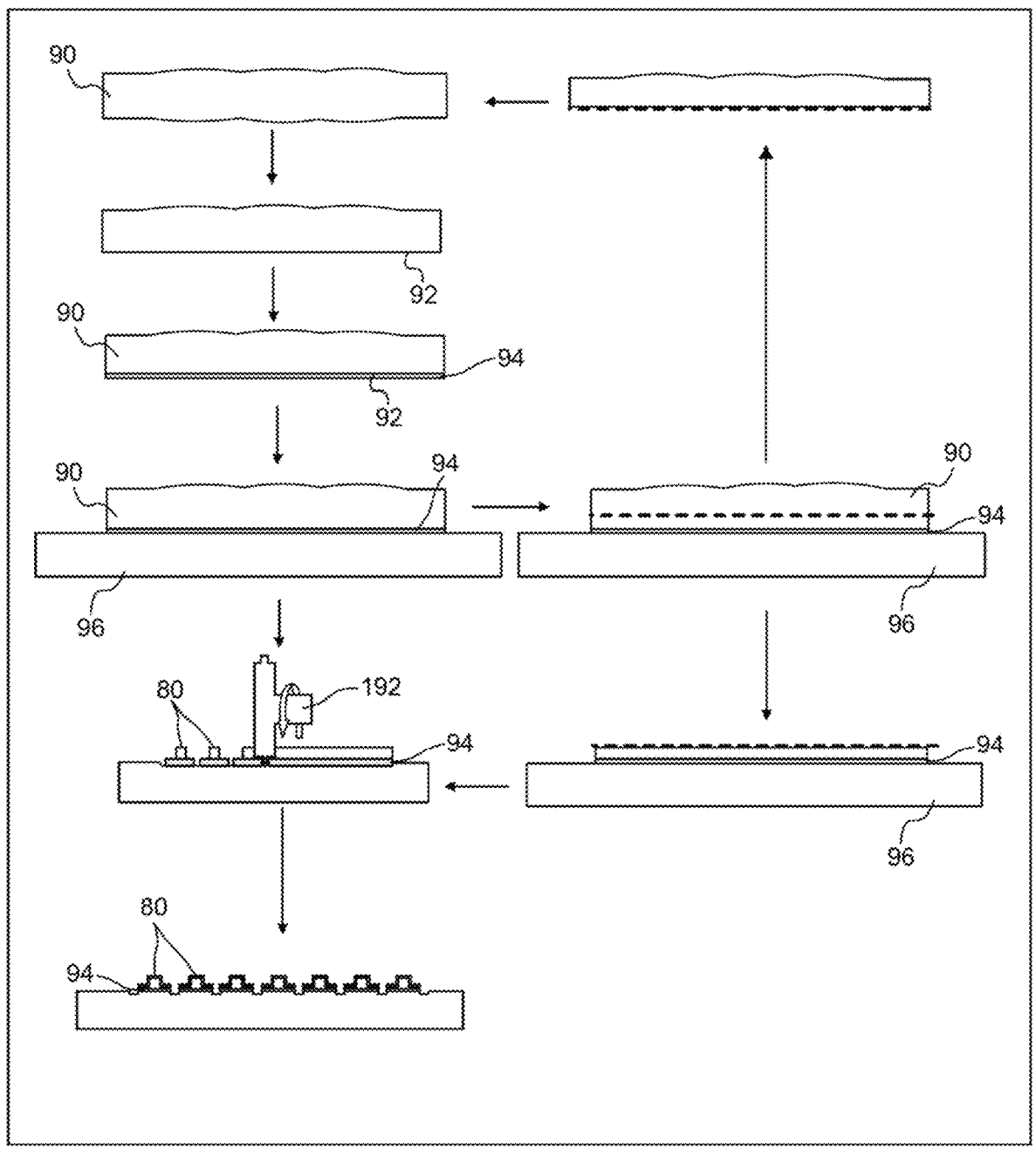
FIGS. 10A and 10B are illustrations of an exemplary process of fabricating a mirror of the current disclosure.
Figure 10B:
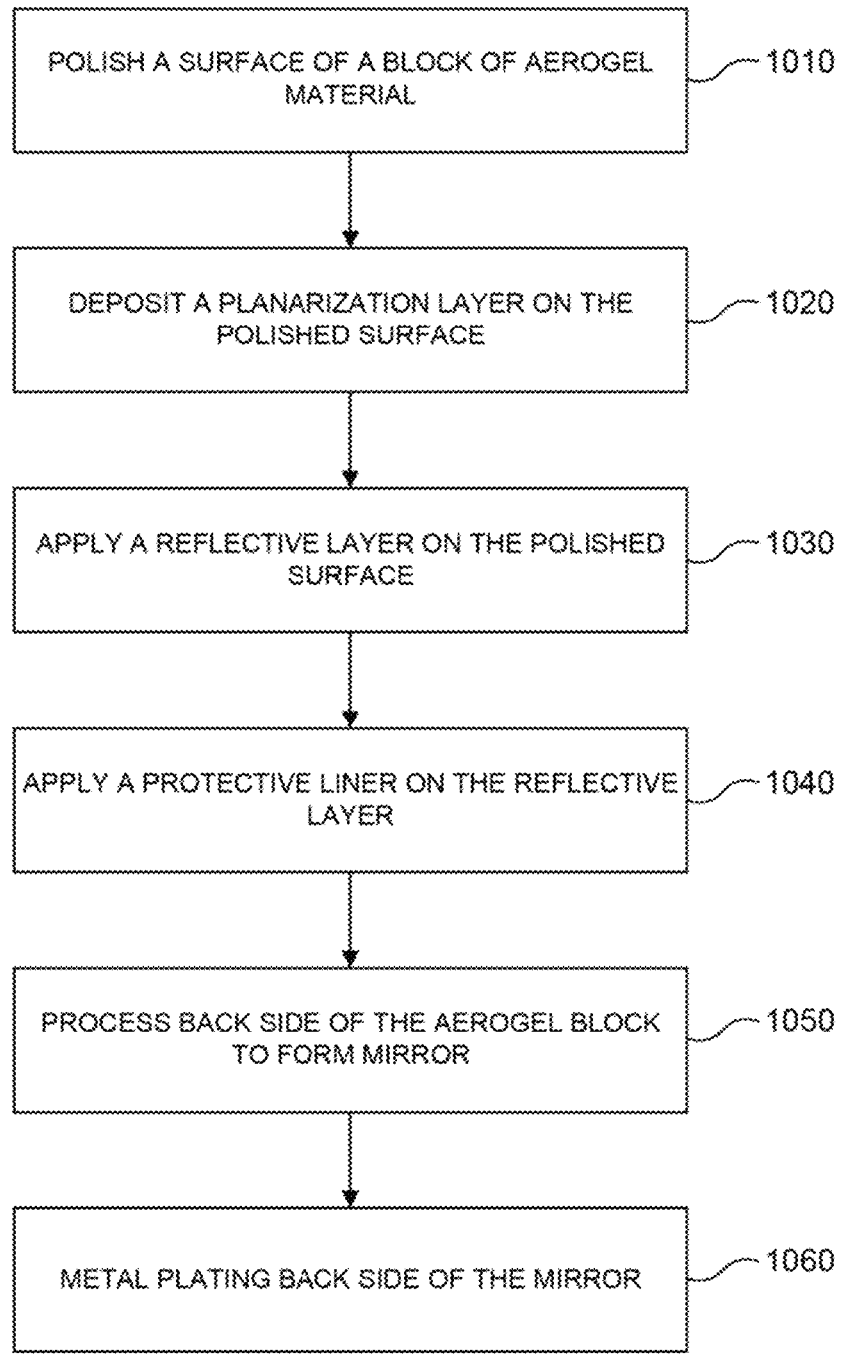

An exemplary method for manufacturing an ultralight mirror of the current disclosure is schematically illustrated in FIG. 10A and a flow chart of the method is shown in FIG. 10B. In the discussion below, reference will be made to both FIGS. 10A and 10B. In step 1010, a block 90 of an ultralight material is polished on one side to obtain a polished (or flat) surface 92 that will serve as the base for a mirror. As explained previously, any ultralight material (e.g., silica aerogel) may be used as block 90. Any suitable method may be used to polish the block 90. In some embodiments, the surface of the block 90 may be polished by, for example, grinding or lapping. In step 1020, a planarization layer (not shown) may be applied on the polished surface 92 to fill the exposed pores on the aerogel block. Any suitable material (e.g., silica, a metal, a metal oxide, a polymer, a varnish, a lacquer, etc.) may be used as the planarization layer. In some embodiments, silica may be used as the planarization layer. As would be recognized by a person skilled in the art, polishing the block 90 of porous material may expose some of pores on the polished surface 92. If applied, the planarization layer may at least partially fill in the exposed pores and provide a smooth surface for subsequent operations. In some embodiments, the planarization layer may be applied using a suitable vapor deposition technique (e.g., PVD, sputtering, CVD, etc.). In general, any suitable deposition technique may be used to form the planarization layer. In some embodiments, the planarization layer may not be applied on the polished surface 92. That is, in some embodiments, step 1020 may be omitted.

In step 1030, the polished surface 92 may then be coated with a reflective layer 94. Any material which reflects light with the desired reflectivity at the desired operating wavelength (e.g., wavelength ranging from about 800 nm to about 1600 nm for $SiO_2$ optical fiber-based telecommunication systems) may be used to form the reflective layer 94. Exemplary reflective materials used to form reflective layer 94 may include gold, silver, rhodium, platinum, copper, nickel, chromium, and aluminum. In some embodiments, a single one of the above-described material (e.g., a layer of gold, a layer of silver, etc.) may form the reflective layer 94. In some embodiments, reflective layer 94 may include multiple layers of different materials (e.g., stacked layers of gold, silver, etc.). In some embodiments, the reflective material may have high optimal reflectance for specific wavelengths (e.g., 920-940 nm, 1500-1550 nm, etc.). It should be noted that the material used to form reflective layer 94 may depend upon the intended application(s) for mirror 80. For example, when reflectance between wavelengths of 920-940 nm or 1500-1550 nm are desired, gold, or aluminum may be used to form the reflective layer 94. In applications where a different reflectivity is desired, a different material may be used. The reflective material may be coated to any desired thickness to form reflective layer 94. In some embodiments, the thickness of the reflective layer 94 may range from about 1 nm to about 2000 nm (or between about 20-2000 nm). In some embodiments, one or more interfacial layers (e.g., an adhesion-promoting bond layer) may be deposited between the reflective layer 94 and the polished surface 92 of the substrate, for example, to prevent the reflective layer 94 from peeling off the substrate, or to level the substrate surface. In some embodiments, the reflective layer 94 may be formed as a multi-material stack. For example, reflective layer 94 may comprise layers of multiple materials deposited one on top of another.

In some embodiments, the reflective layer 94 may include a multi-layer dielectric stack that forms a Bragg reflector. As would be recognized by a person skilled in the art, a Bragg reflector consists of a multilayer-stack of alternate high- and low-index films. Any multi-layer dielectric stack that forms a Bragg reflector may be applied on polished surface 92 to form the reflective layer 94. As would be recognized by a person skilled in the art, by the choice of the type and thickness of the dielectric materials in the stack, an optical coating (e.g., reflective layer 94) with specified reflectivity at different wavelengths of light may be obtained. Dielectric mirrors are also used to produce ultra-high reflectivity mirrors, and values of 99.999% or better over a narrow range of wavelengths can be produced using special techniques. Alternatively, the dielectric mirror may reflect a broad spectrum of light.

In some embodiments, an enhanced metallic mirror may be provided as reflective layer 94. An enhanced metallic mirror employs both a metallic reflecting surface and dielectric multilayer, that also act as a protection layer, and enhances the reflection (e.g., by a few percent). In such embodiments, reflective layer 94 may comprise one or more layers of a metallic reflecting material and one or more layers of a dielectric material. In some embodiments, the dielectric material(s) may be deposited on the reflective material(s). That is, in some embodiments, a dielectric material may form the exposed surface of the reflective layer 94. In some embodiments, one or more layers of a reflective material may be deposited atop one or more layers of a dielectric material to form the reflective layer 94. That is, in some embodiments, the reflective material may form the exposed surface of the reflective layer 94. It is also contemplated that, in some embodiments, alternating layers of a dielectric and reflecting material may form the reflective layer 94. In some embodiments, the deposited reflective layer 94 may be reground or polished to improve the reflectivity of the layer. Any known and suitable grinding and/or polishing method may be used to polish the reflective layer 94. In some embodiments, this regrinding and/or polishing step may be omitted.

In step 1040, a protective liner 96 may then be applied on the exposed surface of the reflective layer 94 coated in step 1130. In general, any suitable material may be used as the protective layer. In some embodiments, a material such as, for example, silicon monoxide, may be used as the protective liner 96. Although not a requirement, in some embodiments, the protective liner 96 may be a flexible tape-like material that is applied to the surface of the reflective layer 94. In some embodiments, protective liner 96 may be formed of a rigid material. The protective liner 96 may protect the surface of the reflective layer 94 and provide rigidity to the coated substrates and/or act as a supporting base during subsequent operations. In some embodiments, the protective liner 96 may be transparent to the wavelength of light that the mirror 80 operates on. In general, the protective liner 96 may be a rigid layer or a flexible layer that is transparent in the operating wavelength of the mirror. In some embodiments, the protective liner 96 may include one or more of glass, sapphire, blue tape, wax etc. In some embodiments, the protective liner 96 may be a polymeric or an elastomeric layer.

In step 1050, the back side of the ultralight mirror may be processed after applying the protective liner 96 on the coated reflective layer 94. In some embodiments, as illustrated in FIG. 10A, the back-side processing of step 1050 may include slicing the back side of the block 90 that forms the substrate of the mirror at the desired thickness. Any suitable technique may be used to slice the substrate, and any thickness of the substrate may be sliced. In general, the thickness may depend upon the desired application (e.g., the desired thickness of the mirror in the application). In some embodiments, a wire saw (e.g., diamond or Cubic Boron Nitride (CBN) wire saw) may be used to slice the back side of the substrate. In some embodiments, the sawing may preserve the bulk aerogel material as a monolith block 90 such that the separated aerogel material may serve as a substrate for additional mirrors. That is, steps 1110-1150 may be repeated on the removed aerogel material to form additional mirrors.

In some embodiments, the back-side processing of step 1050 may include machining the back side of the mirror (i.e., the aerogel substrate) to any desired configuration (for example, to the configuration illustrated in FIGS. 9A and 9B). Back-side machining may be done by any process. Although not a requirement, in some embodiments, the aerogel substrate may be machined using a CNC process or using a wire saw. In some embodiments, as schematically illustrated in FIG. 10A, a laser cutter 192 may be used to dice or cut the aerogel on the back side of the mirror to form multiple mirrors 80. As illustrated in FIG. 10A, during this step, a single wafer of the mirror-coated aerogel substrate may be diced (or singulated) to form multiple ultralight mirrors 80 of the desired shape and configuration. Any wafer dicing method (e.g., such as those used in the semiconductor industry) may be used to singulate the mirrors 80. Since such dicing processes are known to people of skilled in the art, they are not described herein.

In some embodiments, the back side of the mirror (i.e., the exposed aerogel substrate) may then be treated to impart desirable properties to the aerogel substrate. Any type of treatment may be applied to impart desirable properties to the aerogel. In some embodiments, the treatment may include sealing the back side of the aerogel substrate. Sealing the exposed back side of the aerogel substrate may reduce absorption of fluid (solvent, liquid, gas) into the aerogel. In some embodiments, the treatment may include depositing a suitable material to produce a hydrophobic or oleophobic surface on the back side of the aerogel substrate. Additionally, or alternatively, in some embodiments, the back side of the aerogel substrate may be plated with a metal in step 1060. Any suitable process (CVD, PVD, plating, etc.) may be used for metal coating of the back side of the substrate. Metal plating the substrate back side may aid in improving one or more of reflectivity, leveling of the porous surface, sealing against moisture and gases, and sealing of an evacuated volume of aerogel (as metallization occurs in vacuum) to prevent chipping or breakage of the uncoated aerogel during handling and assembly. Individual aerogel mirrors 80 may then be separated from the diced wafer and coupled to MEMS devices (for example, as shown in FIG. 8) using, for example, a pick-and-place SMT process.

In some embodiments, an exemplary fabrication method for a single aerogel mirror of the current disclosure may include one or more of: (a) grinding and/or polishing to a substantial mirror-finish on at least one side of a generally flat piece of an ultralight material (e.g., an aerogel); (b) metalizing the polished surface to form a mirror-like surface (e.g., gold, silver, aluminum, dielectric materials, stacks of different materials, a combination of materials, etc.); (c) re-grinding/re-polishing the metallized surface if needed to create a mirror-finish; (d) placing the aerogel piece mirror-side-down on a carrier (glass, sapphire, blue tape, wax etc.); (e) grinding the back side of the aerogel substrate to final thickness; (f) patterning the back side for geometrical features or dicing/singulation of the piece to form individual mirrors (square, round, or other desired shapes); metalizing the back side for sealing, metal bonding, etc.; and assembly of the finished mirrors in a pick-and-place process.

Many modifications may be made to the exemplary fabrication process described above. Some of these modified processes are described below. For the sake of brevity, in the discussion below, components and process steps that are similar to those described with reference to a previously described embodiment(s) will not be described again in a later described embodiment. The prior description is equally applicable in the later described embodiment(s).

Figure 11A:
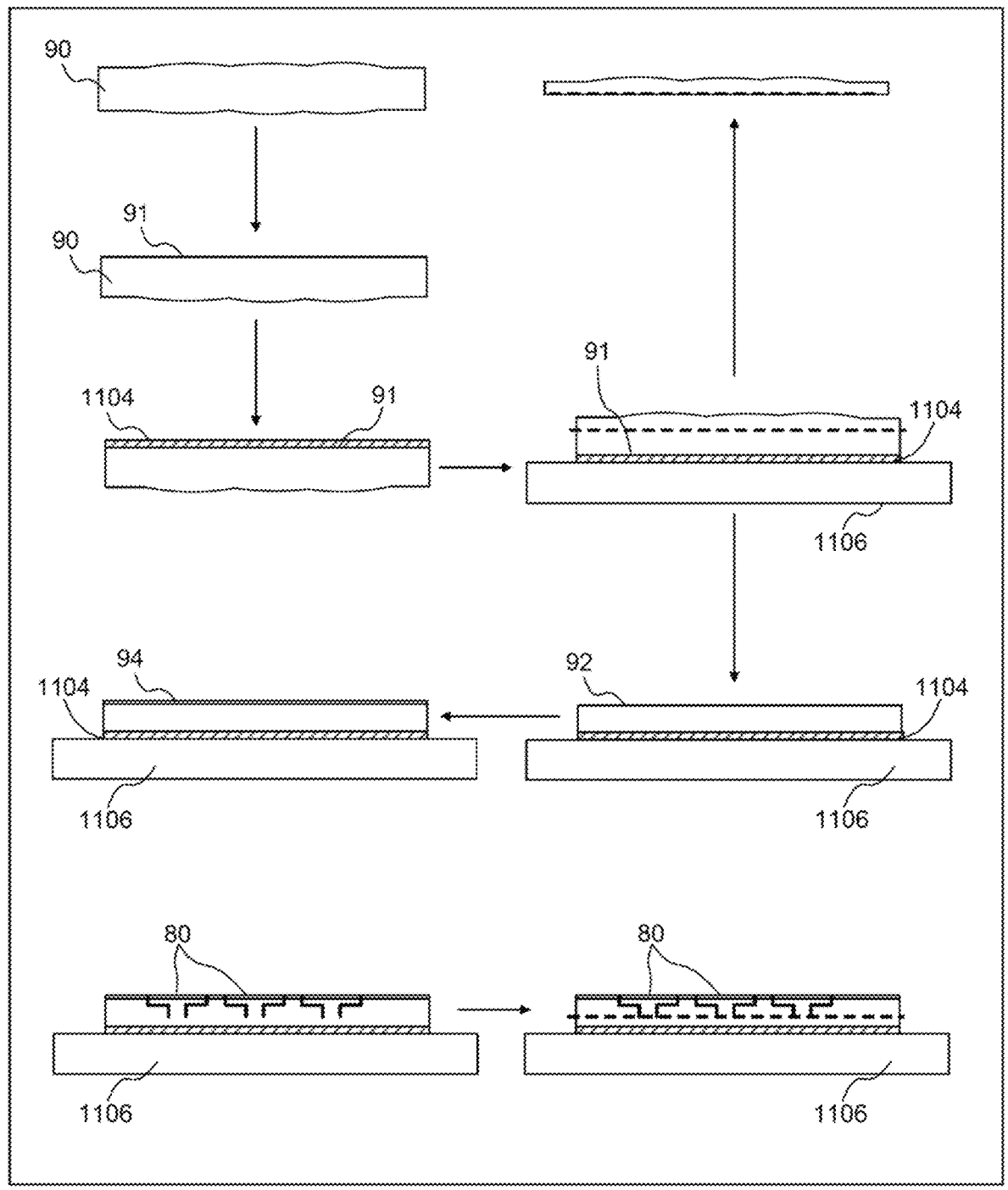
FIGS. 11A and 11B are illustrations of another exemplary process of fabricating a mirror of the current disclosure.
Figure 11B:
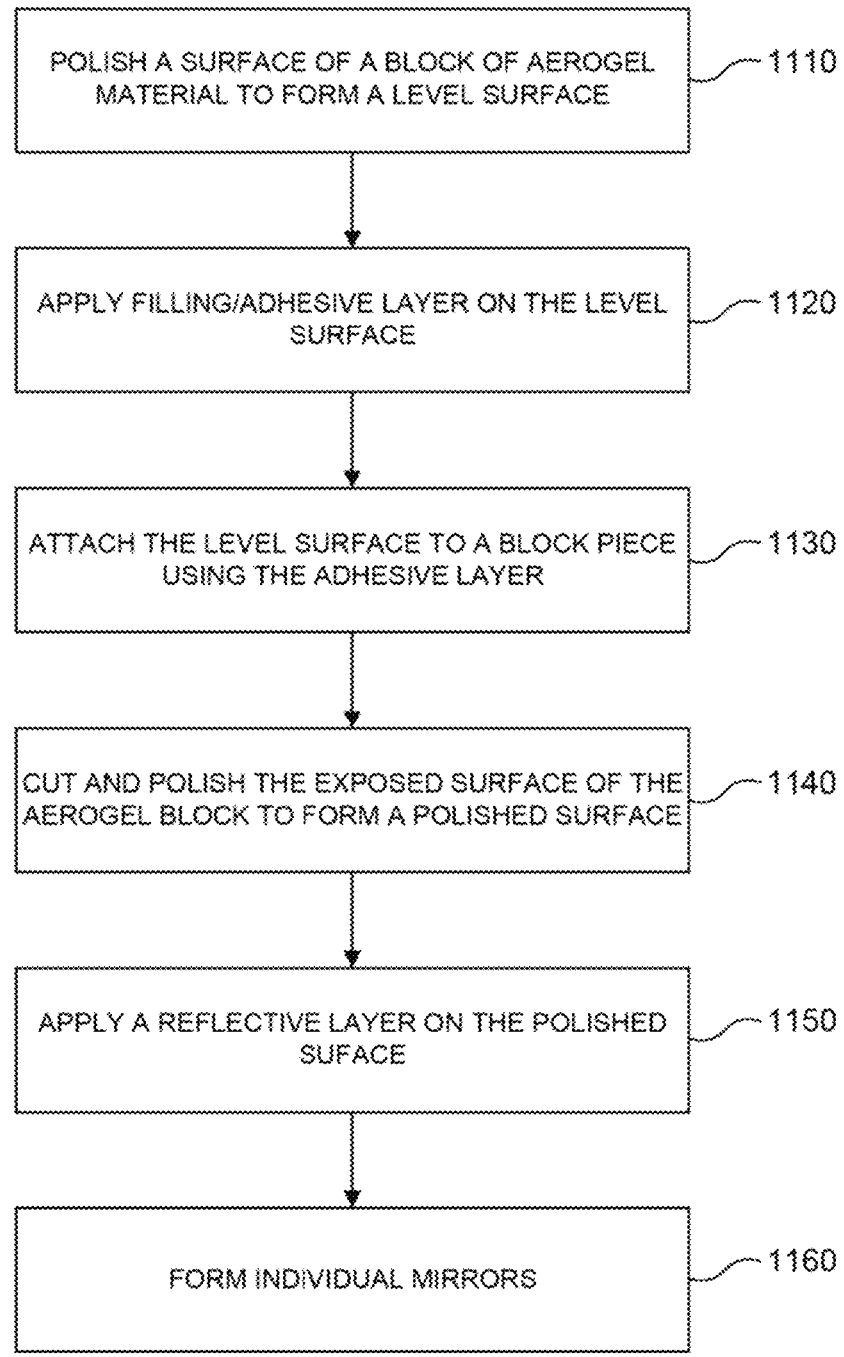

FIGS. 11A and 11B illustrate another exemplary method of fabricating aerogel mirrors of the current disclosure. FIG. 11A schematically illustrates the fabrication process and FIG. 11B shows a flow chart of the fabrication process. In the discussion below, reference will be made to both FIGS. 11A and 11B. In step 1110, a block 90 of the aerogel material may be polished on one side to obtain a level surface 91. In step 1120, a filling layer, or an adhesive layer 1104 may be applied to the level surface 91 of the aerogel block 90. The filling/adhesive layer 1104 may at least partially fill in the exposed pores on the level surface 91. In step 1130, the adhesive layer 1104 may be used to attach the aerogel block 90 to a block piece 1106. Block piece 1106 may provide rigidity to the substrate during subsequent processing operations. In some embodiments, block piece 1106 may be similar to the protective liner 96 described with reference to FIGS. 10A and 10B and may include one or more of glass, sapphire, blue tape, wax etc. In step 1140, the exposed surface of the aerogel block (i.e., top surface in FIG. 11A) may be cut and polished to form a polished surface 92. The separated portion of the aerogel block may be used to form additional mirrors. In some embodiments, after polishing in step 1140, a planarization layer (not shown) (e.g., silica ($SiO_2$), etc.) may be applied to (at least partially) fill in the exposed pores on the polished surface 92 of the aerogel substrate. In some embodiments, the planarization layer may be applied using a suitable vapor deposition technique (e.g., PVD, sputtering, etc.). In general, any suitable deposition technique may be used. In some embodiments, the planarization layer may not be applied. In step 1150, a reflective layer 94 may be applied to the polished surface 92. The reflective layer 94 may be formed by similar materials and processes as explained with reference to step 1030 of FIG. 10B. In step 1160, the desired shape of the mirror 80 may be formed and individual mirrors 80 singulated by known machining operations as described previously (e.g., with reference to step 1050). In some embodiments, these machining operations may include cutting the side walls of the component (e.g., with a wire saw) and cutting the base of the mirrors using a planar cut.

Figure 12A:
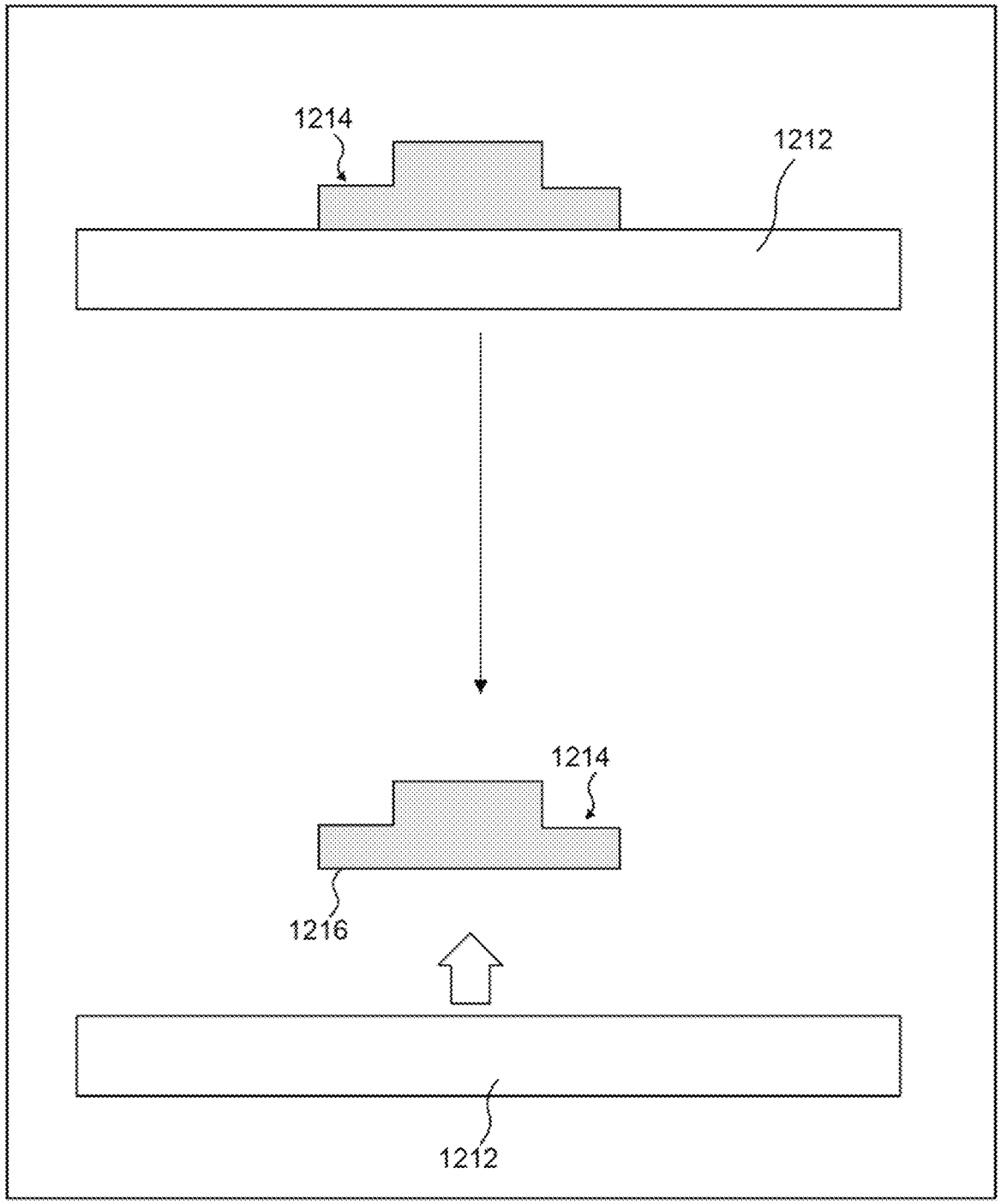
FIGS. 12A and 12B are illustrations of another exemplary process of fabricating a mirror of the current disclosure.
Figure 12B:
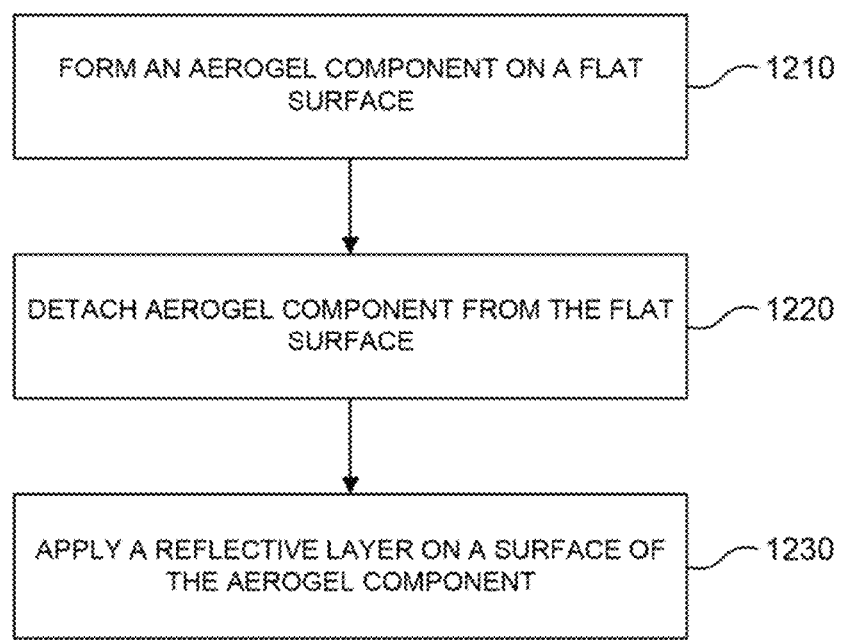

In some embodiments, additive manufacturing (AM) processes may be used to manufacture ultralight mirrors of the current disclosure. FIGS. 12A and 12B illustrate an exemplary method of fabricating mirrors of the current disclosure. FIG. 12A schematically illustrates the fabrication method and FIG. 12B is a flow chart of the method. In step 1210, an ultralight or aerogel component 1214 may be formed on a flat surface (e.g., an optically flat surface). In some embodiments, aerogel component 1214 may be 3D printed using techniques known in the art. Since 3D printing techniques are well known in the art, they will not be described herein. In some embodiments, the aerogel component 1214 may be 3D printed to the final desired shape and configuration of the mirror (see, e.g., FIGS. 9A and 9B). In some embodiments, to obtain an optical surface on the manufactured aerogel component 1214, the aerogel material may be temporarily printed on an optically finished flat substrate 1212 in step 1210. Exemplary optically finished flat substrates 1212 may include a polished (or super polished) metal sheet or polytetrafluoroethylene (PTFE) like polished surfaces in the case of inorganic aerogel (e.g., silica aerogels). In some embodiments, a wafer (e.g., a semiconductor wafer), a mica slab, a quartz slab, etc. may be used as the optically finished flat substrate 1212. In general, any material with a flat surface having the desired flatness may be used. In some embodiments, the surface roughness ($R_a$) of the optically finished flat substate 1212 may be less than or equal to (≤) about 10 nanometers (nm). In some embodiments, $R_a$ may be ≤ about 5 nm, between about 1-5 nm. In some embodiments, $R_a$ may be ≤ about 1 nm. In some embodiments, a perfectly polished surface may not be needed, and $R_a$ of the optically finished flat substate 1212 may be ≤ about 20 nm.

In step 1220, the aerogel component 1214 may then be detached (separated) from the optically finished flat substate 1212. Any known mechanical, chemical, or thermal technique may be used to detach the aerogel component 1214 from the optically finished flat substate 1212. When the aerogel component 1214 is detached from the substrate 1212 in step 1220, the surface roughness of the aerogel component 1212 may be substantially similar to that of the substrate 1212 surface. Thus, a flat surface 1216 may naturally be formed on the mating surface of the aerogel component 1214 and the substrate 1212 when the component 1214 is detached from the substrate 1212. Using such a method to form the aerogel component 1214 may avoid the need of a polishing step to obtain an optically flat surface on the 3D printed aerogel component 1214. Flat surface 1216 may be similar to the polished surface 92 described with reference to previous embodiments. When the aerogel component 1214 is lifted-off the substrate 1212, the pores in the flat surface 1216 of the aerogel component 1214 may already be closed or filled. In some embodiments, as described with reference to the previous embodiments, a planarization layer may be applied on the flat surface 1216 using a suitable vapor deposition technique (e.g., PVD, sputtering, etc.). If applied, the planarization layer may close (at least partially) any open pores on the flat surface 1216. In some embodiments, the planarization layer may not be applied. In step 1230, a reflective layer 94 may be formed on the flat surface 1216 as described in previous embodiments (e.g., steps 1030 of FIG. 10B, step 1150 of FIG. 11B). The reflective layer 94 may be formed by reflective or dielectric materials as explained previously (e.g., with reference to FIGS. 10A and 10B).

Figure 13A:
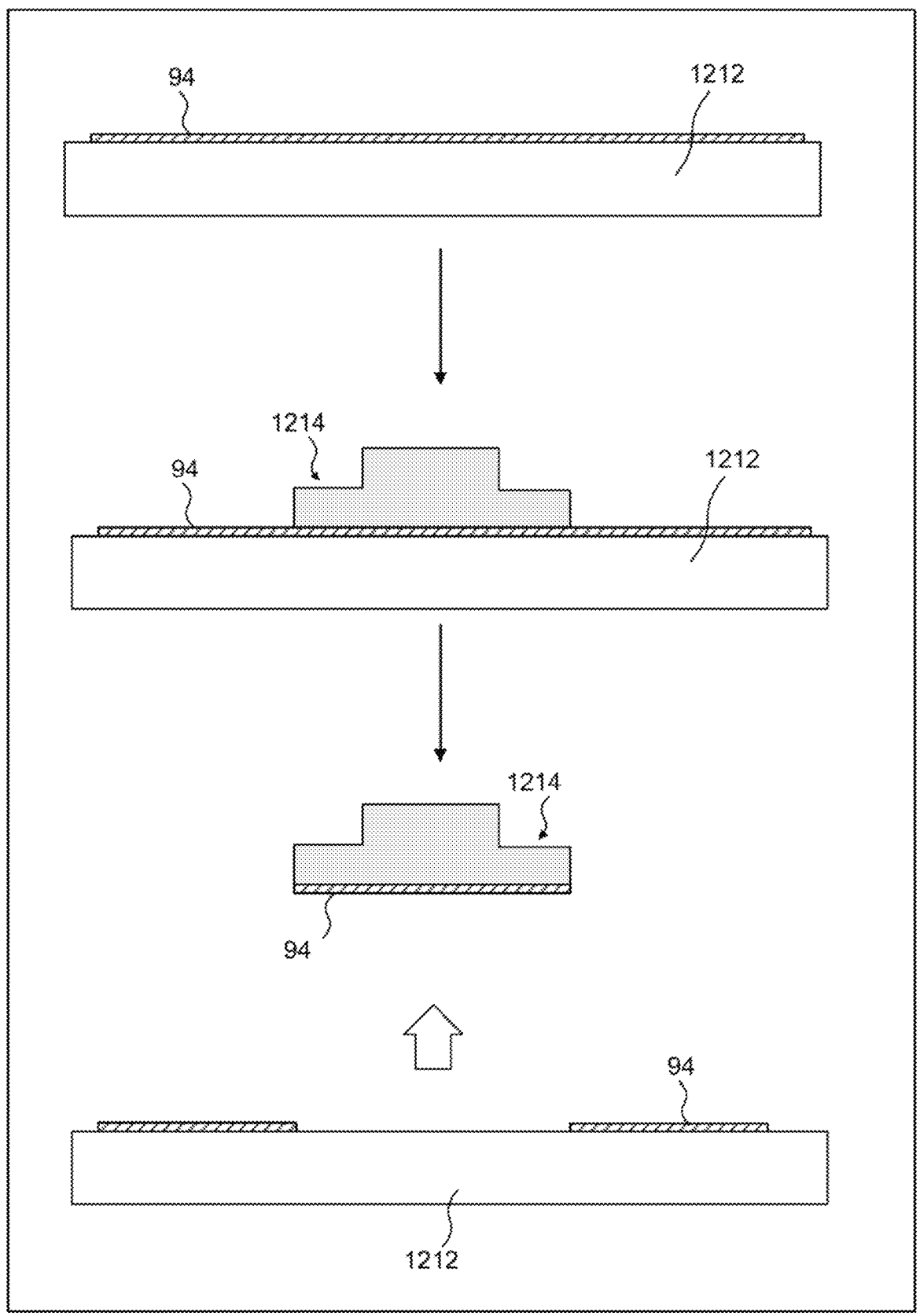
FIGS. 13A and 13B are illustrations of another exemplary process of fabricating a mirror of the current disclosure.
Figure 13B:
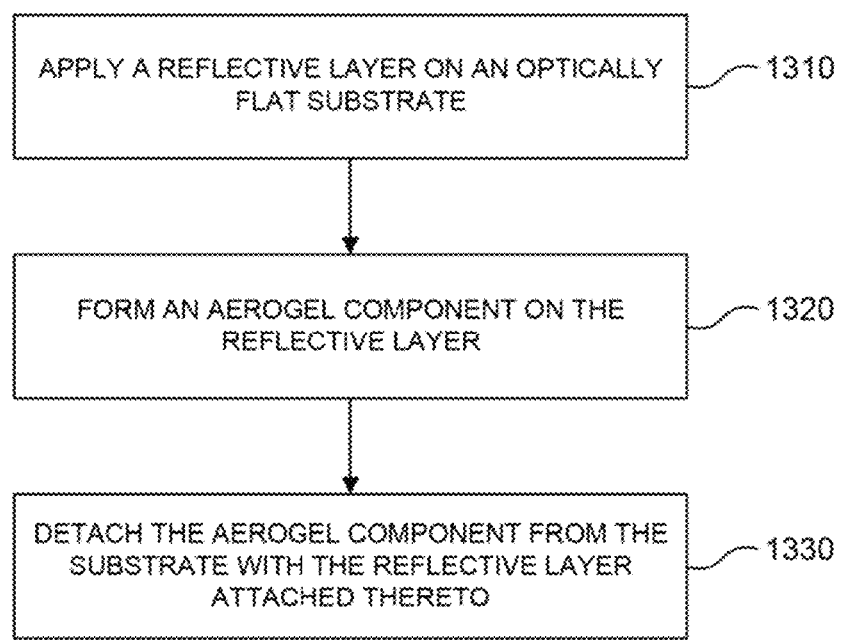

FIGS. 13A and 13B illustrate another exemplary method of fabricating aerogel mirrors of the current disclosure. FIG. 13A schematically illustrates the fabrication process and FIG. 13B shows a flow chart of the fabrication process. In the discussion below, reference will be made to both FIGS. 13A and 13B. In step 1310, the flat surface of the previously described (with reference to FIGS. 12A and 12B) optically finished flat substate 1212 is coated with a reflective layer 94. Reflective layer 94 may be formed on the substrate 1212 by reflective or dielectric materials as explained with reference to step 1030 of FIG. 10B. The reflective layer 94 may cover the entire surface of the substrate 1212 or may cover selected regions of the substrate surface (e.g., as a patterned coating). As a person of ordinary skill in the art would recognize, a patterned coating of reflective layer 94 may be formed on the substate 1212 using conventional lithographic techniques. In step 1320, the aerogel component 1214 is formed atop the reflective layer 94 applied on the optically finished flat substate 1212. In some embodiments, as discussed with reference to the embodiment of FIGS. 12A and 12B, the aerogel component 1214 may be formed on substrate 1212 using 3D printing. In step 1330, the aerogel component 1214 may be detached from the substrate 1212. When the aerogel component 1214 is detached from the substrate 1212 (in step 1330), the reflective layer 94 on the area of the substrate 1212 that the aerogel component 1214 was previously attached to, may separate from the substrate 1212 and remain on the mating surface of the aerogel component 1214. Thus, the surface of the separated aerogel component 1214 may have a reflective layer 94 and form a mirror.

The aerogel component 1214 may be detached from the substrate 1212 (in step 1330) using any technique known in the art. In some embodiments, the aerogel component 1214 may be detached from the substrate 1212 by mechanically lifting-off or shearing the aerogel component 1214 from the substrate 1212. In some cases, a mechanical separation of the aerogel component 1214 may damage (e.g., fracture, chip, etc.) the aerogel component 1214 and/or the reflective layer 94. Therefore, in some embodiments, the surface of the substrate 1212 on which the reflective layer 94 is formed may be chemically or thermally treated (e.g., pretreated) to weaken the adhesion strength of the reflective layer 94 to the substrate 1212. Any type of thermal or chemical pretreatment may be applied. In some embodiments, a suitable release layer may be deposited on the substrate 1212 surface before forming the reflective layer 94 thereon. The release layer may assist in separating the reflective layer 94 from the substrate 1212 when the aerogel component 1214 is lifted off. In some embodiments, a sacrificial layer may be deposited on the substrate 1212 before the reflective layer 94 is formed. The sacrificial layer may dissolve or weaken in the presence of a solvent and separate the reflective layer 94 from the substrate 1212. In some embodiments, the substrate 1212 may be preheated before depositing the reflective layer 94 and forming the aerogel component 1214 thereon. When the assembly is subsequently cooled, the coefficient of thermal expansion (CTE) mismatch between the constituent materials may assist in separating the reflective layer 94 from the substrate 1212.

In some embodiments, a chemical or a thermal treatment may be applied after the aerogel component 1214 is formed on the substrate 1212 (with the reflective layer 94) to separate the aerogel component 1214 with the reflective layer 94 from the substrate 1212. In some such embodiments, the assembly may be heated after the aerogel component 1214 is formed on the substrate 1212. Because of the different CTEs of the constituent materials, when the substrate 1212 with the aerogel component 1214 is heated, the CTE mismatch induced stresses may assist in separating the reflective layer 94 from the substrate 1212. In some embodiments, the thickness of the substrate 1212 may be such that the substrate 1212 can be flexed (e.g., curved, deflected mechanically) to separate the aerogel component 1214 with the reflective layer 94 from the substrate 1212. In some embodiments, the substrate 1212 may be formed of a material that can be etched or dissolved by a chemical etchant or solvent to separate the aerogel component 1214 with the reflective layer 94 from the substrate 1212. In some such embodiments, the substrate 1212 may comprise mica, and a chemical solvent (e.g., Tetrahydrofuran (THF)) may be used to chemically dissolve the mica substrate 1212 and release the aerogel component with the reflective layer 94 (e.g., gold) from the substrate 1212. Using a chemical and/or a thermal method to release the aerogel component 1214 with the reflective layer 94 from the substate 1212 may avoid applying mechanical stress on the fragile aerogel component 1214 and thereby prevent damage.

Figure 14A:
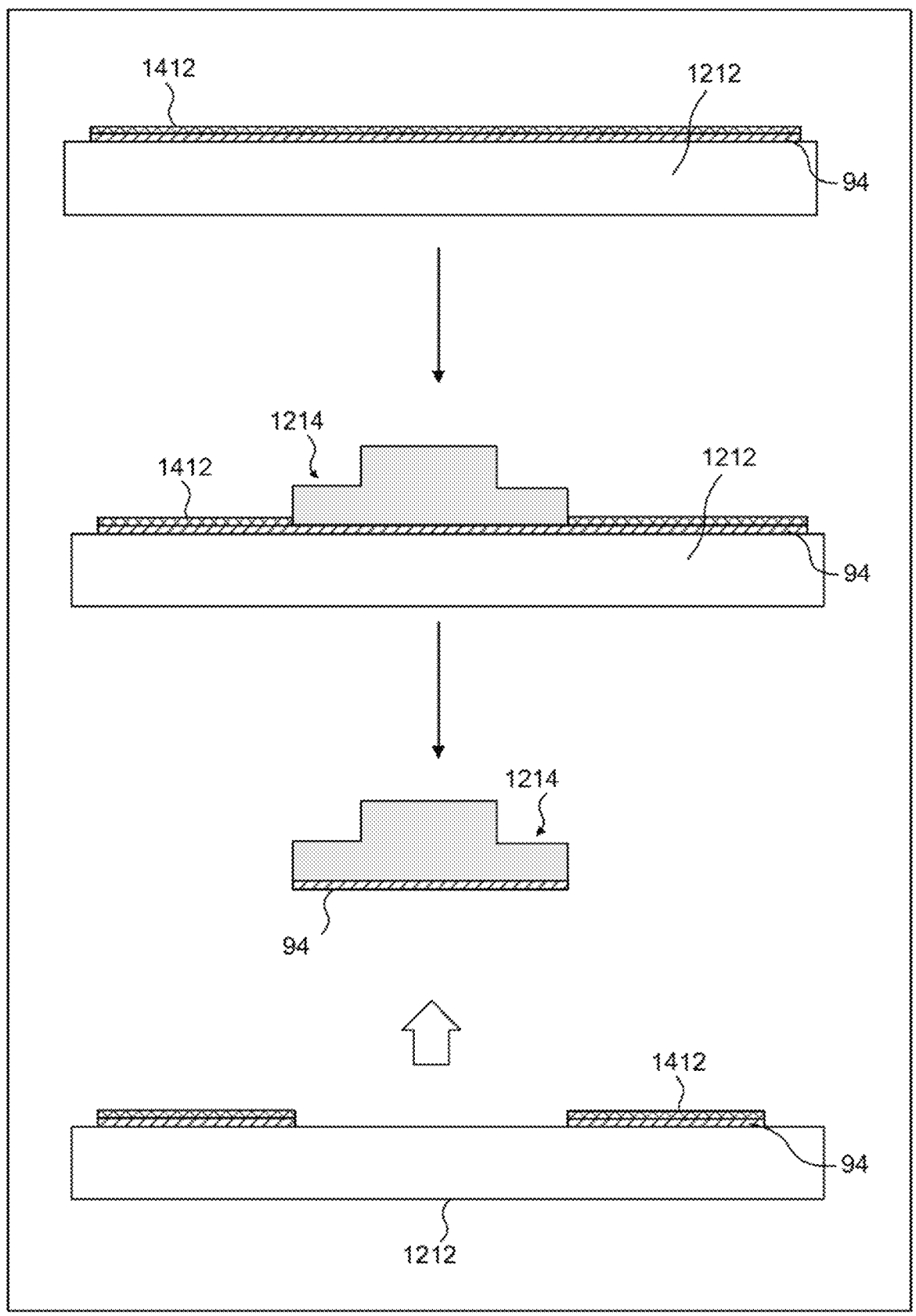
FIGS. 14A and 14B are illustrations of another exemplary process of fabricating a mirror of the current disclosure.
Figure 14B:
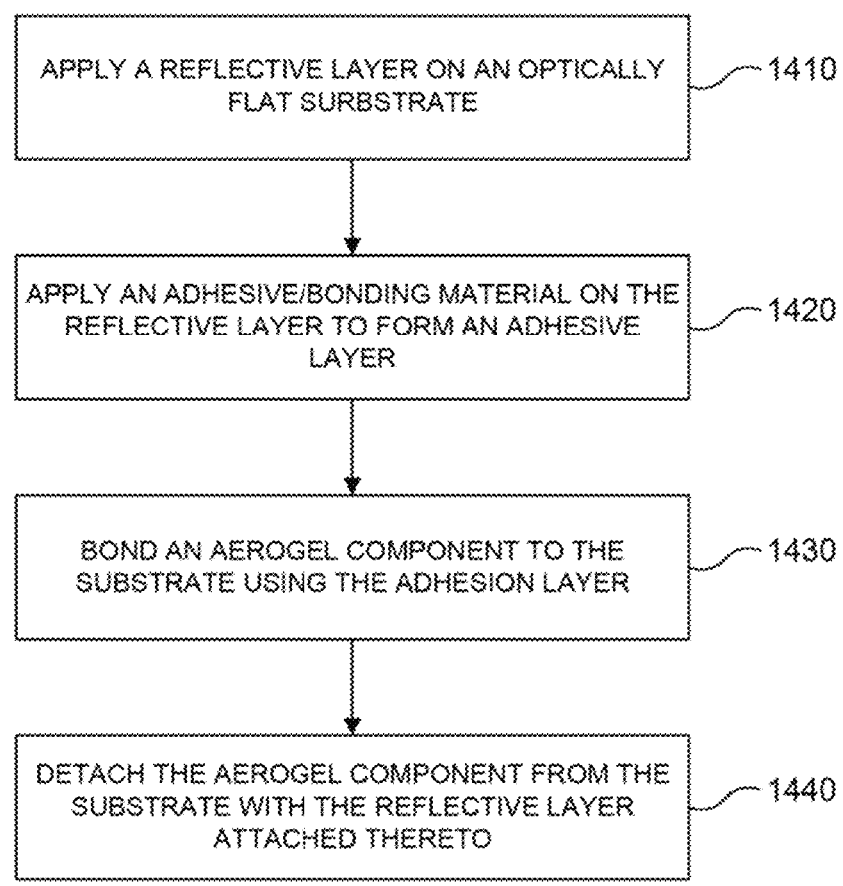

Thus, as explained with reference to the embodiment of FIGS. 13A and 13B, as an alternative to direct deposition of the reflective layer 94 (or the optical coating) on the aerogel component 1214 (as in the embodiment of FIGS. 12A and 12B), the reflective layer 94 may be transferred to the aerogel component 1214 from another substrate. FIGS. 14A and 14B illustrate another exemplary method where the reflective layer 94 is transferred to the aerogel component 1214. FIG. 14A schematically illustrates the fabrication process and FIG. 14B shows a flow chart of the fabrication process. In the discussion below, reference will be made to both FIGS. 14A and 14B. In step 1410, similar to step 1310 of FIGS. 13A and 13B, a reflective layer 94 may first be deposited on the optically finished flat substate 1212. The reflective layer 94 may cover the entire surface of the substrate 1212 or may be patterned to cover selected regions of the substrate 1212. In some embodiments, the substrate 1212 (e.g., silicon wafer, mica, etc.) may be plated with gold (e.g., vapor deposition) to form reflective layer 94 in step 1410. In step 1420, a thin layer of an adhesive material (e.g., about 0.5-5 microns (μm)) may be applied on the exposed surface of the reflective layer 94 to form an adhesion layer 1412. Any suitable type of adhesive material may be used. In some embodiments, the adhesive may be one of a UV-curable adhesive, thermally curable adhesive, cyanoacrylate adhesive, Pressure Sensitive Adhesive (PSA), or an epoxy adhesive. Although not a requirement, in some embodiments, the adhesive material may have a high glass transition temperature (Tg) and may be spreadable. In some embodiments (e.g., in an embodiment where the aerogel component 1214 is not sealed with a coating to close its pores), the viscosity of the adhesive may be high enough to prevent penetration of the adhesive into the small pores of the aerogel component 1214. Penetration of the adhesive into the aerogel component 1214 may degrade the integrity of the aerogel. The adhesion layer 1412 may be applied using any suitable technique in step 1420. In some embodiments, one or more of the following application techniques may be used to apply the adhesion layer 1412: spray, spin, dip, molecular layer transfer, screen printing.

In step 1430, an aerogel component 1214 may be bonded to the substrate 1212 using the adhesion layer 1412. In general, the aerogel component 1214 may be fully formed (see, e.g., FIGS. 9A-9B), partially formed, or unformed when it is attached to the substrate 1212. For example, in some embodiments, an aerogel block may be attached to the substrate in step 1430. After the reflective layer 94 is be transferred to a surface of the aerogel block (in step 1440), the aerogel block may be shaped (e.g., machined, etc.) to its final desired shape. Alternatively, in some embodiments, the aerogel component 1214 may be formed to its final shape (by cutting and polishing, 3D printing, etc.), and then attached to the substrate 1212 using the adhesion layer 1412 in step 1430. In some embodiments, some features of the aerogel component 1214 may be formed prior to bonding (in step 1430) and other features may be formed subsequent to bonding.

After adhesion of the aerogel component 1214 on the substrate 1212 is complete, in step 1440, the aerogel component 1214 may be detached from the substrate 1212 with the reflective coating 94 transferred to its surface. As described with reference to the embodiment of FIGS. 13A-13B, any suitable mechanical, chemical, or thermal technique may be used to detach the component 1214 from the substrate 1212. As also explained previously, in some embodiments, the substrate 1212 may be coated with a release layer (e.g., a monolayer of fluorinated silane) to create a non-stick surface to facilitate subsequent release of the reflective layer 94. The release layer may be applied, for example, using techniques such as spin coating, dipping or evaporation. Alternatively, a sacrificial layer may be applied on top of the substrate 1212 prior to depositing the reflective layer 94. For example, the sacrificial layer may be a water-soluble polymer, such as Polyvinyl Alcohol (PVA), that can be removed, for example, by dissolving the sacrificial layer away to facilitate release of the reflective layer 94 from the substrate 1212.

Figure 15A:
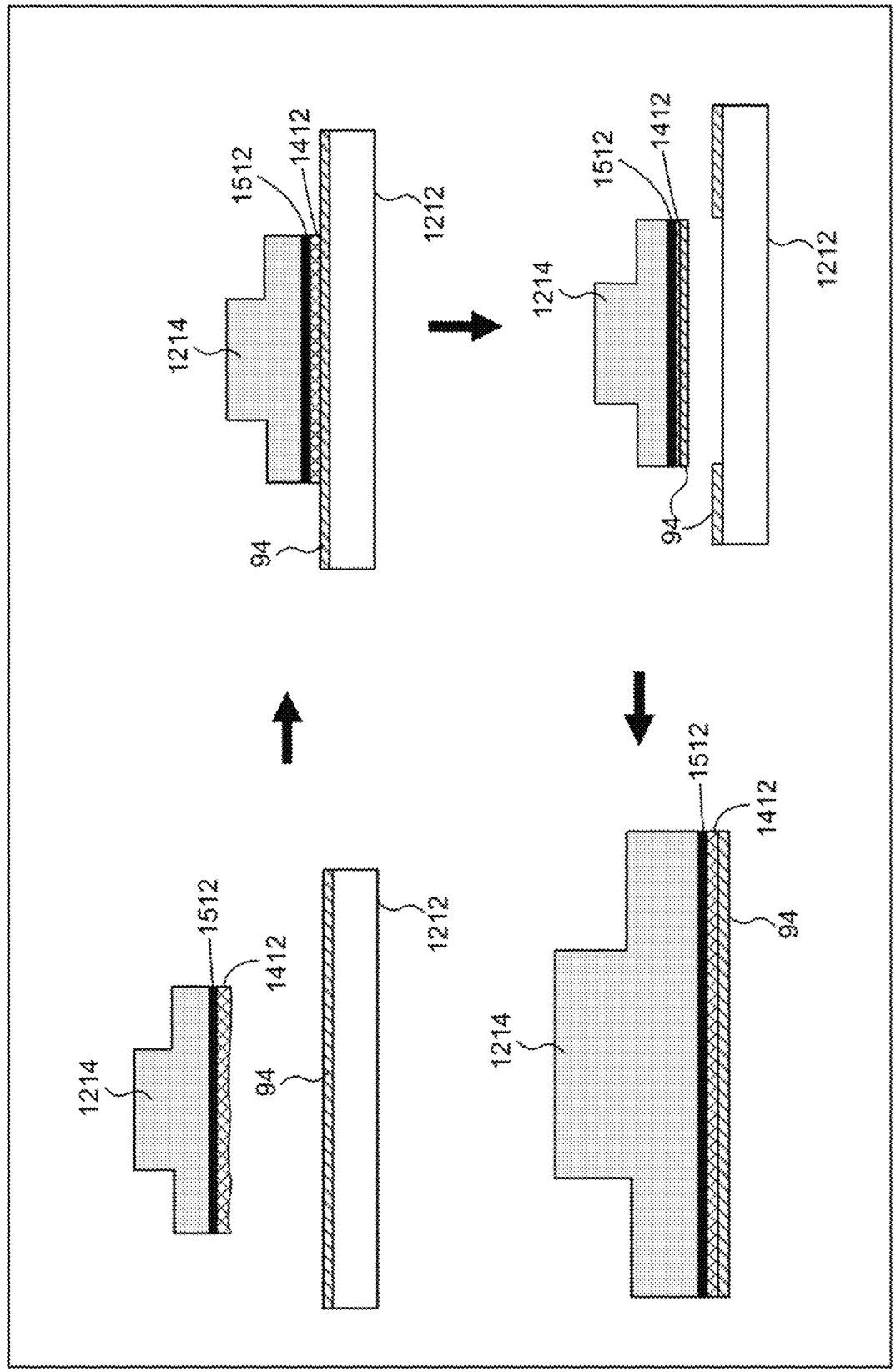
FIGS. 15A and 15B are illustrations of another exemplary process of fabricating a mirror of the current disclosure.
Figure 15B:
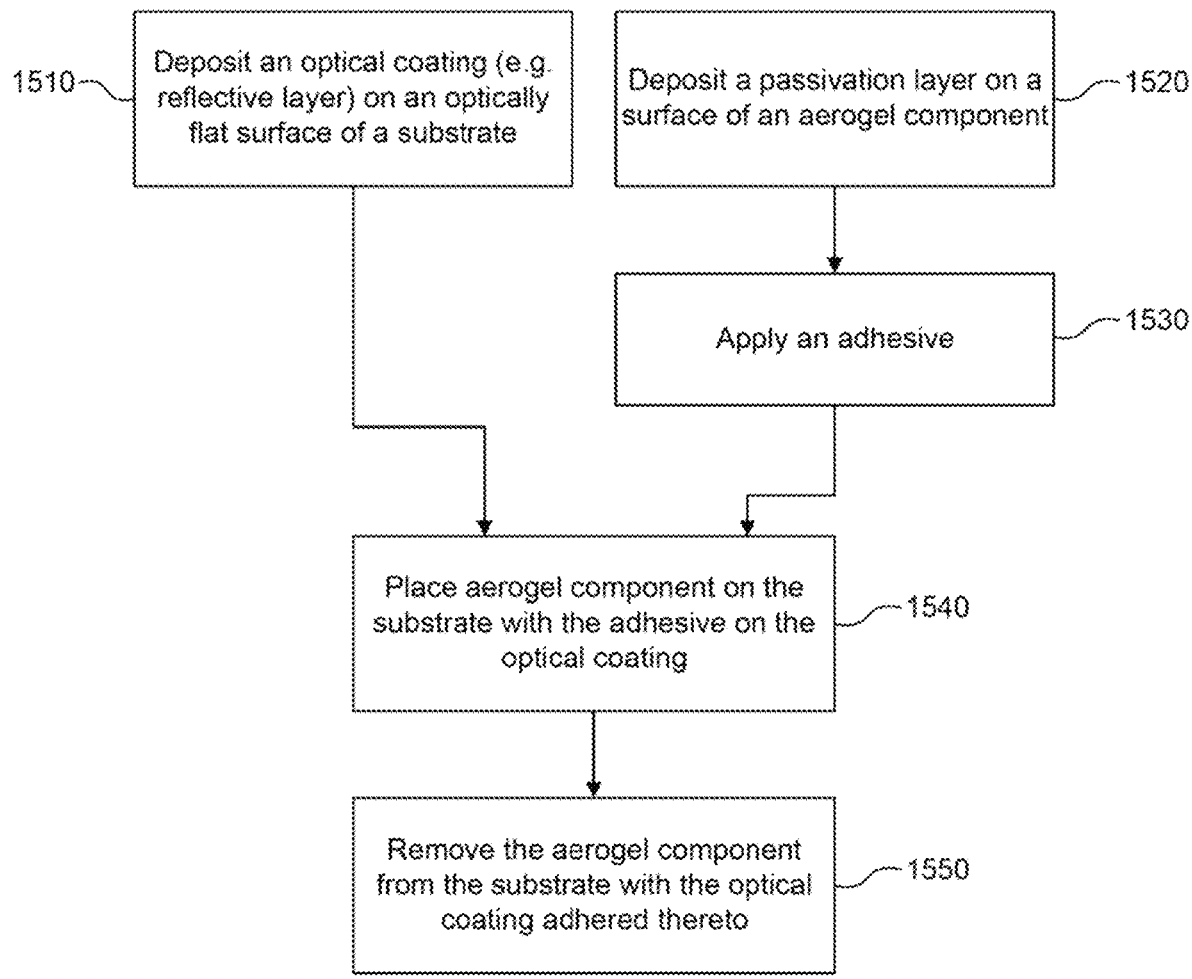

FIGS. 15A and 15B illustrate another exemplary method of fabricating aerogel mirrors of the current disclosure. FIG. 15A schematically illustrates the fabrication process and FIG. 15B shows a flow chart of the fabrication process. In the discussion below, reference will be made to both FIGS. 15A and 15B. In step 1510, a reflective layer 94 (or optical coating, e.g., of gold) is applied on the surface of an optically finished flat substate 1212 (e.g., silicon wafer, mica, glass, etc.). As described with reference to the previously described embodiments, any suitable process (e.g., vapor deposition, chemical vapor deposition, physical vapor deposition, etc.) may be used to deposit the reflective layer 94 on the substrate 1212 and the reflective layer 94 may have any configuration and structure (single layer, multiple stacked layers, etc.).

In step 1520, a passivation layer 1512 is deposited on surface of an aerogel component 1214. As described with reference to the embodiment of FIGS. 14A and 14B, the aerogel component 1214 in this step may be completely formed in the desired shape (e.g., see, FIGS. 9A and 9B), may be partially formed, or may be an unformed aerogel block. In general, the passivation layer 1512 may be applied to a surface of the aerogel component 1214 where a mirror is desired to be formed. Any suitable material that reduces the ingress of adhesive material into the pores of the aerogel component 1214 may be used to form the passivation layer 1512. In some embodiments, the passivation layer 1512 may be formed of one or more of gold, aluminum, silica, etc. In some embodiments, passivation layer 1512 may include one of a metal, metal oxide, silica, a polymer, a varnish, or a lacquer. In some embodiments, a polymer material may also be used to form the passivation layer 1512. The passivation layer 1512 may be formed on the surface of the aerogel component 1214 by any suitable method (e.g., CVD, PVD, plating etc.). In some embodiments, the surface of the aerogel component 1214 may be coated with an acrylate film or a Parylene film to form the passivation layer 1512. In some embodiments, a polymer material may be spin coated on the aerogel surface to form the passivation layer 1512. In some embodiments, after application, the passivation layer 1512 may be cured (e.g., by heating or subjecting it to another known curing process).

In step 1530, an adhesion layer 1412, for example, a thin layer of an adhesive material (e.g., about 0.5-5 µm thick), may be disposed or applied on the passivation layer 1512. As described with reference to FIGS. 14A and 14B, any suitable adhesive or bonding material may be used to form adhesion layer 1412. In some embodiments, the bonding material may be a spreadable adhesive having a high Tg, and high viscosity. The adhesive may, for example, be a UV-curable adhesive, or a thermally curable adhesive. In some embodiments, the viscosity of the adhesive material may be such that it has a honey-like consistency. The adhesion layer 1412 may be applied by any suitable method, such as, for example, spray, spin, dip, molecular layer transfer, screen printing, etc. In some embodiments, the adhesive-coated aerogel component 1214 may be subjected to a treatment process (UV curing process, temperature curing, etc.) to allow the adhesive to bond with the passivation coated or sealed aerogel component 1214. Although the adhesion layer 1412 is described as comprising an adhesive material that couples the mating layers together by adhesion, this is only exemplary. In general, the adhesion layer 1412 may comprise any material that couples the mating or adjoining layers by any mechanism (chemical bonding, mechanical interlocking, molecular bonding (e.g., monolayer bonding at annealing and high pressure, etc.). For example, in some embodiments, the adhesion layer 1412 may include a layer of a chemical material that forms a chemical bond with the materials of the mating layers to couple the layers together. In some embodiments, the adhesion layer 1412 may include a layer of a weld or solder material. After the weld material is applied, subsequent processing may melt or fuse the weld or solder material to attach the adjoining layers together.

In step 1540, the aerogel component 1214 coated with the adhesion layer 1412 may be placed on the substrate 1212 coated with the reflective layer 94 such that the adhesion layer 1412 contacts the reflective layer 94. In some embodiments, a force may also be applied, for example, to form a constant thickness of the adhesion layer 1412. In some embodiments, the adhesion layer 1412 may then be allowed to bond to the reflective layer 94. In some embodiments, step 1540 may include applying pressure to the components or heating the components to assist the adhesion layer 1412 in coupling the adjoining layers together.

Once bonding (e.g., adhesion) is complete, in step 1550, the aerogel component 1214 is detached, with the reflective layer 94 transferred to the adhesive-coated surface of the aerogel component 1214. In some embodiments, the component 1214 may be lifted off the substrate 1212 with the reflective layer 94 attached thereto. In some embodiments, the substrate 1212 may be removed by other methods (for example, etching, dissolving, laser cutting, etc.). For example, in some embodiments, laser scribing may be used to cut the substrate 1212 around the aerogel component 1214 and the remaining substrate 1212 removed by another method (mechanical, chemical, etc.). In some embodiments, as described with reference or other embodiments, prior to application of the reflective layer 94, a release layer (e.g., a monolayer of fluorinated silane, etc.) or a sacrificial layer may be coated on the surface of the substrate 1212 where the reflective layer 94 will be deposited. The release layer may create a non-stick surface to facilitate subsequent release of the reflective layer 94 from the substrate 1212. The sacrificial layer may be soluble in water or other solvent to facilitate release of the reflective layer 94 from the substrate 1212.

When the aerogel component 1214 is detached from the substrate 1212 (in step 1550), the surface of the aerogel component 1214 may have the reflective layer 94 attached thereto by the adhesion layer 1412 with the passivation layer 1512 disposed between the aerogel component 1214 and the adhesion layer 1412. As would be recognized by a person skilled in the art, although the adhesion layer 1412 is illustrated as a layer of uniform thickness, this is only exemplary. In general, the adhesion layer 1412 between the reflective layer 94 and the passivation layer 1512 may have a constant, a non-uniform thickness, or a varying thickness. It should also be noted that the aerogel component 1214 may be shaped or formed to the desired shape (e.g., FIGS. 9A and 9B) before the reflective layer 94 is transferred to its surface, or the reflective layer 94 may first be transferred to an aerogel block before the final shape of the aerogel component is formed (by machining, etc.).

Figure 16A:
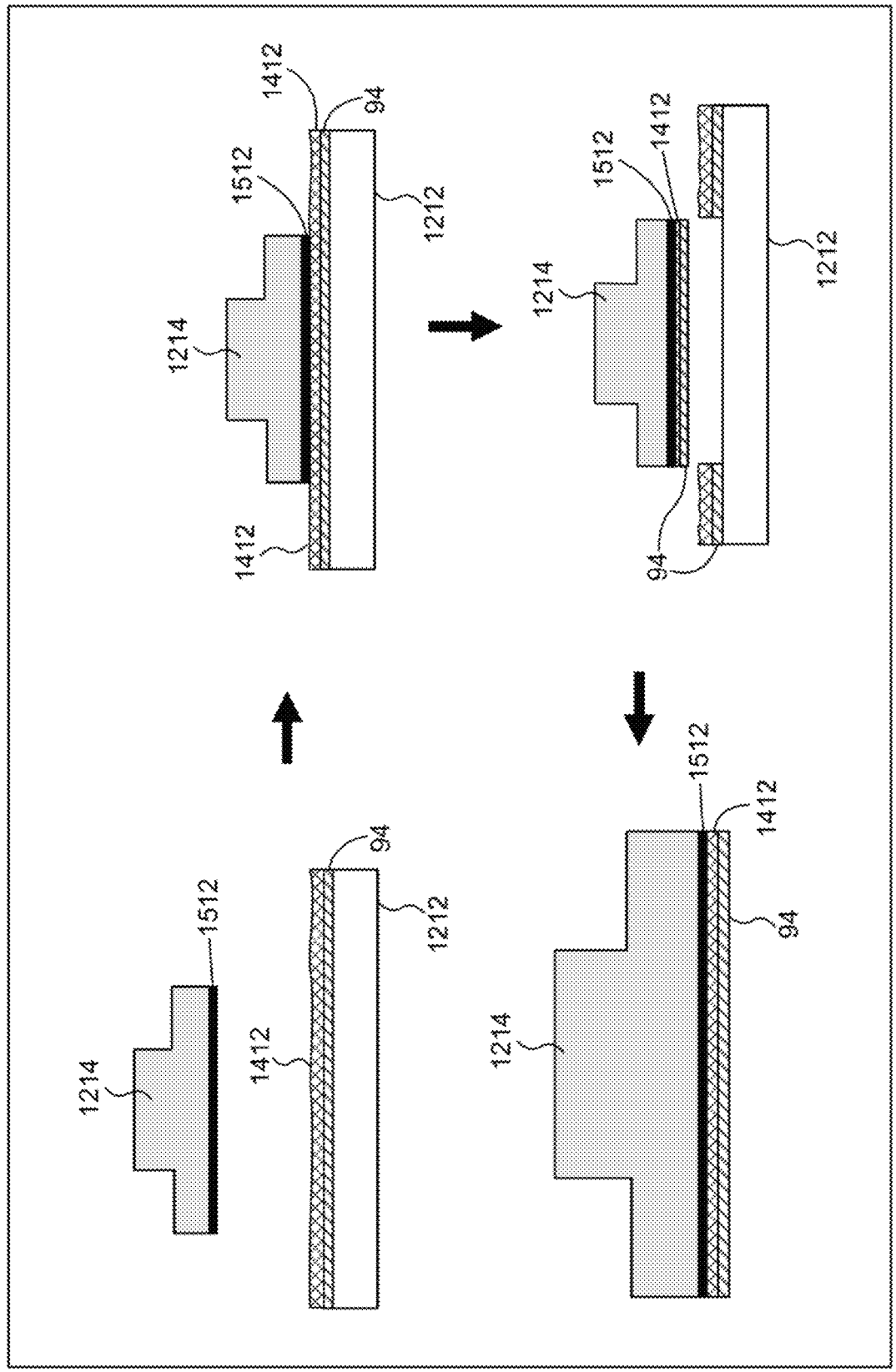
FIGS. 16A and 16B are illustrations of another exemplary process of fabricating a mirror of the current disclosure.
Figure 16B:
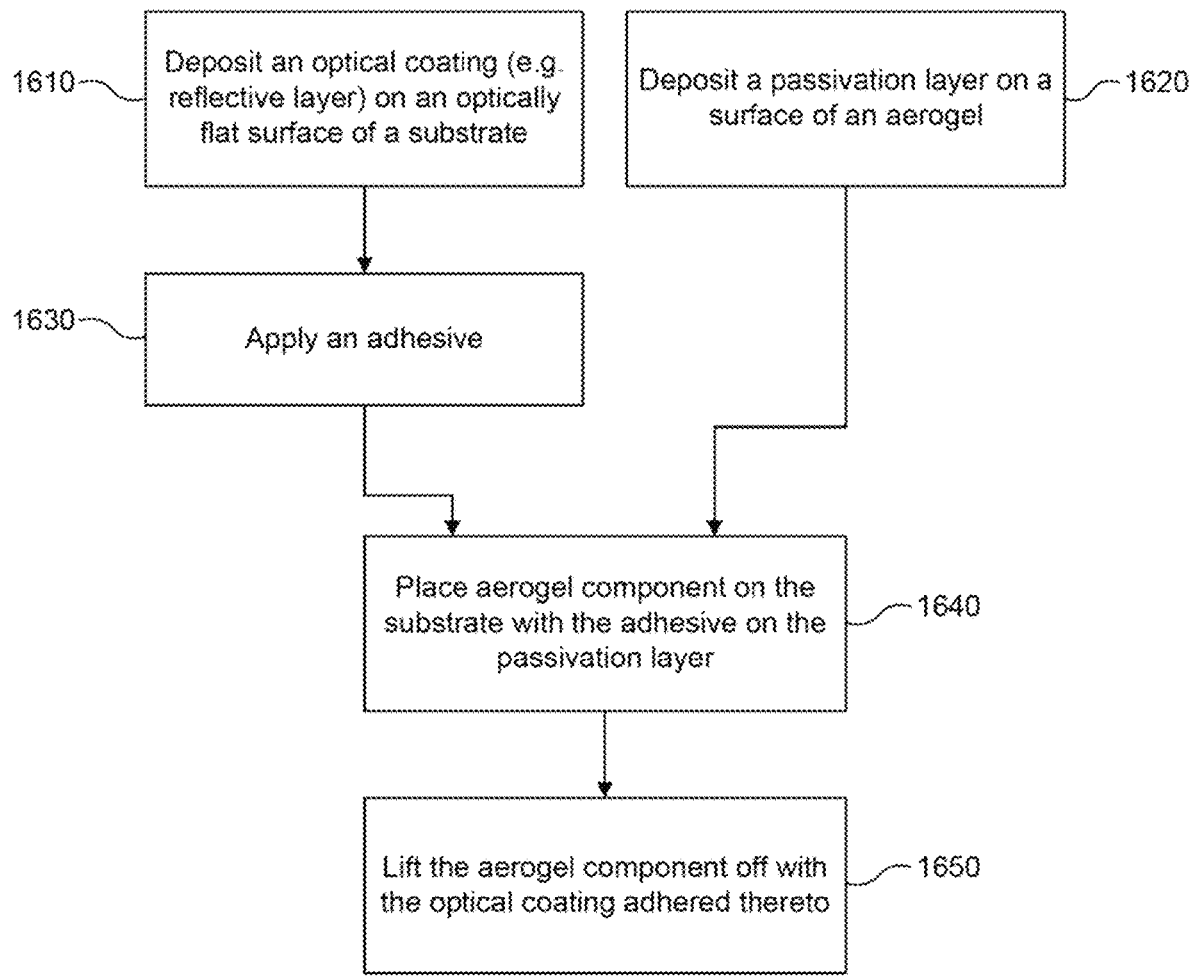

Although the adhesion layer 1412 is described as being applied on the (passivated surface of the) aerogel component in step 1530, this is only exemplary. Additionally, or alternatively, in some embodiments, the adhesion layer 1412 may be applied on a surface of the substrate 1212. FIGS. 16A and 16B illustrate an exemplary embodiment where the adhesion layer 1412 is applied on the optically coated surface of the substrate 1212. With reference to these figures, in step 1610, a surface of the optically finished flat substrate 1212 (e.g., silicon wafer, mica, glass, etc.) is first coated with a reflective layer 94 to form an optical coating. The adhesion layer 1412 is then applied to the surface of the reflective layer 94 on the substrate 1212 in step 1630. Meanwhile, the passivation layer 1512 is formed on the aerogel component 1214 in step 1620. In step 1640, the aerogel component 1214 is placed on the surface of the substrate 1212 coated with the adhesion layer 1412 such that the passivation layer 1512 of the aerogel component 1214 contacts the adhesion layer 1412. The material of the adhesion layer 1412 is then allowed to bond to the aerogel component 1214. Once bonding is complete, in step 1650, the aerogel component 1214 is detached from the substrate 1212, with the reflective layer 94 transferred to the aerogel component 1214 from the substrate 1212. After the aerogel component 1214 is detached (in step 1650), the surface of the aerogel component 1214 may have the reflective layer 94 attached using the adhesion layer 1412 with passivation layer 1512 positioned between the aerogel component 1214 and the adhesion layer 1412. It should be noted that, although the optical coating (reflective layer 94) is described as being formed on a single aerogel component, this is only exemplary. In some embodiments, the optical coating may be simultaneously formed on multiple aerosol components.

Figure 17A:
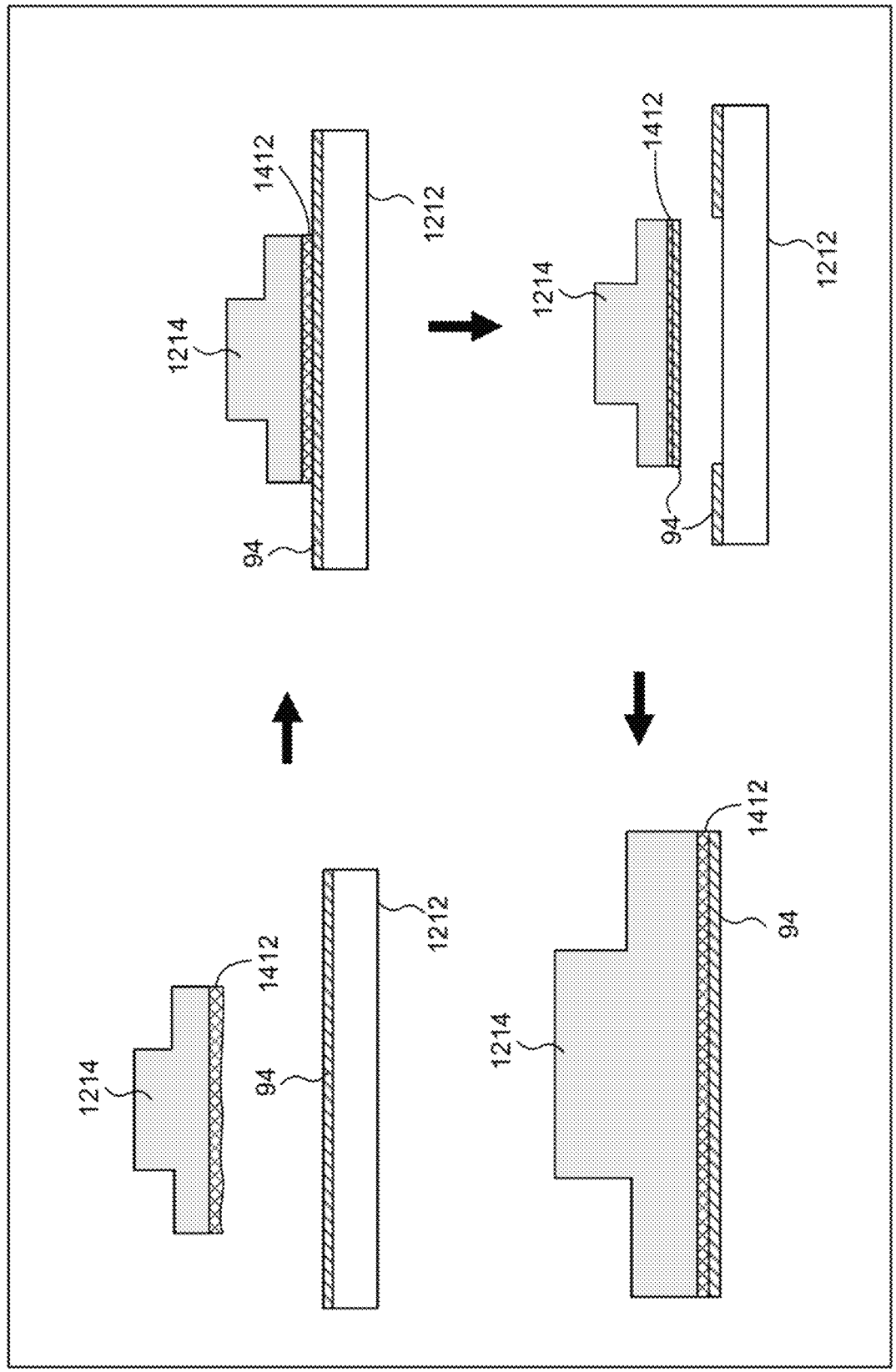
FIGS. 17A and 17B are illustrations of another exemplary process of fabricating a mirror of the current disclosure.
Figure 17B:
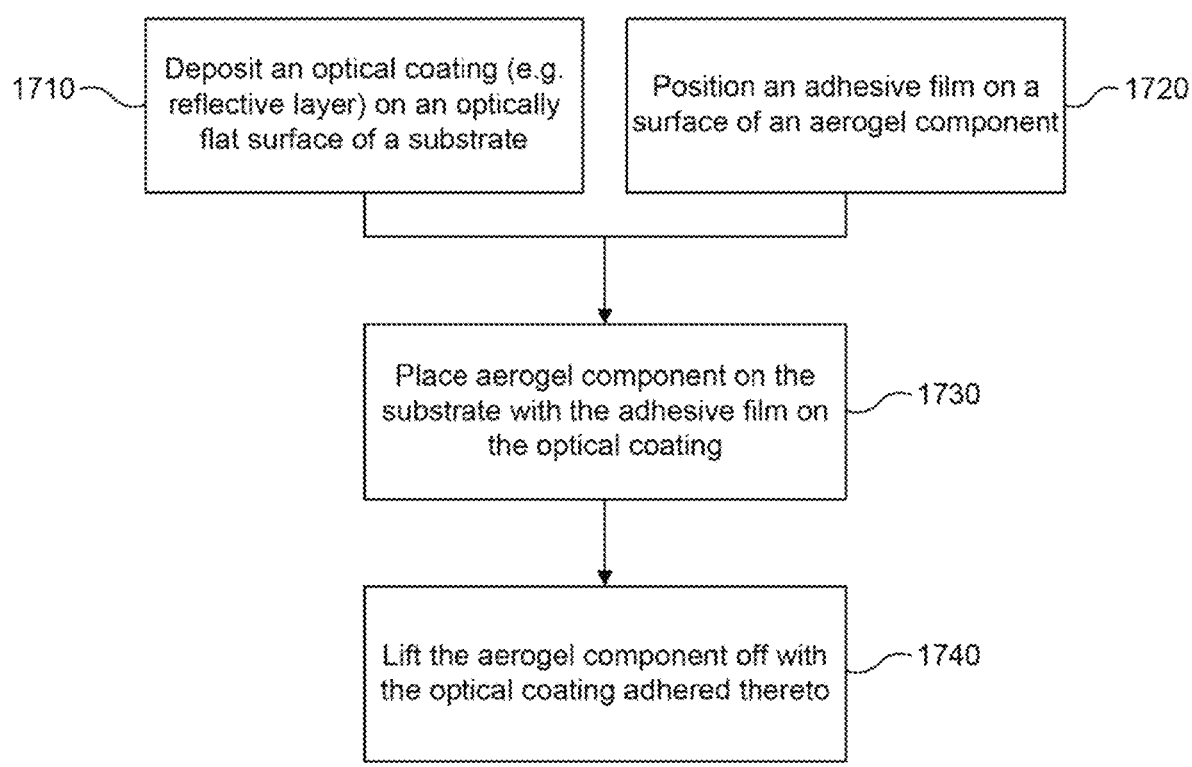

In some embodiments, the passivation layer 1512 on the aerogel component 1214 may be eliminated and a material (or adhesive) that does not significantly seep into the pores of the aerogel component 1214 may be used for the adhesion layer 1412. In some embodiments, as illustrated in FIGS. 17A and 17B, in step 1710, a surface of the optically finished flat substrate 1212 (e.g., silicon wafer, mica, glass, etc.) is coated with a reflective layer 94 to form an optical coating. Meanwhile, an adhesion layer 1412 (or a bonding layer) is applied to a surface of the aerogel component 1214 in step 1720. In some embodiments, application of the adhesion layer 1412 in step 1720 may include positioning a dry adhesive film (or a relatively dry adhesive film) or a permanent wafer-bonding material on the surface of the aerogel component 1214. Although any dry adhesive film may be used to form adhesion layer 1412, in some embodiments, a commercially available adhesive film such as, for example, the SUEX® line of thick and thin epoxy dry film photoresist sheets, ADEX™ thin epoxy dry film by DJ Microlaminates (Sudbury Mass., USA), DuPont™ Riston® dry film photoresist, or Kayaku's PermiNex® 1000 (Westborough, Mass., USA) may be used. In some embodiments, after placing the adhesion layer 1412 the surface of the aerogel component 1214 in step 1720, the aerogel component 1214 may be subjected to a process to bond the adhesion layer 1412 to the aerogel surface. In step 1730, the aerogel component 1214 may be placed on the optically coated surface of the substrate 1212 such that the adhesion layer 1412 on the aerogel component 1214 contacts the reflective layer 94 on the substrate 1212. The material of the adhesion layer 1412 may then be allowed to bond to the reflective layer 94. In some embodiments, the components may be subject to a compressive force and/or a high temperature and/or UV curing step to couple (e.g., adhere) the adhesion layer 1412 to the reflective layer 94. Once bonding is complete, in step 1740, the aerogel component 1214 may be detached from the substrate 1212, with the reflective layer 94 transferred to the aerogel component 1214. After step 1740, the surface of the aerogel component 1214 may have the reflective layer 94 (i.e., an optical coating) attached using the adhesion layer 1412.

Figure 18:
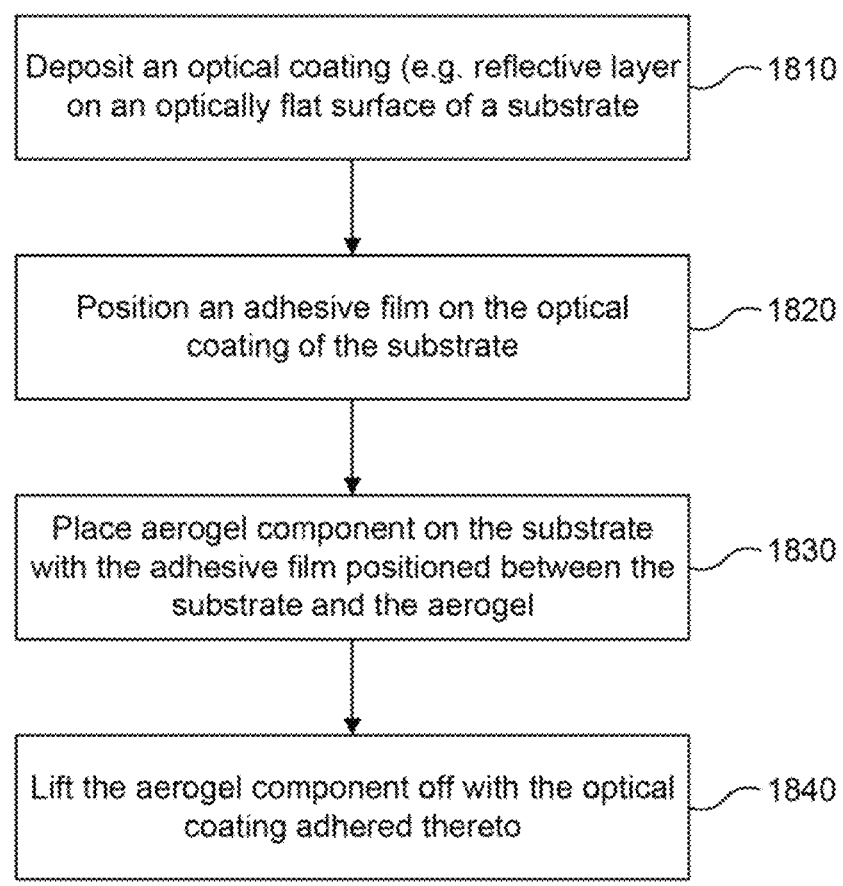
FIG. 18 illustrates another exemplary process of fabricating a mirror of the current disclosure.

In some embodiments, instead of applying the adhesion layer 1412 on a surface of the aerogel component 1214 (as in step 1720), the adhesion layer 1412 may instead be applied to (or positioned on) the optically coated surface of the substrate 1214. FIG. 18 illustrates an exemplary process for forming an ultralight mirror where the adhesive material is applied to the substrate surface. With reference to FIG. 18, in step 1810, a surface of the optically finished flat substrate 1212 (e.g., silicon wafer, mica, glass, etc.) is coated with a reflective layer 94 to form an optical coating. In step 1820, an adhesive material may be applied to the optically coated surface of the substrate 1212 to form the adhesion layer 1412. In some embodiments, in step 1820, as explained with reference to step 1720 of FIG. 17B, an adhesive film may be positioned on the optical coating of the substrate. In step 1830, the aerogel component 1214 may then be placed atop the adhesion layer 1412 on the substrate 1212. After the material of the adhesion layer 1412 bonds to the aerogel component 1214, in step 1840, the aerogel component 1214 may be detached from the substrate 1212 with the reflective layer 94 attached to the aerogel component 1214. In some embodiments, before detaching the aerogel component 1214 (in step 1840), laser scribing may be used to engrave a contour of the aerogel component on the reflective layer 94 to prevent peeling of the reflective layer 94 during removal. After detachment, the surface of the aerogel component 1214 may have the reference layer 94 attached using the adhesion layer 1412. As explained previously, the aerogel component 1214 may be removed from the substrate 1212 by any suitable method.

An aerogel mirror of the present disclosure may be retrofitted atop an existing MEMs mirror (see, e.g., FIG. 8), or a MEMS device may be fashioned anew with an aerogel mirror of the current disclosure replacing a conventional MEMs mirror (see, FIG. 7). A metal-plated (e.g., gold-plated) ultralight (e.g., aerogel) mirror may be assembled on a MEMS scanning device to enable better flatness and/or to provide a larger mirror. In some embodiments, the metal-plated back side of the disclosed ultralight mirror may be bonded (e.g., gold-bonded) to the top surface of a conventional MEMS mirror to be used as a manipulator, without use of adhesives. In some cases, the coefficient of thermal expansion (CTE) mismatch between the disclosed ultralight mirror and the conventional MEMS mirror may induce relatively large thermo-mechanical stresses in these components during thermal excursions. These stresses may lead to cracking of one or more of these components in some cases. Therefore, in some embodiments, the disclosed ultralight mirror may be attached or coupled to the conventional MEMS mirror to alleviate or reduce the CTE mismatch induced stresses in these components. In some such embodiments, a relatively compliant material (solder material, adhesive, etc.) may be used to attach the disclosed ultralight mirror to the MEMS mirror to reduce CTE mismatch induced stresses.

In some embodiments, the optically finished flat substrate 1212 of the embodiments described previously may include one or more of: silicon, mica, glass, quartz, metal, a flat (or ultraflat) plastic, gypsum, etc. In some embodiments, one or more release (or anti-adhesion layers) may be applied to the substrate prior to applying the optical coating (reflective layer 94) to enable the subsequent release of optical coating from the substrate 1212. Although any suitable release layer may be used, in some embodiments, the release layer may include one or more of: fluorinated silanes, fluorinated phosphates, and fluorinated Teflon-like coatings.

Sacrificial layers may be used between the substrate and the mirror coating, in order to facilitate release from the substrate upon transfer, for example, Water soluble polymers such as PVA, commercially available in products by Aicello (Solublon®), Sckisui (Selvol™) Kuraray (Poval™), Nippon Gohsei (Hi-Selon), and Soltec, Poly(ethylene oxide), like POLYOX by Dupont, and other polymers like Poly(acrylic acid), Poly(N-vinylpyrrolidone), Poly(vinylpyridine), Poly (maleic acid), Poly(N-isopropylacrylamide) (PNiPAM), Cellulose, Polyacrylamide, Dextran.

Although silica aerogel is discussed as the ultralight material used to form the mirror in the embodiments above, this is only exemplary. Any suitable aerogel or a nano-foam material (or aerogel compositions) may be used as the substrate of the disclosed aerogel mirrors consistent with this disclosure. Alternatively, Xerogel and Metal-Organic Frameworks (MOF's) may be used. In some embodiments, the above-described reflective layer 94 transfer technique may be used to transfer optical coatings to other flat surfaces, such as plastic surfaces. Although the applied optical coating (reflective layer 94) is described as forming a mirror in the embodiments discussed above, this is only exemplary. The optical coating may also form other optical components, such as, for example, Diffractive Optical Elements (DOEs), Refractive Optical Elements (ROEs), beam shapers, diffusers, homogenizers, absorbers, polarizers, lenses, Vertical Cavity Surface Emitting Lasers (VCSELs), etc.

In the figures and description, details of well-known features and manufacturing techniques (e.g., deposition techniques, etching techniques, etc.) may be omitted for the sake of brevity (and to avoid obscuring other features), since these features/technique are well known to a skilled artisan. Elements in the figures are not necessarily drawn to scale. The dimensions of some features may be exaggerated relative to other features to improve understanding of the exemplary embodiments. Cross-sectional views are simplifications provided to help illustrate the relative positioning of various regions/layers and to describe various processing steps. One skilled in the art would appreciate that the cross-sectional views are not drawn to scale and should not be viewed as representing proportional relationships between different regions/layers.

It should be noted that the description set forth herein is merely illustrative in nature and is not intended to limit the embodiments of the subject matter, or the application and uses of such embodiments. It should be appreciated that the described methods and steps are merely exemplary. In some embodiments, the methods may include a number of additional or alternative steps, and in some embodiments, one or more of the described steps may be omitted. Any described step may be omitted or modified, or other steps added, as long as the intended functionality of the resulting device remains substantially unaltered. Although a certain order is described or implied in the described methods, in general, the steps of the described methods need not be performed in the illustrated and described order. Further, the described methods may be incorporated into a process of fabricating an optical element. Since these additional steps are known to people skilled in the art, they are not described herein. Additionally, the described method may be incorporated into a more comprehensive procedure or process having additional functionality not described herein.

Furthermore, the limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A mirror, comprising:
an ultralight substrate having a first surface, wherein the ultralight substrate has a density less than about 300 kg/m³;
a reflective layer on the substrate;
a bonding layer disposed between the reflective layer and the first surface of the substrate; and
a passivation layer disposed between the first surface of the substrate and the bonding layer.

2. The mirror of claim 1, wherein the reflective layer is attached to the first surface of the substrate by the bonding layer.

3. The mirror of claim 1, wherein the passivation layer includes one of a metal, metal oxide, silica, a polymer, a varnish, or a lacquer.

4. The mirror of claim 1, wherein the reflective layer includes one of gold, silver, rhodium, platinum, copper, nickel, chromium, aluminum, or a multilayer dielectric material.

5. The mirror of claim 1, wherein the first surface is an optically flat surface.

6. The mirror of claim 1, wherein the bonding layer includes one of a UV-curable adhesive, thermally curable adhesive, cyanoacrylate adhesive, Pressure Sensitive Adhesive (PSA), or an epoxy adhesive.

7. The mirror of claim 1, wherein the ultralight substrate includes an aerogel, a xerogel, or a metal-organic framework.

8. The mirror of claim 7, wherein the aerogel includes at least one of silica, alumina, titania, or zirconia.

9. The mirror of claim 1, wherein the ultralight substrate includes an organic material.

10. The mirror of claim 9, wherein the organic material includes one or more of resorcinol-formaldehyde, polyurethane, epoxy, polyacrylonitrile, polyimides, polyvinylidene fluoride or polyvinylidene difluoride (PVDF), and a polyester.

11. The mirror of claim 1, wherein the ultralight substrate includes a second surface opposite the first surface, and wherein a surface area of the first surface is greater than the surface area of the second surface.

12. The mirror of claim 11, wherein the first surface and the second surface have a same shape.

13. The mirror of claim 12, wherein the same shape is one of rectangular, square, or circular.

14. A mirror, comprising:
an ultralight substrate having a first surface, wherein the ultralight substrate has a density less than about 300 kg/m³;
a reflective layer on the substrate; and
a bonding layer disposed between the reflective layer and the first surface of the substrate, wherein a thickness of the bonding layer is less than 5 microns.

15. A mirror, comprising:
an ultralight substrate having a first surface, wherein the ultralight substrate has a density less than about 300 kg/m³;
a reflective layer on the substrate; and
a bonding layer disposed between the reflective layer and the first surface of the substrate, wherein the bonding layer includes one of a weld material or a solder material.

16. A method of fabricating an aerogel mirror, comprising:
forming a reflective layer on a first surface of a substrate;
coupling a second surface of an ultralight component on the reflective layer formed on the substrate, wherein the ultralight component has a density less than about 300 kg/m³, wherein coupling the second surface of the ultralight component includes 3D printing the ultralight component on the reflective layer; and
decoupling the ultralight component from the substrate after the coupling, wherein after the decoupling at least a portion of the reflective layer of the first surface is transferred to the second surface of the ultralight component.

17. The method of claim 16, wherein forming the reflective layer includes depositing a layer of reflective material on the first surface.

18. The method of claim 17, wherein the reflective material includes one of gold, silver, rhodium, platinum, copper, nickel, chromium, aluminum, or a multilayer dielectric material.

19. The method of claim 16, wherein forming the reflective layer on the first surface incudes depositing a layer of reflective material on an optically flat first surface.

20. A method of fabricating an aerogel mirror, comprising:
forming a reflective layer on a first surface of a substrate;
coupling a second surface of an ultralight component on the reflective layer formed on the substrate, wherein the ultralight component has a density less than about 300 kg/m³, wherein coupling the second surface of the ultralight component includes attaching the second surface of the ultralight component to the reflective layer using an adhesive; and
decoupling the ultralight component from the substrate after the coupling, wherein after the decoupling at least a portion of the reflective layer of the first surface is transferred to the second surface of the ultralight component.

21. The method of claim 20, wherein attaching the second surface of the ultralight component to the reflective layer using an adhesive includes curing the adhesive.

22. The method of claim 20, wherein attaching the second surface of the ultralight component to the reflective layer using an adhesive includes disposing an adhesive film between the second surface and the reflective layer.

23. A method of fabricating an aerogel mirror, comprising:
forming a reflective layer on a first surface of a substrate;
coupling a second surface of an ultralight component on the reflective layer formed on the substrate, wherein the ultralight component has a density less than about 300 kg/m$^3$, wherein coupling the second surface of the ultralight component includes attaching the second surface of the ultralight component to the reflective layer using a bonding material; and
decoupling the ultralight component from the substrate after the coupling, wherein after the decoupling at least a portion of the reflective layer of the first surface is transferred to the second surface of the ultralight component.

24. The method of claim 23, wherein attaching the second surface of the ultralight component to the reflective layer using a bonding material includes applying the bonding material on one or both of the second surface and the reflective layer.

25. The method of claim 23, wherein decoupling the ultralight component from the substrate includes decoupling the ultralight component such that, after the decoupling, at least a portion of the reflective layer is attached to the second surface of the ultralight component by the bonding material.

26. The method of claim 23, wherein attaching the second surface of the ultralight component to the reflective layer using a bonding material includes (a) depositing a passivation layer on the second surface of the ultralight component, (b) applying the bonding material on one or both of the passivation layer and the reflective layer, and (c) coupling the passivation layer to the reflective layer using the bonding material.

27. The method of claim 26, wherein the passivation layer includes one of a metal, a metal oxide, silica, alumina, a polymer, a varnish, or a lacquer.

28. The method of claim 23, wherein the bonding material includes at least one of a weld material, a solder material, a UV-curable adhesive, or a thermally curable adhesive.

29. A method for making an ultralight mirror, the method comprising:
polishing one side of an ultralight substrate, wherein the ultralight substrate has a density less than about 300 kg/m$^3$;
forming a reflective surface on at least the one side of the substrate; and
dicing the ultralight substrate to form multiple ultralight mirrors after forming the reflective surface.

30. The method of claim 29, wherein forming the reflective surface includes depositing a layer of reflective material on the one side of the ultralight substrate.

31. The method of claim 29, further comprising reducing a surface area of the ultralight substrate opposite the one side.

32. The method of claim 29, further comprising:
associating an ultralight mirror of the multiple ultralight mirrors with an actuator of a MEMs device.

* * * * *